(12) United States Patent
Ivanov et al.

(10) Patent No.: US 11,766,746 B2
(45) Date of Patent: Sep. 26, 2023

(54) PHASE-MODIFIED QUASI-NON-DIFFRACTING LASER BEAMS FOR HIGH ANGLE LASER PROCESSING OF TRANSPARENT WORKPIECES

(71) Applicant: CORNING INCORPORATED, Corning, NY (US)

(72) Inventors: Viacheslav Viacheslavovich Ivanov, Saint Petersburg (RU); Nikolay Alekseyevich Kaliteevskiy, Saint Petersburg (RU); Nickolaos Savidis, Painted Post, NY (US); Petr Mikhaylovich Sterlingov, Saint Petersburg (RU); Ralf Joachim Terbrueggen, Neuried (DE); Craig John Mancusi Ungaro, Corning, NY (US)

(73) Assignee: Corning Incorporated, Corning, NY (US)

( * ) Notice: Subject to any disclaimer, the term of this patent is extended or adjusted under 35 U.S.C. 154(b) by 485 days.

(21) Appl. No.: 16/871,617

(22) Filed: May 11, 2020

(65) Prior Publication Data

US 2020/0361037 A1    Nov. 19, 2020

Related U.S. Application Data

(60) Provisional application No. 62/849,364, filed on May 17, 2019.

(51) Int. Cl.
*B23K 26/38* (2014.01)
*B23K 26/359* (2014.01)
*B23K 26/073* (2006.01)

(52) U.S. Cl.
CPC ............ *B23K 26/38* (2013.01); *B23K 26/073* (2013.01); *B23K 26/359* (2015.10)

(58) Field of Classification Search
CPC ............ B23K 2103/54; B23K 2103/56; B23K 26/38; B23K 26/359; B23K 26/073; B23K 26/53; B41M 5/267
See application file for complete search history.

(56) References Cited

U.S. PATENT DOCUMENTS

| 8,526,091 B2 | 9/2013 | Ito et al. |
| 9,108,271 B2 | 8/2015 | Sepp et al. |

(Continued)

FOREIGN PATENT DOCUMENTS

| CN | 102123818 A | 7/2011 |
| CN | 102138097 A | 7/2011 |

(Continued)

OTHER PUBLICATIONS

Beck et al; "Application of Cooled Spatial Light Modulator for High Power Nanosecond Laser Micromachining," Opt. Express 18, 17059-17065 (2010.

(Continued)

*Primary Examiner* — John J Norton
*Assistant Examiner* — Franklin Jefferson Wang
(74) *Attorney, Agent, or Firm* — Kevin L. Bray

(57) ABSTRACT

A method for processing a transparent workpiece that includes directing a laser beam the transparent workpiece. The laser beam incident to the impingement surface has an oblong angular spectrum and portion of the laser beam directed into the transparent workpiece is a laser beam focal line and generates an induced absorption to produce a defect within the transparent workpiece. The laser beam focal line includes a wavelength $\lambda$, a spot size $w_o$, a Rayleigh range $Z_R$ that is greater than (Continued)

$$F_D \frac{\pi w_o^2}{\lambda},$$

where $F_D$ is a dimensionless divergence factor comprising a value of 10 or greater, and an internal beam angle of greater than 10° relative to a plane orthogonal to an impingement surface at an impingement location, such that the defect has a defect angle within the transparent workpiece of greater than 10° relative to a plane orthogonal to the impingement surface at the impingement location.

20 Claims, 24 Drawing Sheets

(56) References Cited

U.S. PATENT DOCUMENTS

| | | | |
|---|---|---|---|
| 9,296,066 B2 | 3/2016 | Hosseini et al. | |
| 9,850,160 B2 | 12/2017 | Marjanovic et al. | |
| 9,878,400 B1* | 1/2018 | Olesen | B23K 26/0643 |
| 10,131,016 B1* | 11/2018 | Geerlings | C03B 33/0222 |
| 2015/0136743 A1 | 5/2015 | Hosseini | |
| 2015/0166396 A1* | 6/2015 | Marjanovic | B23K 26/402 |
| | | | 428/137 |
| 2017/0259375 A1* | 9/2017 | Kleiner | G02B 27/0944 |
| 2018/0062342 A1* | 3/2018 | Comstock, II | H01S 3/061 |
| 2018/0093941 A1 | 4/2018 | Anantaneni et al. | |
| 2018/0134604 A1* | 5/2018 | Ortner | B32B 17/00 |
| 2019/0129093 A1 | 5/2019 | Li et al. | |
| 2021/0146482 A1* | 5/2021 | Nomura | B23K 26/0648 |
| 2021/0170530 A1* | 6/2021 | Kumkar | B23K 26/046 |

FOREIGN PATENT DOCUMENTS

| | | | | |
|---|---|---|---|---|
| CN | 103079747 A | | 5/2013 | |
| CN | 106029285 A | | 10/2016 | |
| DE | 102016123974 A1 | * | 6/2018 | |
| EP | 3311947 A1 | * | 4/2018 | B23K 26/0648 |
| JP | 2012115875 A | * | 6/2012 | |

OTHER PUBLICATIONS

Birch et al; "Real-Time Optical Aberration Correction With a Ferroelectric Liquid-Crystal Spatial Light Modulator," Appl. Opt. 37, 2164-2169 (1998.

Borghi et al; "M2 Factor of Bessel-Gauss Beams"; Optics Letters, vol. 22(5), 262 (1997).

International Search Report and Written Opinion of the International Searching Authority; PCT/US2020/032306 dated Aug. 12, 2020; 11 Pages; European Patent Office.

Jenne et al; "High-Quality Tailored-Edge Cleaving Using Aberration-Corrected Bessel-Like Beams" ; Optics Letters; vol. 43, No. 13 (2018) pp. 3164-3167.

Jesacher et al; "Parallel Direct Laser Writing in Three Dimensions With Spatially Dependent Aberration Correction," Opt. Express 18, 21090-21099 (2010.

Siegman; "New Developments in Laser Resonators"; SPIE Symposium Series vol. 1224, 14 Pages (1990.

* cited by examiner

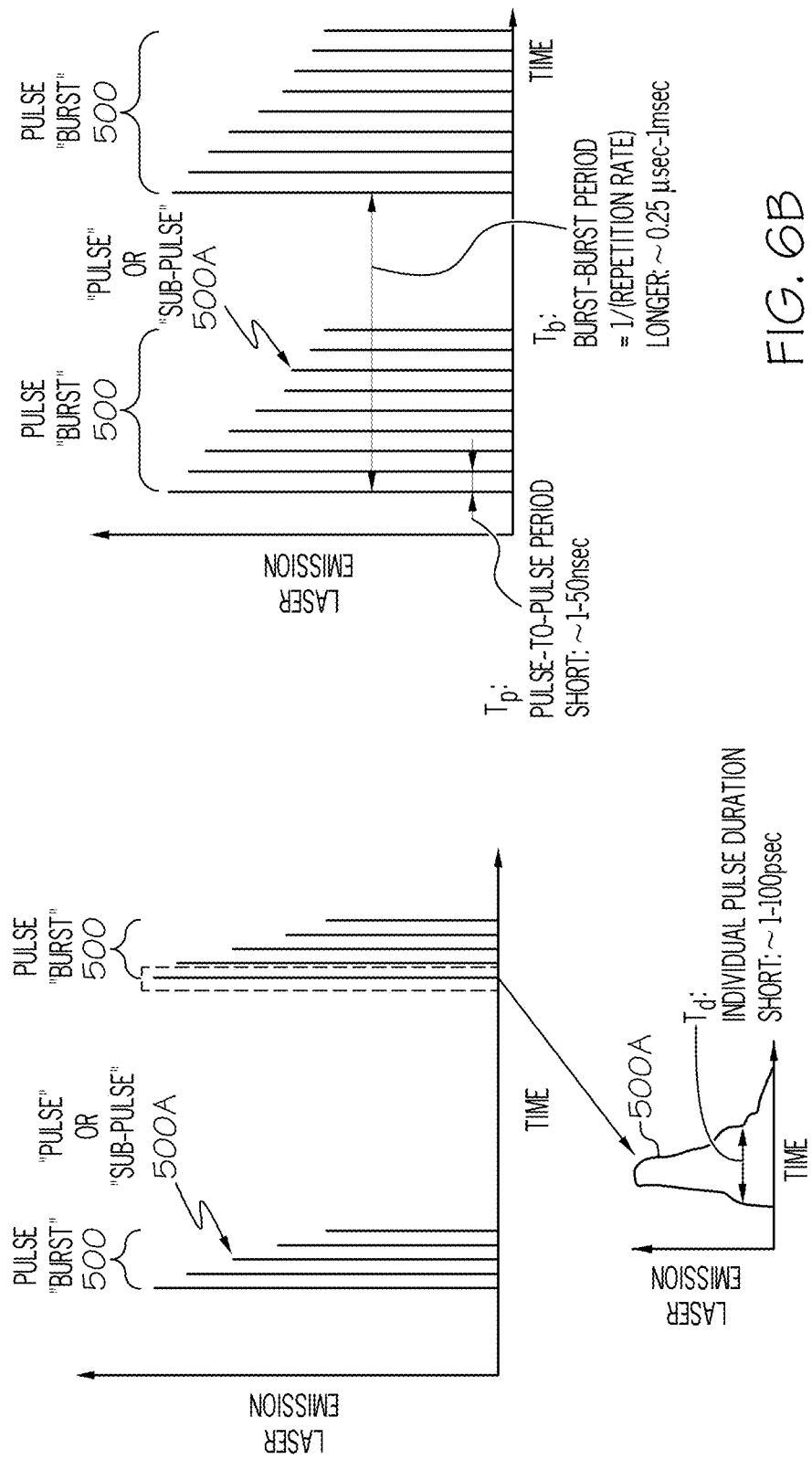

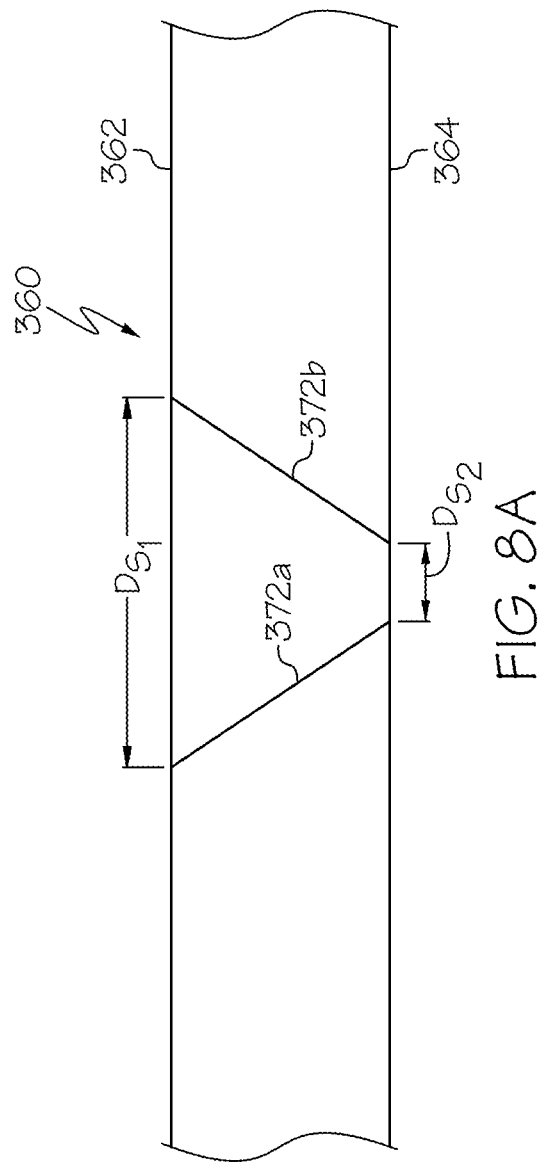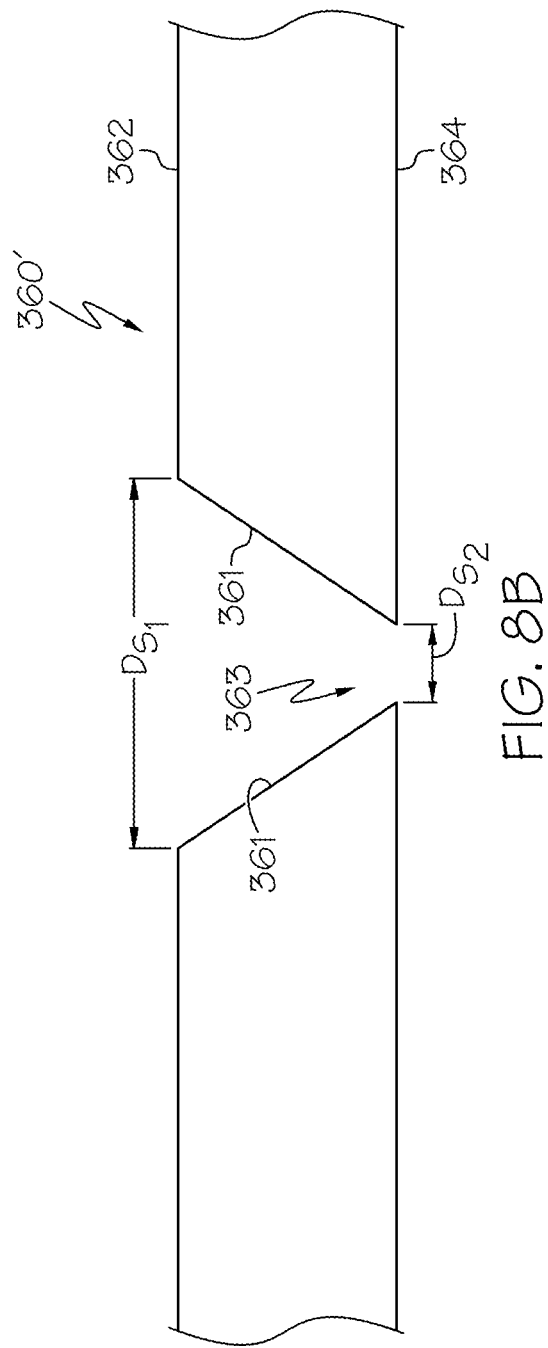

US 11,766,746 B2

PHASE-MODIFIED QUASI-NON-DIFFRACTING LASER BEAMS FOR HIGH ANGLE LASER PROCESSING OF TRANSPARENT WORKPIECES

This Application claims priority under 35 USC § 119(e) from U.S. Provisional Patent Application Ser. No. 62/849,364, filed on May 17, 2019, and which is incorporated by reference herein in its entirety.

BACKGROUND

Field

The present specification generally relates to apparatuses and methods for laser processing transparent workpieces, and more particularly, to laser beams comprising laser beam focal lines that are quasi-non-diffracting and retain a quasi-non-diffracting character when directed into a transparent workpiece at a non-normal angle of incidence.

Technical Background

The area of laser processing of materials encompasses a wide variety of applications that involve cutting, drilling, milling, welding, melting, etc. of different types of materials. Among these processes, one that is of particular interest is cutting or separating different types of transparent substrates in a process that may be utilized in the production of materials such as glass, sapphire, or fused silica for thin film transistors (TFT) or display materials for electronic devices.

From process development and cost perspectives there are many opportunities for improvement in cutting and separating glass substrates. It is of great interest to have a faster, cleaner, cheaper, more repeatable, and more reliable method of separating glass substrates than what is currently practiced in the market. Many methods of separating glass substrates result in square separated edges that are prone to breakage and are often processed to have bevels or to be rounded to minimize the chance of breakage. Currently, the non-square edges are often accomplished using mechanical means, such as mechanical grinding and polishing. However, the processes generate glass dust and particles, which must be cleaned by additional process steps involving washing or chemical treatments. Accordingly, a need exists for alternative improved methods for separating glass substrates which replace the conventional edge finishing process with a particle free and high throughput process.

SUMMARY

According to one embodiment of the present disclosure, a method for processing a transparent workpiece includes directing a laser beam oriented along a beam pathway into an impingement surface of the transparent workpiece at an impingement location. The laser beam incident to the impingement surface has an oblong angular spectrum with an axis of symmetry extending from a first axis end having a first radius of curvature to a second axis end having a second radius of curvature, where the first radius of curvature and the second radius of curvature are different. A portion of the laser beam is directed into the transparent workpiece to form a laser beam focal line in the transparent workpiece to generate an induced absorption in the transparent workpiece. The induced absorption produces a defect within the transparent workpiece. The laser beam focal line includes a wavelength λ, a spot size $w_o$, a Rayleigh range $Z_R$ that is greater than $$F_D \frac{\pi w_o^2}{\lambda},$$

where $F_D$ is a dimensionless divergence factor comprising a value of 10 or greater, and an internal beam angle of greater than 10° relative to a plane orthogonal to the impingement surface at the impingement location, such that the defect has a defect angle within the transparent workpiece of greater than 10° relative to a plane orthogonal to the impingement surface at the impingement location.

According to another embodiment of the present disclosure, a method for processing a transparent workpiece includes directing a laser beam oriented along a beam pathway from free space into an impingement surface of the transparent workpiece at an impingement location. The impingement surface has a non-planar topography. A portion of the laser beam incident to the impingement surface has a non-circular angular spectrum. A portion of the laser beam is directed into the transparent workpiece to form a laser beam focal line in the transparent workpiece to generate an induced absorption in the transparent workpiece. The induced absorption produces a defect within the transparent workpiece. The laser beam focal line has a wavelength λ, a spot size $w_o$, a Rayleigh range $Z_R$ that is greater than $$F_D \frac{\pi w_o^2}{\lambda},$$

where $F_D$ is a dimensionless divergence factor comprising a value of 10 or greater, and an internal beam angle of greater than 10° relative to a plane orthogonal to the impingement surface at the impingement location, such that the defect comprises a defect angle within the transparent workpiece of greater than 10° relative to a plane orthogonal to the impingement surface at the impingement location.

According to yet another embodiment of the present disclosure, a method for processing a transparent workpiece includes refracting a laser beam at an impingement surface of a transparent workpiece, where the laser beam includes a wavelength λ, a spot size $w_o$; and a Rayleigh range $Z_R$ that is greater than $$F_D \frac{\pi w_o^2}{\lambda},$$

where $F_D$ is a dimensionless divergence factor and the refracting increases the dimensionless divergence factor $F_D$ by a factor of at least 10.

Additional features and advantages of the processes and systems described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an over-view or framework for understanding the nature and character of the claimed subject matter. The accompanying drawings are included to provide a further understanding of the various embodiments and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 5A-1 schematically depicts an oblong angular spectrum of the laser beam of FIG. 5A after phase-altering the laser beam and before impinging the edge surface of the transparent workpiece, according to one or more embodiments described herein;

FIG. 5A-2 schematically depicts an interrupted oblong angular spectrum of the laser beam of FIG. 5A, formed after a portion of the laser beam impinges the edge surface of the transparent workpiece, according to one or more embodiments described herein;

FIG. 5B-1 schematically depicts an interrupted oblong angular spectrum of the laser beam of FIG. 5B, after phase-altering and obstructing the laser beam and before focusing the laser beam into a laser beam focal line, according to one or more embodiments described herein;

FIG. 5B-2 schematically depicts an interrupted oblong angular spectrum of the laser beam of FIG. 5B, after phase-altering and obstructing the laser beam and while focusing the laser beam into a laser beam focal line, according to one or more embodiments described herein;

FIG. 6A graphically depicts the relative intensity of laser pulses within an exemplary pulse burst vs. time, according to one or more embodiments described herein;

FIG. 6B graphically depicts relative intensity of laser pulses vs. time within another exemplary pulse burst, according to one or more embodiments described herein;

FIG. 8A schematically depicts a side view of a transparent workpiece having a closed curved contour of angled defects, according to one or more embodiments described herein;

FIG. 8B schematically depicts a side view of a separated article formed from the transparent workpiece of FIG. 8A, the separated article comprising a conical hole with an angled edge, according to one or more embodiments shown and described herein;

DETAILED DESCRIPTION

Figure 1A:
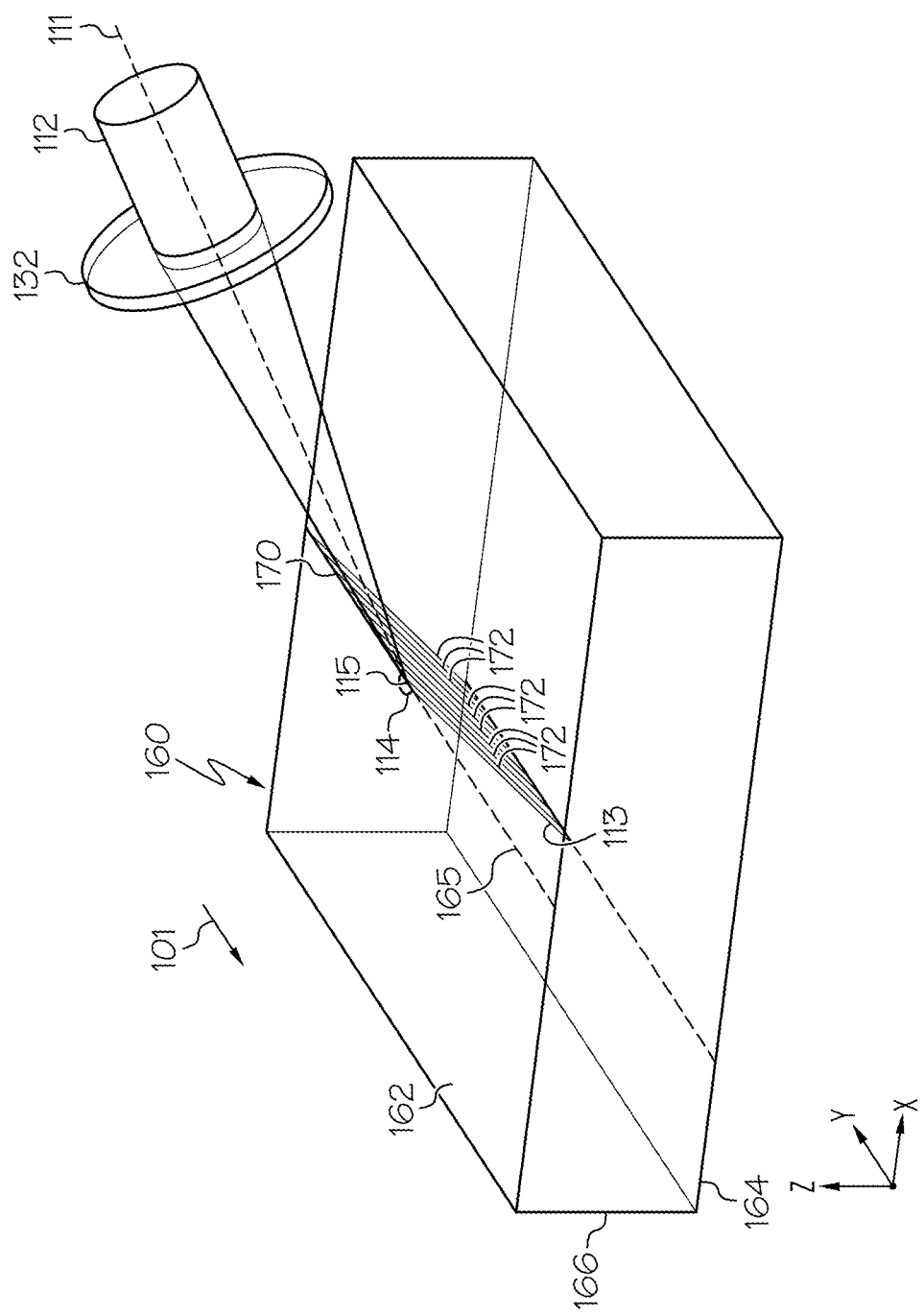
FIG. 1A schematically depicts a perspective view of an embodiment of laser forming a contour of defects, each having a defect angle, in a transparent workpiece, according to one or more embodiments described herein.

Reference will now be made in detail to embodiments of processes for laser processing transparent workpieces, such as glass workpieces, examples of which are illustrated in the accompanying drawings. Whenever possible, the same reference numerals will be used throughout the drawings to refer to the same or like parts. According to one or more embodiments described herein, a transparent workpiece may be laser processed to form a contour in the transparent workpiece that comprises a series of defects along a line of intended separation for separating the transparent workpiece into two or more separated articles. Each of the defects comprise a defect angle of greater than 10° such that, after separation of the transparent workpiece along the contour, the resultant separated articles comprise an angled edge having an edge angle of greater than 10°. Defects may be formed in a transparent workpiece using a low diffracting beam, such as a quasi-non-diffracting beam, focused into a laser beam focal line.

Using current methods, diffraction and divergence of extended focus laser beams (e.g., quasi-non-diffracting beams) increases when the beam is directed into the transparent workpiece at increased angles relative to normal incidence (e.g., angles greater than 10° from normal incidence) and as such, it is difficult to form a series of high angle defects to facilitate the separation of transparent workpieces into separated articles having angled edges. For example, using previous laser processing techniques, when a laser beam enters a transparent workpiece with an angled, curved, or stepped face, aberrations are introduced into the beam. For Bessel beams, these aberrations result in a large decrease of peak beam intensity as the beam travels inside the transparent workpiece, diminishing the quality or even preventing the formation of high angle defects. While not intending to be limited by theory, peak beam intensity decreases because, in conventional angled cutting, the central lobe of a standard Bessel beam splits into multiple lobes and thus the peak intensity of any of the split lobes is less than the peak intensity of the central lobe of a non-aberrated Bessel beam. While still not intending to be limited by theory, aberrations also lead to a decrease in the Rayleigh range of the beam. Thus, improved methods of laser processing transparent workpieces are desired. Accordingly, the methods described herein use angled laser beam focal lines that are phase altered such that the laser beam focal lines exhibit minimal divergence along the length of the laser beam focal line within the transparent workpiece to form a contour of high angled defects and facilitate the formation of separated articles having angled edges. The methods are described herein with specific references to the appended drawings.

As used herein, "laser processing" comprises directing a laser beam onto and/or into a transparent workpiece. In some embodiments, laser processing further comprises translating the laser beam relative to the transparent workpiece, for example, along a contour line or other pathway. Examples of laser processing include using a laser beam to form a contour comprising a series of defects that extend into the transparent workpiece and using an infrared laser beam to heat the transparent workpiece. Laser processing may separate the transparent workpiece along one or more desired lines of separation. However, in some embodiments, additional non-laser steps, such as applying mechanical force, may be utilized to separate the transparent workpiece along one or more desired lines of separation.

As used herein, the "angular spectrum" of a laser beam refers to the distribution of the Fourier spectrum of the laser beam in the spatial frequency domain. In particular, the angular spectrum represents a group of plane waves whose summation recreates the original beam. The angular spectrum may also be referred to as the spatial-frequency distribution of the laser beam.

As used herein, "beam spot" refers to a cross section of a laser beam (e.g., a beam cross section) at the impingement location of the laser beam at an impingement surface of a transparent workpiece, i.e., the surface of a transparent workpiece upon which the laser beam is first incident. The beam spot is the cross-section at the impingement location. In the embodiments described herein, the beam spot is sometimes referred to as being "axisymmetric" or "non-axisymmetric." As used herein, axisymmetric refers to a shape that is symmetric, or appears the same, for any arbitrary rotation angle made about a central axis, and "non-axisymmetric" refers to a shape that is not symmetric for any arbitrary rotation angle made about a central axis. The rotation axis (e.g., the central axis) is most often taken as being the optical axis (axis of propagation) of the laser beam, which is the axis extending in the beam propagation direction, which is referred to herein as the z-direction.

As used herein, "upstream" and "downstream" refer to the relative position of two locations or components along a beam pathway with respect to a beam source. For example, a first component is upstream from a second component if the first component is closer to the beam source along the path traversed by the laser beam than the second component.

As used herein, "laser beam focal line," refers to pattern of interacting (e.g., crossing) light rays of a laser beam that forms a focal region elongated in the beam propagation direction. In conventional laser processing, a laser beam is tightly focused to a focal point. The focal point is the point of maximum intensity of the laser beam and is situated at a focal plane in a transparent workpiece. In the elongated focal region of a focal line, in contrast, the region of maximum intensity of the laser beam extends beyond a point to a line aligned with the beam propagation direction. A focal line is formed by converging light rays that intersect (e.g., cross) to form a continuous series of focal points aligned with the beam propagation direction. The laser beam focal lines described herein are formed using a quasi-non-diffracting beam, mathematically defined in detail below.

As used herein, "contour line," corresponds to the set of intersection points of the laser beam with the incident surface of the transparent workpiece resulting from relative motion of the laser beam and the transparent workpiece. A contour line can be a linear, angled, polygonal or curved in shape A contour line can be closed (i.e. defining an enclosed region on the surface of the transparent workpiece) or open (i.e. not defining an enclosed region on the surface of the transparent workpiece). The contour line represents a boundary along which separation of the transparent workpiece into two or more parts is facilitated. Separation occurs spontaneously or with the assistance of external thermal or mechanical energy.

As used herein, "contour," refers to a set of defects in a transparent workpiece formed by a laser beam through relative motion of a laser beam and the transparent workpiece along a contour line. The defects are spaced apart along the contour line and are wholly contained within the interior of the transparent workpiece or extend through one or more surfaces into the interior of the transparent workpiece. Defects may also extend through the entire thickness of the transparent workpiece. Separation of the transparent workpiece occurs by connecting defects, such as, for example, through propagation of a crack.

As used herein, a "defect" refers to a region of a transparent workpiece that has been modified by a laser beam. Defects include regions of a transparent workpiece having a modified refractive index relative to surrounding unmodified regions of the transparent workpiece. Common defects include structurally modified regions such as void spaces, cracks, scratches, flaws, holes, perforations, densifications, or other deformities in the transparent workpiece produced by a laser beam focal line. Defects may also be referred to, in various embodiments herein, as defect lines or damage tracks. A defect or damage track is formed through interaction of a laser beam focal line with the transparent workpiece. As described more fully below, the laser beam focal line is produced by a pulsed laser. A defect at a particular location along the contour line is formed from a focal line produced by a single laser pulse at the particular location, a pulse burst of sub-pulses at the particular location, or multiple laser pulses at the particular location. Relative motion of the laser beam and transparent workpiece along the contour line results in multiple defects that form a contour.

The phrase "transparent workpiece," as used herein, means a workpiece formed from glass, glass-ceramic or other material which is transparent, where the term "transparent," as used herein, means that the material has a linear optical absorption of less than 20% per mm of material depth, such as less than 10% per mm of material depth for the specified pulsed laser wavelength, or such as less than 1% per mm of material depth for the specified pulsed laser wavelength. Unless otherwise specified, the material has a linear optical absorption of less than about 20% per mm of material depth. The transparent workpiece may have a depth (e.g., thickness) of from about 50 microns (μm) to about 10 mm (such as from about 100 μm to about 5 mm, or from about 0.5 mm to about 3 mm).

Transparent workpieces may comprise glass workpieces formed from glass compositions, such as borosilicate glass, soda-lime glass, aluminosilicate glass, alkali aluminosilicate, alkaline earth aluminosilicate glass, alkaline earth boro-aluminosilicate glass, fused silica, or crystalline materials such as sapphire, silicon, gallium arsenide, or combinations thereof. In some embodiments the transparent workpiece may be strengthened via thermal tempering before or after laser processing the transparent workpiece. In some embodiments, the glass may be ion-exchangeable, such that the glass composition can undergo ion-exchange for glass strengthening before or after laser processing the transparent workpiece. For example, the transparent workpiece may comprise ion exchanged and ion exchangeable glass, such as Corning Gorilla® Glass available from Corning Incorporated of Corning, N.Y. (e.g., code 2318, code 2319, and code 2320). Further, these ion-exchanged glasses may have coefficients of thermal expansion (CTE) of from about 6 ppm/° C. to about 10 ppm/° C. Other example transparent workpieces may comprise EAGLE XG® and CORNING LOTUS™ available from Corning Incorporated of Corning, N.Y. Moreover, the transparent workpiece may comprise other components which are transparent to the wavelength of the laser, for example, glass ceramics or crystals such as sapphire or zinc selenide.

In an ion exchange process, ions in a surface layer of the transparent workpiece are replaced by larger ions having the same valence or oxidation state, for example, by partially or fully submerging the transparent workpiece in an ion exchange bath. Replacing smaller ions with larger ions causes a layer of compressive stress to extend from one or more surfaces of the transparent workpiece to a certain depth within the transparent workpiece, referred to as the depth of layer. The compressive stresses are balanced by a layer of tensile stresses (referred to as central tension) such that the net stress in the glass sheet is zero. The formation of compressive stresses at the surface of the glass sheet makes the glass strong and resistant to mechanical damage and, as such, mitigates catastrophic failure of the glass sheet for flaws which do not extend through the depth of layer. In some embodiments, smaller sodium ions in the surface layer of the transparent workpiece are exchanged with larger potassium ions. In some embodiments, the ions in the surface layer and the larger ions are monovalent alkali metal cations, such as Li+ (when present in the glass), Na+, K+, Rb+, and Cs+. Alternatively, monovalent cations in the surface layer may be replaced with monovalent cations other than alkali metal cations, such as Ag+, Tl+, Cu+, or the like.

As used herein, the term "quasi-non-diffracting beam" is used to describe a laser beam having low beam divergence as mathematically described below. In particular, the laser beam used to form a contour of defects in the embodiments described herein. The laser beam has an intensity distribution I(X,Y,Z), where Z is the beam propagation direction of the laser beam, and X and Y are directions orthogonal to the beam propagation direction, as depicted in the figures. The X-direction and Y-direction may also be referred to as cross-sectional directions and the X-Y plane may be referred to as a cross-sectional plane. The coordinates and directions X, Y, and Z are also referred to herein as x, y, and z; respectively. The intensity distribution of the laser beam in a cross-sectional plane may be referred to as a cross-sectional intensity distribution.

The quasi-non-diffracting laser beam may be formed by impinging a diffracting laser beam (such as a Gaussian beam) into, onto, and/or thorough a phase-altering optical element, such as an adaptive phase-altering optical element (e.g., a spatial light modulator, an adaptive phase plate, a deformable mirror, or the like), a static phase-altering optical element (e.g., a static phase plate, an aspheric optical element, such as an axicon, or the like), to modify the phase of the beam, to reduce beam divergence, and to increase Rayleigh range, as mathematically defined below. Example quasi-non-diffracting beams include Gauss-Bessel beams, Airy beams, Weber beams, and Bessel beams. Furthermore, optical assemblies that include a phase-altering optical element are described in more detail below.

Without intending to be limited by theory, beam divergence refers to the rate of enlargement of the beam cross section in the direction of beam propagation (i.e., the Z direction). One example of a beam cross section discussed herein is a beam spot 114 of a laser beam 112 projected onto a transparent workpiece 160 (FIG. 1A). Diffraction is one factor that leads to divergence of laser beams. Other factors include focusing or defocusing caused by the optical systems forming the laser beams or refraction and scattering at interfaces. Laser beams for forming the defects of the contours are formed from laser beam focal lines. Laser beam focal lines have low divergence and weak diffraction. The divergence of the laser beam is characterized by the Rayleigh range $Z_R$, which is related to the variance $\sigma^2$ of the intensity distribution and beam propagation factor $M^2$ of the laser beam. In the discussion that follows, formulas will be presented using a Cartesian coordinate system. Corresponding expressions for other coordinate systems are obtainable using mathematical techniques known to those of skill in the art. Additional information on beam divergence can be found in the articles entitled "New Developments in Laser Resonators" by A. E. Siegman in SPIE Symposium Series Vol. 1224, p. 2 (1990) and "$M^2$ factor of Bessel-Gauss beams" by R. Borghi and M. Santarsiero in Optics Letters, Vol. 22(5), 262 (1997), the disclosures of which are incorporated herein by reference in their entirety. Additional information can also be found in the international standards ISO 11146-1:2005(E) entitled "Lasers and laser-related equipment—Test methods for laser beam widths, divergence angles and beam propagation ratios—Part 1: Stigmatic and simple astigmatic beams", ISO 11146-2:2005(E) entitled "Lasers and laser-related equipment—Test methods for laser beam widths, divergence angles and beam propagation ratios—Part 2: General astigmatic beams", and ISO 11146-3:2004(E) entitled "Lasers and laser-related equipment—Test methods for laser beam widths, divergence angles and beam propagation ratios—Part 3: Intrinsic and geometrical laser beam classification, propagation and details of test methods", the disclosures of which are incorporated herein by reference in their entirety.

The spatial coordinates of the centroid of the intensity profile of the laser beam having a time-averaged intensity profile I(x, y, z) are given by the following expressions:

$$\overline{x}(z) = \frac{\int_{-\infty}^{\infty}\int_{-\infty}^{\infty} xI(x, y, z)dxdy}{\int_{-\infty}^{\infty}\int_{-\infty}^{\infty} I(x, y, z)dxdy} \quad (1)$$

$$\overline{y}(z) = \frac{\int_{-\infty}^{\infty}\int_{-\infty}^{\infty} yI(x, y, z)dxdy}{\int_{-\infty}^{\infty}\int_{-\infty}^{\infty} I(x, y, z)dxdy} \quad (2)$$

These are also known as the first moments of the Wigner distribution and are described in Section 3.5 of ISO 11146-2:2005(E). Their measurement is described in Section 7 of ISO 11146-2:2005(E).

Variance is a measure of the width, in the cross-sectional (X-Y) plane, of the intensity distribution of the laser beam as a function of position z in the direction of beam propagation (Z-direction). For an arbitrary laser beam, variance in the X-direction may differ from variance in the Y-direction. We let $\sigma_x^2(z)$ and $\sigma_y^2(z)$ represent the variances in the X-direction and Y-direction, respectively. Of particular interest are the variances in the near field and far field limits. We let $\sigma_{0x}^2(z)$ and $\sigma_{0y}^2(z)$ represent variances in the X-direction and Y-direction, respectively, in the near field limit, and we let $\sigma_{\infty x}^2(z)$ and $\sigma_{\infty y}^2(z)$ represent variances in the X-direction and Y-direction, respectively, in the far field limit. For a laser beam having a time-averaged intensity profile I(x, y, z) with Fourier transform $\tilde{I}(v_x,v_y)$ (where $v_x$ and $v_y$ are spatial frequencies in the X-direction and Y-direction, respectively), the near field and far field variances in the X-direction and Y-direction are given by the following expressions:

$$\sigma_{0x}^2(z) = \frac{\int_{-\infty}^{\infty}\int_{-\infty}^{\infty} x^2 I(x, y, z)dxdy}{\int_{-\infty}^{\infty}\int_{-\infty}^{\infty} I(x, y, z)dxdy} \quad (3)$$

$$\sigma_{0y}^2(z) = \frac{\int_{-\infty}^{\infty}\int_{-\infty}^{\infty} y^2 I(x, y, z)dxdy}{\int_{-\infty}^{\infty}\int_{-\infty}^{\infty} I(x, y, z)dxdy} \quad (4)$$

$$\sigma_{\infty x}^2 = \frac{\int_{-\infty}^{\infty}\int_{-\infty}^{\infty} v_x^2 \tilde{I}(v_x, v_y)dv_x dv_y}{\int_{-\infty}^{\infty}\int_{-\infty}^{\infty} \tilde{I}(v_x, v_y)dv_x dv_y} \quad (5)$$

$$\sigma_{\infty y}^2 = \frac{\int_{-\infty}^{\infty}\int_{-\infty}^{\infty} v_y^2 \tilde{I}(v_x, v_y)dv_x dv_y}{\int_{-\infty}^{\infty}\int_{-\infty}^{\infty} \tilde{I}(v_x, v_y)dv_x dv_y} \quad (6)$$

The variance quantities $\sigma_{0x}^2(z)$, $\sigma_{0y}^2(z)$, $\sigma_{\infty x}^2$, and $\sigma_{\infty y}^2$ are also known as the diagonal elements of the Wigner distribution (see ISO 11146-2:2005(E)). These variances can be quantified for an experimental laser beam using the measurement techniques described in Section 7 of ISO 11146-2:2005(E). In brief, the measurement uses a linear unsaturated pixelated detector to measure I(x, y) over a finite spatial region that approximates the infinite integration area of the integral equations which define the variances and the centroid coordinates. The appropriate extent of the measurement area, background subtraction and the detector pixel resolution are determined by the convergence of an iterative measurement procedure described in Section 7 of ISO 11146-2:2005(E). The numerical values of the expressions given by equations 1-6 are calculated numerically from the array of intensity values as measured by the pixelated detector.

Through the Fourier transform relationship between the transverse amplitude profile ũ(x, y, z) for an arbitrary optical beam (where I(x, y, z)≡|ũ(x, y, z)|²) and the angular spectrum (often referred to as the spatial frequency distribution) $\tilde{P}(v_x, v_y, z)$ for an arbitrary optical beam (where $\tilde{I}(v_x,v_y)$≡|$\tilde{P}$ $(v_x, v_y, z)|^2$), it can be shown that:

$$\sigma_x^2(z) = \sigma_{0x}^2(z_{0x}) + \lambda^2 \sigma_{\infty x}^2(z-z_{0x})^2 \quad (7)$$

$$\sigma_y^2(z) = \sigma_{0y}^2(z_{0y}) + \lambda^2 \sigma_{\infty y}^2(z-z_{0y})^2 \quad (8)$$

In equations (7) and (8), $\sigma_{0x}^2(z_{0x})$ and $\sigma_{0y}^2(z_{0y})$ are minimum values of $\sigma_{0x}^2(z)$ and $\sigma_{0y}^2(z)$, which occur at waist positions $z_{0x}$ and $z_{0y}$ in the x-direction and y-direction, respectively, and $\lambda$ is the wavelength of the laser beam. Equations (7) and (8) indicate that $\sigma_x^2(z)$ and $\sigma_y^2(z)$ increase quadratically with z in either direction from the minimum values associated with the waist position of the laser beam (e.g., the waist portion of the laser beam focal line). Further, in the embodiments described herein comprising a beam spot 114 that is axisymmetric and thereby comprises an axisymmetric intensity distribution I(x,y), $\sigma_x^2(z) \neq \sigma_y^2(z)$ and in the embodiments described herein comprising a beam spot 114 that is non-axisymmetric and thereby comprises a non-axisymmetric intensity distribution I(x,y), $\sigma_x^2(z) \neq \sigma_y^2(z)$ i.e $\sigma_x^2(z) < \sigma_y^2(z)$ or $\sigma_x^2(z) > \sigma_y^2(z)$.

Equations (7) and (8) can be rewritten in terms of a beam propagation factor $M^2$, where separate beam propagations factors $M_x^2$ and $M_y^2$ for the x-direction and the y-direction are defined as:

$$M_x^2 = 4\pi\sigma_{0x}\sigma_{\infty x} \quad (9)$$

$$M_y^2 = 4\pi\sigma_{0y}\sigma_{\infty y} \quad (10)$$

Rearrangement of Equations (9) and (10) and substitution into Equations (7) and (8) yields:

$$\sigma_x^2(z) = \sigma_{0x}^2(z_{0x}) + \frac{\lambda^2 M_x^4}{(4\pi\sigma_{0x})^2}(z - z_{0x})^2 \quad (11)$$

$$\sigma_y^2(z) = \sigma_{0y}^2(z_{0y}) + \frac{\lambda^2 M_y^4}{(4\pi\sigma_{0y})^2}(z - z_{0y})^2 \quad (12)$$

which can be rewritten as:

$$\sigma_x^2(z) = \sigma_{0x}^2(z_{0x})\left[1 + \frac{(z - z_{0x})^2}{Z_{Rx}^2}\right] \quad (13)$$

$$\sigma_y^2(z) = \sigma_{0y}^2(z_{0y})\left[1 + \frac{(z - z_{0y})^2}{Z_{Ry}^2}\right] \quad (14)$$

where the Rayleigh ranges $Z_{Rx}$ and $Z_{Ry}$ in the x-direction and y-direction, respectively, are given by:

$$Z_{Rx} = \frac{4\pi\sigma_{0x}^2}{M_x^2 \lambda} \quad (15)$$

$$Z_{Ry} = \frac{4\pi\sigma_{0y}^2}{M_y^2 \lambda} \quad (16)$$

The Rayleigh range corresponds to the distance (relative to the position of the beam waist as defined in Section 3.12 of ISO 11146-1:2005(E)) over which the variance of the laser beam doubles (relative to the variance at the position of the beam waist) and is a measure of the divergence of the cross-sectional area of the laser beam. Further, in the embodiments described herein comprising a beam spot 114 that is axisymmetric and thereby comprises an axisymmetric intensity distribution I(x,y), $Z_{Rx}=Z_{Ry}$ and in the embodiments described herein comprising a beam spot 114 that is non-axisymmetric and thereby comprises a non-axisymmetric intensity distribution I(x,y), $Z_{Rx} \neq Z_{Ry}$, i.e., $Z_{Rx} < Z_{Ry}$ or $Z_{Rx} > Z_{Ry}$. The Rayleigh range can also be observed as the distance along the beam axis at which the optical intensity decays to one half of its value observed at the beam waist location (location of maximum intensity). Laser beams with large Rayleigh ranges have low divergence and expand more slowly with distance in the beam propagation direction than laser beams with small Rayleigh ranges.

The formulas above can be applied to any laser beam (not just Gaussian beams) by using the intensity profile I(x, y, z) that describes the laser beam. In the case of the $TEM_{00}$ mode of a Gaussian beam, the intensity profile is given by:

$$I(x, y) = \frac{\sqrt{\pi}}{2} w_o e^{\frac{-2(x^2 + y^2)}{w_o^2}} \quad (17)$$

where $w_o$ is the radius (defined as the radius at which beam intensity decreases to $1/e^2$ of the peak beam intensity of the beam at a beam waist position $z_o$. From Equation (17) and the above formulas, we obtain the following results for a $TEM_{00}$ Gaussian beam:

$$\sigma_{0x}^2 = \sigma_{0y}^2 = \frac{w_o^2}{4} \quad (18)$$

$$\sigma_{\infty x}^2 = \sigma_{\infty y}^2 = \frac{1}{4\pi^2 w_o^2} \quad (19)$$

$$M_x^2 = 4\pi\sigma_{0x}\sigma_{\infty x} = 1 \quad (20)$$

$$M_y^2 = 4\pi\sigma_{0y}\sigma_{\infty y} = 1 \quad (21)$$

$$Z_{Rx} = \frac{4\pi\sigma_{0x}^2}{M_x^2 \lambda} = \frac{\pi w_0^2}{\lambda} \quad (22)$$

$$Z_{Ry} = \frac{4\pi\sigma_{0y}^2}{M_y^2 \lambda} = \frac{\pi w_0^2}{\lambda} \quad (23)$$

$$w^2(z) = w_0^2 + \frac{\lambda^2}{(\pi w_0)^2}(z - z_0)^2 = w_0^2\left[1 + \frac{(z - z_0)^2}{Z_R^2}\right] \quad (24)$$

where $Z_R = Z_{Rx} = Z_{Ry}$. For Gaussian beams, it is further noted that $M^2 = M_x^2 = M_y^2 = 1$.

Beam cross section is characterized by shape and dimensions. The dimensions of the beam cross section are characterized by a spot size of the beam. For a Gaussian beam, spot size is frequently defined as the radial extent at which the intensity of the beam decreases to $1/e^2$ of its maximum value, denoted in Equation (17) as $w_0$. The maximum intensity of a Gaussian beam occurs at the center (x=0 and y=0 (Cartesian) or =0 (cylindrical)) of the intensity distribution and radial extent used to determine spot size is measured relative to the center.

Beams with axisymmetric (i.e. rotationally symmetric around the beam propagation axis Z) cross sections can be characterized by a single dimension or spot size that is measured at the beam waist location as specified in Section 3.12 of ISO 11146-1:2005(E). For a Gaussian beam, Equation (17) shows that spot size is equal to $w_o$, which from Equation (18) corresponds to $2\sigma_{0x}$ or $2\sigma_{0y}$. For an axisymmetric beam having an axisymmetric cross section, such as a circular cross section, $\sigma_{0x} = \sigma_{0y}$. Thus, for axisymmetric beams, the cross section dimension may be characterized with a single spot size parameter, where $w_o = 2\sigma_0$. Spot size can be similarly defined for non-axisymmetric beam cross sections where, unlike an axisymmetric beam, $\sigma_{0x} \neq \sigma_{0y}$. Thus, when the spot size of the beam is non-axisymmetric, it is necessary to characterize the cross-sectional dimensions of a non-axisymmetric beam with two spot size parameters: $w_{ox}$ and $w_{oy}$ in the x-direction and y-direction, respectively, where $$w_{ox} = 2\sigma_{0x} \quad (25)$$

$$w_{oy} = 2\sigma_{0y} \quad (26)$$

Further, the lack of axial (i.e. arbitrary rotation angle) symmetry for a non-axisymmetric beam means that the results of a calculation of values of $\sigma_{0x}$ and $\sigma_{0y}$ will depend on the choice of orientation of the X-axis and Y-axis. ISO 11146-1:2005(E) refers to these reference axes as the principal axes of the power density distribution (Section 3.3-3.5) and in the following discussion we will assume that the X and Y axes are aligned with these principal axes. Further, an angle φ about which the X-axis and Y-axis may be rotated in the cross-sectional plane (e.g., an angle of the X-axis and Y-axis relative to reference positions for the X-axis and Y-axis, respectively) may be used to define minimum ($w_{o,min}$) and maximum values ($w_{o,max}$) of the spot size parameters for a non-axisymmetric beam:

$$w_{o,min} = 2\sigma_{0,min} \tag{27}$$

$$w_{o,max} = 2\sigma_{0,max} \tag{28}$$

where $2\sigma_{0,min} = 2\sigma_{0x}(\varphi_{min,x}) = 2\sigma_{0y}(\varphi_{min,y})$ and $2\sigma_{0,max} = 2\sigma_{0x}(\varphi_{max,x}) = 2\sigma_{0y}(\varphi_{max,y})$ The magnitude of the axial asymmetry of the beam cross section can be quantified by the aspect ratio, where the aspect ratio is defined as the ratio of $w_{o,max}$ to $w_{o,min}$. An axisymmetric beam cross section has an aspect ratio of 1.0, while elliptical and other non-axisymmetric beam cross sections have aspect ratios greater than 1.0, for example, greater than 1.1, greater than 1.2, greater than 1.3, greater than 1.4, greater than 1.5, greater than 1.6, greater than 1.7, greater than 1.8, greater than 1.9, greater than 2.0, greater than 3.0, greater than 5.0, greater than 10.0, or the like To promote uniformity of defects in a transparent workpiece along the beam propagation direction (e.g. depth dimension of the transparent workpiece), a laser beam having low divergence may be used. In one or more embodiments, laser beams 112 having low divergence may be utilized for forming defects. As noted above, divergence can be characterized by the Rayleigh range. For non-axisymmetric beams, Rayleigh ranges for the principal axes X and Y are defined by Equations (15) and (16) for the X-direction and Y-direction, respectively, where it can be shown that for any real beam, $M_x^2 > 1$ and $M_y^2 > 1$ and where $\sigma_{0x}^2$ and $\sigma_{0y}^2$ are determined by the intensity distribution of the laser beam. For symmetric beams, Rayleigh range is the same in the X-direction and Y-direction and is expressed by Equation (22) or Equation (23). Low divergence correlates with large values of the Rayleigh range and weak diffraction of the laser beam.

Beams with Gaussian intensity profiles may be less preferred for laser processing to form defects because, when focused to the small enough spot sizes (such as spot sizes in the range of microns, such as about 1-5 μm or about 1-10 μm) needed to achieve laser pulse energies sufficient to modify materials such as glass, they are highly diffracting and diverge significantly over short propagation distances. To achieve low divergence, it is desirable to control or optimize the intensity distribution of the pulsed laser beam to reduce diffraction. Pulsed laser beams may be non-diffracting or weakly diffracting. Weakly diffracting laser beams include quasi-non-diffracting laser beams. Representative weakly diffracting laser beams include Bessel beams, Gauss-Bessel beams, Airy beams, Weber beams, and Mathieu beams.

For non-axisymmetric beams, the Rayleigh ranges $Z_{Rx}$ and $Z_{Ry}$ are unequal. Equations (15) and (16) indicate that $Z_{Rx}$ and $Z_{Ry}$ depend on $\sigma_{0x}$ and $\sigma_{0y}$, respectively, and above we noted that the values of $\sigma_{0x}$ and $\sigma_{0y}$ depend on the orientation of the X-axis and Y-axis. The values of $Z_{Rx}$ and $Z_{Ry}$ will accordingly vary, and each will have a minimum value and a maximum value that correspond to the principal axes, with the minimum value of $Z_{Rx}$ being denoted as $Z_{Rx,min}$ and the minimum value of of $Z_{Ry}$ being denoted $Z_{Ry,min}$ for an arbitrary beam profile $Z_{Rx,min}$ and $Z_{Ry,min}$ can be shown to be given by $$Z_{Rx,min} = \frac{4\pi\sigma_{0,min}^2}{M_x^2 \lambda} \tag{29}$$

and $$Z_{Ry,min} = \frac{4\pi\sigma_{0,min}^2}{M_y^2 \lambda} \tag{30}$$

Since divergence of the laser beam occurs over a shorter distance in the direction having the smallest Rayleigh range, the intensity distribution of the laser beam used to form defects may be controlled so that the minimum values of $Z_{Rx}$ and $Z_{Ry}$ (or for axisymmetric beams, the value of $Z_R$) are as large as possible. Since the minimum value $Z_{Rx,min}$ of $Z_{Rx}$ and the minimum value $Z_{Ry,min}$ of $Z_{Ry}$ differ for a non-axisymmetric beam, a laser beam 112 may be used with an intensity distribution that makes the smaller of $Z_{Rx,min}$ and $Z_{Ry,min}$ as large as possible when forming damage regions.

In different embodiments, the smaller of $Z_{Rx,min}$ and $Z_{Ry,min}$ (or for axi symmetric beams, the value of $Z_R$) is greater than or equal to 50 μm, greater than or equal to 100 μm, greater than or equal to 200 μm, greater than or equal to 300 μm, greater than or equal to 500 μm, greater than or equal to 1 mm, greater than or equal to 2 mm, greater than or equal to 3 mm, greater than or equal to 5 mm, in the range from 50 μm to 10 mm, in the range from 100 μm to 5 mm, in the range from 200 μm to 4 mm, in the range from 300 μm to 2 mm, or the like.

The values and ranges for the smaller of $Z_{Rx,min}$ and $Z_{Ry,min}$ (or for axisymmetric beams, the value of $Z_R$) specified herein are achievable for different wavelengths to which the workpiece is transparent through adjustment of the spot size parameter $w_{o,min}$ defined in Equation (27). In different embodiments, the spot size parameter $w_{o,min}$ is greater than or equal to 0.25 μm, greater than or equal to 0.50 μm, greater than or equal to 0.75 μm, greater than or equal to 1.0 μm, greater than or equal to 2.0 μm, greater than or equal to 3.0 μm, greater than or equal to 5.0 μm, in the range from 0.25 μm to 10 μm, in the range from 0.25 μm to 5.0 μm, in the range from 0.25 μm to 2.5 μm, in the range from 0.50 μm to 10 μm, in the range from 0.50 μm to 5.0 μm, in the range from 0.50 μm to 2.5 μm, in the range from 0.75 μm to 10 μm, in the range from 0.75 μm to 5.0 μm, in the range from 0.75 μm to 2.5 μm, or the like.

Non-diffracting or quasi-non-diffracting beams generally have complicated intensity profiles, such as those that decrease non-monotonically vs. radius. By analogy to a Gaussian beam, an effective spot size $w_{o,eff}$ can be defined for non-axisymmetric beams as the shortest radial distance, in any direction, from the radial position of the maximum intensity (r=0) at which the intensity decreases to $1/e^2$ of the maximum intensity. Further, for axisymmetric beams $w_{o,eff}$ is the radial distance from the radial position of the maximum intensity (r=0) at which the intensity decreases to $1/e^2$ of the maximum intensity. A criterion for Rayleigh range based on the effective spot size $w_{o,eff}$ for non-axisymmetric beams or the spot size $w_o$ for axisymmetric beams can be specified as non-diffracting or quasi non-diffracting beams for forming damage regions using equation (31) for non-axisymmetric beams of equation (32) for axisymmetric beams, below:

$$\text{Smaller of } Z_{Rx,min}, Z_{Ry,min} > F_D \frac{\pi w_{0,eff}^2}{\lambda} \quad (31)$$

$$Z_R > F_D \frac{\pi w_0^2}{\lambda} \quad (32)$$

where $F_D$ is a dimensionless divergence factor having a value of at least 10, at least 50, at least 100, at least 250, at least 500, at least 1000, in the range from about 10 to about 2000, in the range from about 50 to about 1500, in the range from about 100 to about 1000. By comparing Equation (31) to Equation (22) or (23), one can see that for a non-diffracting or quasi non-diffracting beam the distance, Smaller of $Z_{Rx,min}Z_{Ry,min}$ in Equation (31), over which the effective beam size doubles, is $F_D$ times the distance expected if a typical Gaussian beam profile were used. The dimensionless divergence factor $F_D$ provides a criterion for determining whether or not a laser beam is quasi-non-diffracting. As used herein, the laser beam 112 is considered quasi-non-diffracting if the characteristics of the laser beam satisfy Equation (31) or Equation (32) with a value of $F_D \geq 10$. As the value of $F_D$ increases, the laser beam 112 approaches a more nearly perfect non-diffracting state. Moreover, it should be understood that Equation (32) is merely a simplification of Equation (31) and as such, Equation (31) mathematically describes the dimensionless divergence factor $F_D$ for both axisymmetric and non-axisymmetric pulsed laser beams.

Figure 1B:
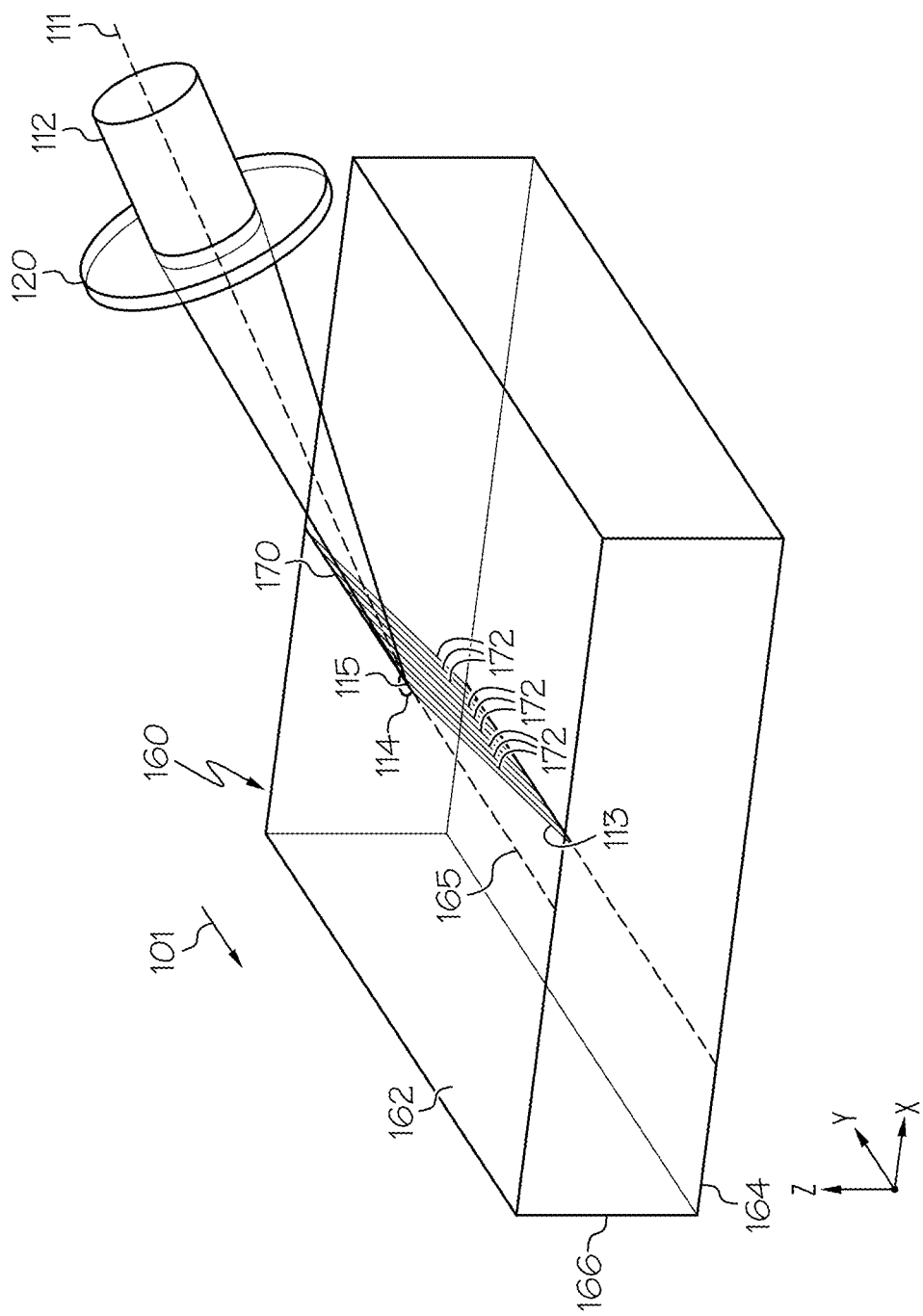
FIG. 1B schematically depicts a perspective view of another embodiment of laser forming a contour of defects, each having a defect angle, in a transparent workpiece, according to one or more embodiments described herein.
Figure 1C:
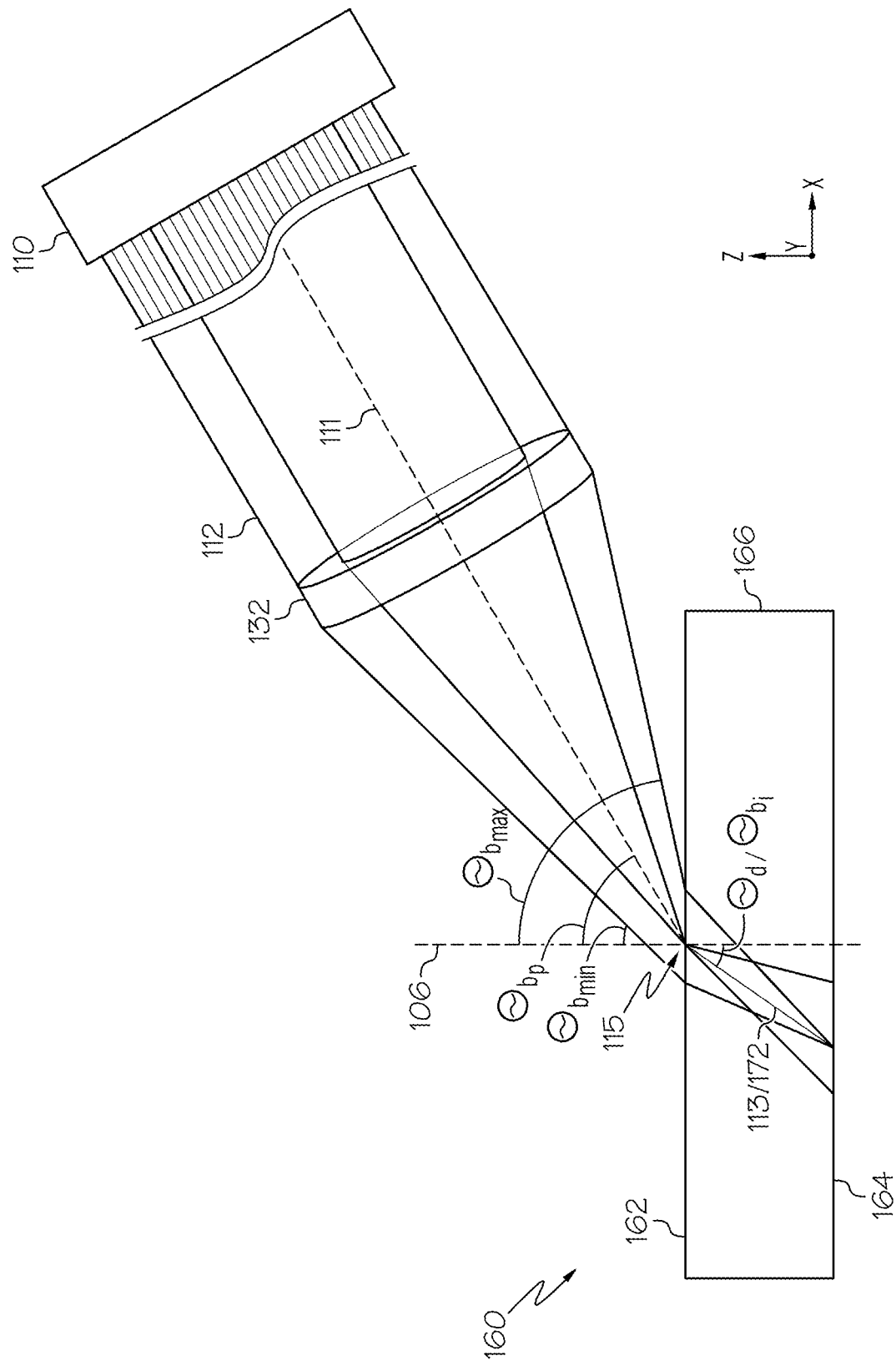
FIG. 1C schematically depicts a side view of an embodiment of laser forming the contour of defects, each having a defect angle, in the transparent workpiece, according to one or more embodiments described herein.

Referring now to FIGS. 1A-1C, an example transparent workpiece 160 is schematically depicted undergoing laser processing according to the methods described herein. In particular, FIGS. 1A-1C schematically depict directing a laser beam 112 that is output by a beam source 110, such as a Gaussian beam source, and oriented along a beam pathway 111 into the transparent workpiece 160 at a beam propagation angle $\theta_{bp}$ such that a portion of the laser beam 112 directed into the transparent workpiece 160 comprises a laser beam focal line 113 that is not orthogonal to an impingement surface 162 of the transparent workpiece 160 and instead comprises an internal beam angle $\theta_{bi}$. The laser beam 112 forms a beam spot 114 projected onto the impingement surface 162 of the transparent workpiece 160, which further comprises an opposite surface 164 and an edge surface 166 extending between the impingement surface 162 and the opposite surface 164.

The laser beam focal line 113 generates an induced absorption within the transparent workpiece 160 to produce a defect 172 within the transparent workpiece 160. Because the laser beam focal line 113 comprises an internal beam angle $\theta_{bi}$, the defect 172 formed by induced absorption comprises a defect angle $\theta_d$ equal to or approximately equal to the internal beam angle $\theta_{bi}$. In other words, the defects 172 formed in the embodiments described herein comprise angled defects, where "angled" refers to an angular deviation from the direction normal to the impingement surface 162 at impingement location 115. Laser beam focal line 113 is correspondingly angled. Moreover, the laser beam 112 is phase modified by a phase-altering optical element 120. When the laser beam 112 impinges the impingement surface 162 of the transparent workpiece 160 at a beam propagation angle $\theta_{bp}$, the laser beam 112 forms a laser beam focal line 113 having an internal beam angle $\theta_{bi}$. Furthermore, because of the phase modification applied by the phase-altering optical element 120, when the laser beam focal line 113 has an internal beam angle $\theta_{bi}$ greater than 10°, the laser beam focal line 113 exhibits quasi-non-diffracting character (as mathematically defined above) within the transparent workpiece 160.

Referring now to FIG. 1C, each of the beam propagation angle $\theta_{bp}$, the internal beam angle $\theta_{bi}$, and the defect angle $\theta_d$ are measured relative to a plane orthogonal to the impingement surface 162 at an impingement location 115 (i.e., the orthogonal plane 106). The impingement location 115 is a specific location on the impingement surface 162 where the laser beam 112 is first incident to and initially contacts the impingement surface 162. When the laser beam 112 (including the laser beam focal line 113) and the transparent workpiece 160 are translated relative to one another, the impingement location 115 changes such that, when the impingement surface 162 comprises a variable topography, the orthogonal plane 106 may change. Further, the beam propagation angle $\theta_{bp}$ comprises the average angle of light rays of the laser beam 112 impinging the impingement surface 162 relative to the orthogonal plane 106. As shown in FIG. 1C, the laser beam 112 impinging the impingement surface 162 includes a maximum beam propagation angle $\theta_{bmax}$, which is the angle of the light rays of the laser beam 112 having the largest angle at the impingement surface 162 relative to the orthogonal plane 106, and a minimum beam propagation angle $\theta_{bmin}$, which is the angle of the light rays of the laser beam 112 having the smallest angle at the impingement surface 162 relative the orthogonal plane 106.

In some embodiments, as shown in FIGS. 1A and 1C, the laser beam 112 may be focused into the laser beam focal line 113 using a lens 132, which is an aspheric lens. While a single lens 132 is depicted in FIGS. 1A and 1C, some embodiments may include a lens assembly 130 including a first lens 131 and a second lens 132, and repetitions thereof (FIGS. 2A and 2B) to focus the laser beam 112 into the laser beam focal line 113. Other standard optical elements (e.g. prisms, beam splitters etc.) may also be included in lens assembly 130. As depicted in FIG. 1C, the laser beam 112 may comprise an annular shape when impinging the lens 132. While the lens 132 is depicted focusing the laser beam 112 into the laser beam focal line 113 in FIG. 1A, other embodiments may use the phase-altering optical element 120, which modifies the phase of the laser beam 112, to also focus the laser beam 112 into the laser beam focal line 113, as depicted in FIG. 1B (i.e., to both phase modify and focus the laser beam 112). The laser beam focal line 113 may have a length in a range of from about 0.1 mm to about 100 mm or in a range of from about 0.1 mm to about 10 mm. Various embodiments may be configured to have a laser beam focal line 113 with a length l of about 0.1 mm, about 0.2 mm, about 0.3 mm, about 0.4 mm, about 0.5 mm, about 0.7 mm, about 1 mm, about 2 mm, about 3 mm, about 4 mm, or about 5 mm e.g., from about 0.5 mm to about 5 mm.

In operation, the laser processing depicted in FIGS. 1A-1C further includes translating at least one of the laser beam focal line 113 and the transparent workpiece 160 relative to each other in a translation direction 101 along a contour line 165 (i.e., a line of desired separation) to form a plurality of defects 172. The plurality of defects 172 form a contour 170, which may be used to separate the transparent workpiece 160 into a plurality of separated articles 260', 360', 460' (FIGS. 6B, 7B, 8B). The defects 172 may extend, for example, through the depth (i.e., the thickness) of the transparent workpiece 160.

Figure 2A:
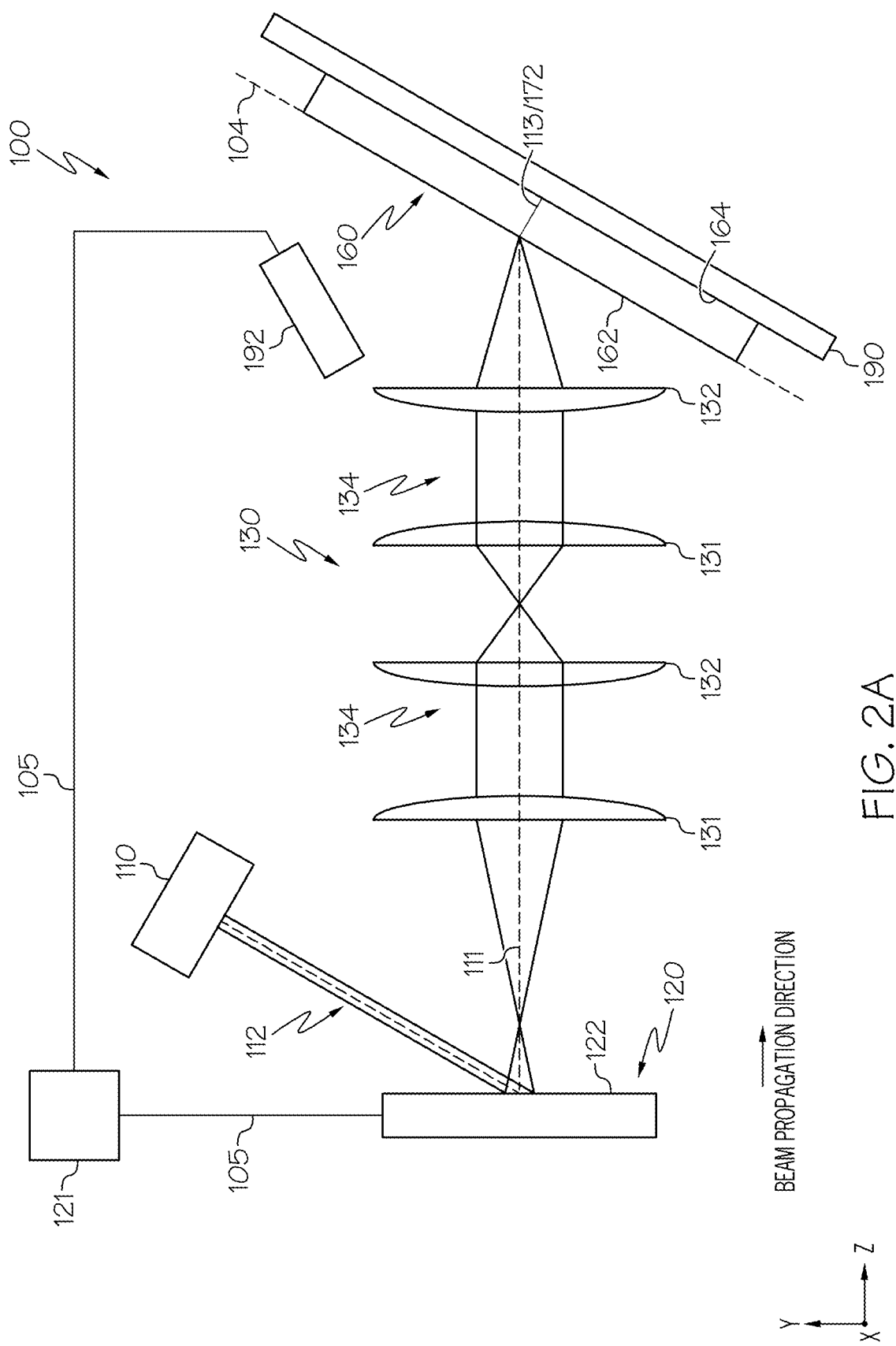
FIG. 2A schematically depicts an optical assembly for laser processing a transparent workpiece including a beam source, an adaptive phase-altering optical element and a lens assembly, according to one or more embodiments described herein.
Figure 2B:
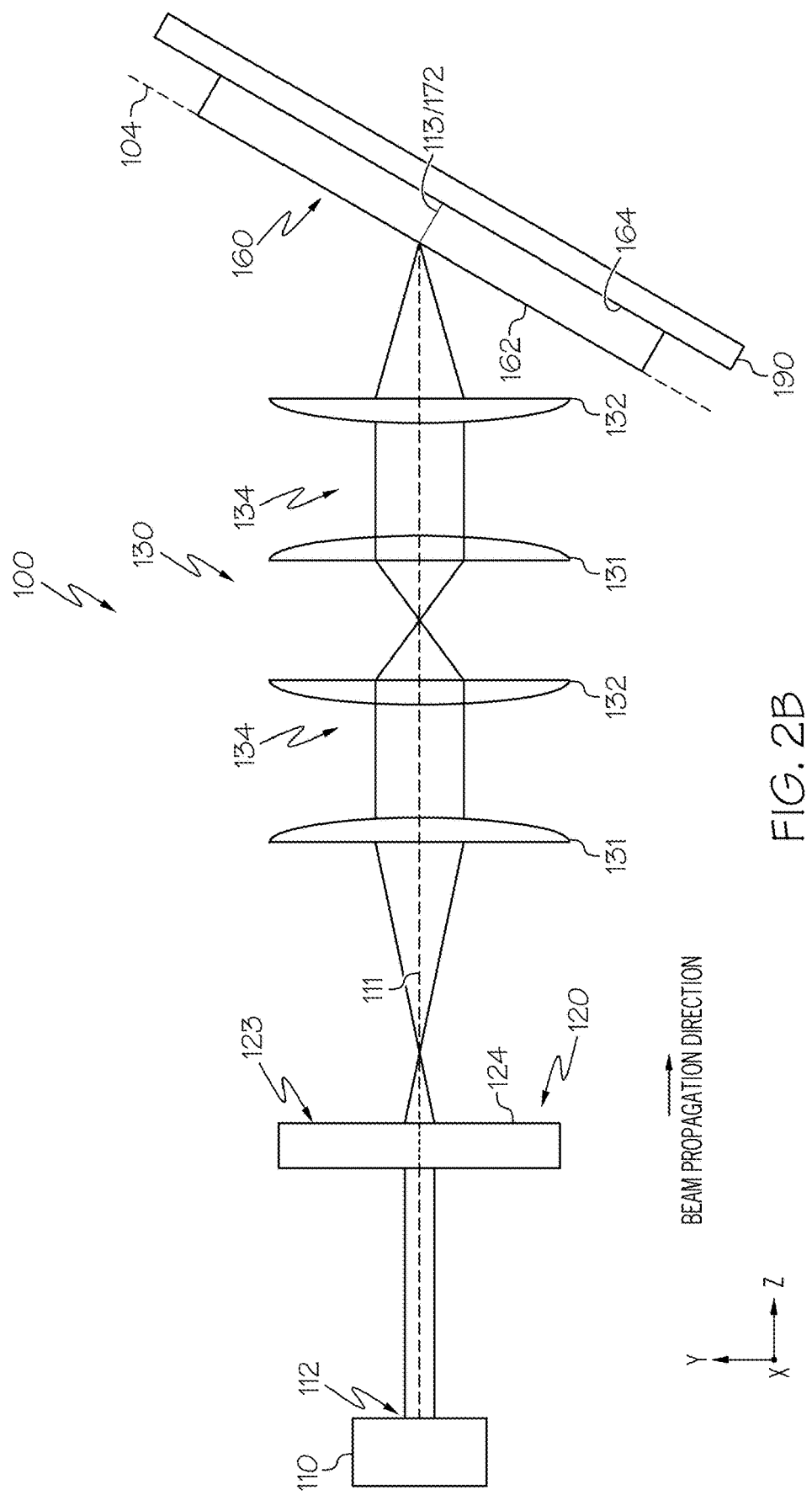
FIG. 2B schematically depicts an optical assembly for laser processing a transparent workpiece including a beam source, a static phase-altering optical element and a lens assembly according to one or more embodiments described herein.

Referring now to FIGS. 2A and 2B, an optical assembly 100 for producing the laser beam 112 that is phase modified such that it forms the laser beam focal line 113 having an internal beam angle $\theta_{bi}$ greater than 10° in the transparent workpiece 160 and having a quasi-non-diffracting character in the transparent workpiece 160 using the phase-altering optical element 120 is schematically depicted. The optical assembly 100 includes the beam source 110 that outputs the laser beam 112, the phase-altering optical element 120, and, in some embodiments, a lens assembly 130. The beam source 110 may comprise any known or yet to be developed beam source 110 configured to output laser beams 112, for example, pulsed laser beams or continuous wave laser beams. In some embodiments, the beam source 110 may output a laser beam 112 comprising a wavelength of, for example, 1064 nm, 1030 nm, 532 nm, 530 nm, 355 nm, 343 nm, or 266 nm, or 215 nm. The laser beam 112 used to form defects 172 in the transparent workpiece 160 may be well suited for materials that are transparent to the selected laser wavelength and the transparent workpiece 160 may be positioned such that the laser beam 112 output by the beam source 110 irradiates the transparent workpiece 160, for example, after impinging the phase-altering optical element 120 and thereafter, the lens assembly 130. Further, the beam pathway 111 may extend from the beam source 110 to the transparent workpiece 160 such that when the beam source 110 outputs the laser beam 112, laser beam traverses (or propagates along) the beam pathway 111.

In the embodiment depicted in FIGS. 2A and 2B, the lens assembly 130 comprises two sets of lenses, each set comprising the first lens 131 positioned upstream the second lens 132. The first lens 131 may collimate the laser beam 112 within a collimation space 134 between the first lens 131 and the second lens 132 and the second lens 132 may focus the laser beam 112. Further, the most downstream positioned second lens 132 of the lens assembly 130 may focus the laser beam 112 into the transparent workpiece 160, which may be positioned at an imaging plane 104 of this second lens 132. In some embodiments, the first lens 131 and the second lens 132 each comprise plano-convex lenses. When the first lens 131 and the second lens 132 each comprise plano-convex lenses, the curvature of the first lens 131 and the second lens 132 may each be oriented toward the collimation space 134. In other embodiments, the first lens 131 may comprise other collimating lenses and the second lens 132 may comprise a meniscus lens, an asphere, or another higher-order corrected focusing lens. In operation, the lens assembly 130 may control the position of the laser beam focal line 113 along the beam pathway 111. Further, the lens assembly 130 may comprise an 8F lens assembly, as depicted in FIGS. 2A and 2B, a 4F lens assembly comprising a single set of first and second lenses 131, 132, or any other known or yet to be developed lens assembly 130 for focusing the laser beam 112 into the laser beam focal line 113. Moreover, it should be understood that some embodiments may not include the lens assembly 130 and instead, the phase-altering optical element 120 may focus the laser beam 112 into the laser beam focal line 113.

Referring still to FIGS. 2A and 2B, the phase-altering optical element 120 is positioned within the beam pathway 111 between the beam source 110 and the transparent workpiece 160, in particular, between the beam source 110 and the lens assembly 130 such that the laser beam 112 impinges the phase-altering optical element 120 before the laser beam 112 is focused into the laser beam focal line 113 and directed into the transparent workpiece 160. In some embodiments, as shown in FIG. 2A, the beam source 110 is positioned such that the beam pathway 111 is redirected by the phase-altering optical element 120 and the laser beam 112 reflects off the phase-altering optical element 120 when the laser beam 112 impinges the phase-altering optical element 120. In this embodiment, the phase-altering optical element 120 may comprise an adaptive phase-altering optical element 122, such as a spatial light modulator, a deformable mirror, an adaptive phase plate, or any other optical element configured to actively alter a change in phase applied by the optical element to the laser beam 112. In other embodiments, as shown in FIG. 2B, the beam source is 110 is positioned such that the beam pathway 111 extends through the phase-altering optical element 120 and the laser beam 112 traverses the phase-altering optical element 120 when the laser beam 112 impinges the phase-altering optical element 120. In this embodiment, the phase-altering optical element 120 may comprise a static phase-altering optical element 123, such as an aspheric optical element or a static phase plate. One aspheric optical element used in embodiments described herein is an oblong axicon 124. Thus, in some embodiments, the phase-altering optical element 120 is a refractive optical element and in other embodiments, the phase-altering optical element 120 is a reflective optical element.

In operation, impinging the laser beam 112 on the phase-altering optical element 120 alters the phase of the laser beam 112 and when directed into the transparent workpiece 160 at a beam propagation angle $\theta_{bp}$, a portion of the laser beam 112 comprising the laser beam focal line 113 within the transparent workpiece 160 comprises an internal beam angle $\theta_{bi}$ of greater than 10° and comprises a quasi-non-diffracting character within the transparent workpiece 160. For example, the internal beam angle $\theta_{bi}$ may be from 10° to 40°, such as 10° to 35°, 15° to 35°, 20° to 35°, or the like, for example, 11°, 12°, 13°, 14°, 15°, 16°, 17°, 18°, 19°, 20°, 21°, 22°, 23°, 24°, 25°, 26°, 27°, 28°, 29°, 30°, 31°, 32°, 33°, 34°, 35°, 36°, 37°, 38°, 39°, or the like.

While not intending to be limited by theory, after the laser beam 112 has been phase modified by the phase-altering optical element 120, the laser beam 112 is aberrated when the laser beam is upstream the transparent workpiece 160, such as when the laser beam is in free space, and the laser beam is aberrated when the laser beam is incident the impingement surface of the transparent workpiece 160, and once refracted at the impingement surface 162 of the transparent workpiece 160 exhibits a quasi-non-diffracting character and thus has minimal to no aberrations within the transparent workpiece 160. While still not intending to be limited by theory, the conversion from an aberrated beam to a non-aberrated beam at the impingement surface 162 of the transparent workpiece 160 is accompanied by an increase in Rayleigh range, which may increase with increasing deviation of the angle of incidence (i.e., the beam propagation angle $\theta_{bp}$). While still not intending to be limited by theory, the laser beam 112 comprises a higher Rayleigh range within the transparent workpiece 160 than in free space or in positions upstream or incident to the impingement surface 162. For example, the Rayleigh range of the laser beam 112 within the transparent workpiece 160 may be 10 to 1000 times greater than the Rayleigh range outside (e.g. upstream) the transparent workpiece 160. As a non-limiting example, after phase modification, the laser beam 112 outside (e.g. upstream) the transparent workpiece 160 may comprise a Rayleigh range of 30 µm and the Rayleigh range of the laser beam 112 within the transparent workpiece 160 may be 1 mm. Indeed, in embodiments described herein, the laser beam 112 is refracted at the impingement surface 162 of the transparent workpiece 160 and the refracting increases the dimensionless divergence factor $F_D$ of a Rayleigh range $Z_R$ of the laser beam 112 by a factor of at least 10, for example, from 10 to 1000, from 10 to 500 from 10 to 100, or the like.

Moreover, while the laser beam focal lines 113 depicted in the figures extend from the impingement surface 162 to the opposite surface 164, this merely illustrates one possible disposition of the laser beam focal line 113 in and near the transparent workpiece 160. In particular, it should be understood that a portion of the laser beam focal line 113 may extend outside of the transparent workpiece 160, for example, above (upstream) the impingement surface 162, beyond (downstream) the opposite surface 164, beyond the edge surface 166, or combinations thereof. Further, when a portion of the laser beam focal line 113 extends outside of the transparent workpiece 160, that external portion of the laser beam focal line 113 comprises an external focal line angle which, due to Snell's law, is greater than the internal beam angle $\theta_{bi}$. Moreover, it should be understood that the laser beam focal line 113 may start at a location within the transparent workpiece 160 (e.g., between the impingement surface 162 and the opposite surface 164) and end at a location within the transparent workpiece 160 (e.g., between the impingement surface 162 and the opposite surface 164).

Figure 3A:
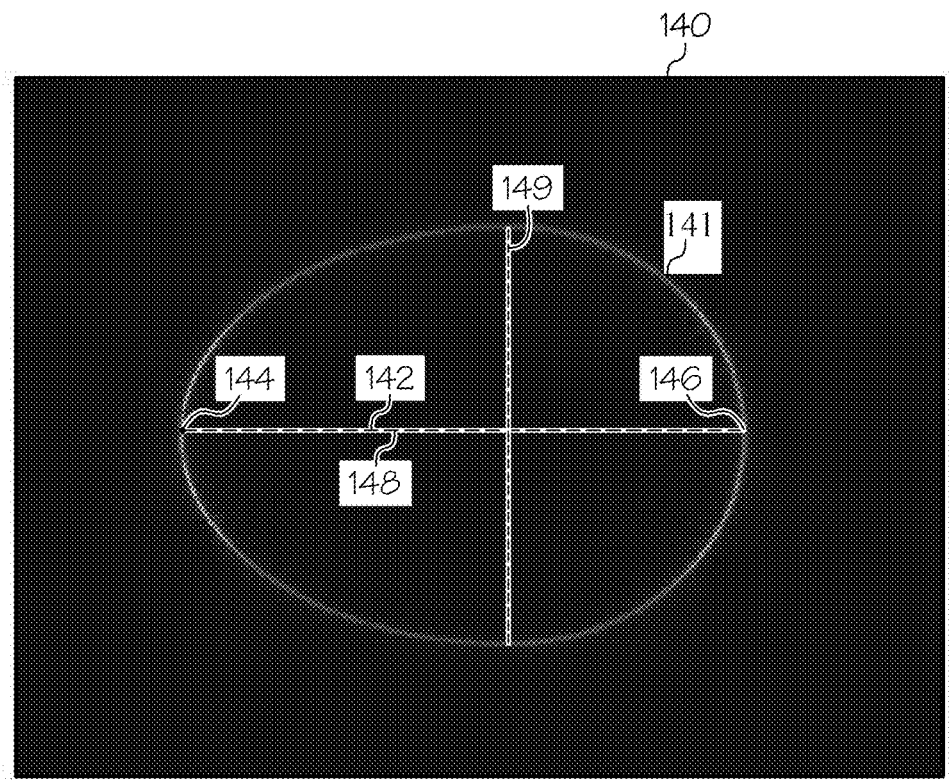
FIG. 3A schematically depicts an oblong angular spectrum of a laser beam after phase-altering the laser beam, according to one or more embodiments described herein.

Referring also to FIG. 3A, an example of a phase alteration applied by the phase-altering optical element 120 to the laser beam 112 to insure that the laser beam focal line 113 exhibits a quasi-non-diffracting character at an internal beam angle $\theta_{bi}$ greater than or equal to 10° is shown by the angular spectrum 140 of the laser beam 112 after the laser beam 112 is refracted or reflected by the phase-altering optical element 120. In particular, in the embodiment shown in FIG. 3A, the angular spectrum 140 of the laser beam 112 upstream and/or incident the impingement surface 162 (such as in free space) after a phase alteration is applied to the laser beam by the phase-altering optical element 120 comprises an oblong angular spectrum 141 comprising an axis of symmetry 142 extending from a first axis end 144 having a first radius of curvature to a second axis end 146 having a second radius of curvature. Further, the first radius of curvature (i.e., the radius of curvature at the first axis end 144) is different than the second radius of curvature (i.e., the radius of curvature at the second axis end 146). In other words, the shape of the oblong angular spectrum 141 is the combination of two different ellipses (or ovals) differing in curvature and is colloquially referred to herein as an "egg shape." In addition, the oblong angular spectrum 141 includes a major axis 148 (sometimes referred to as a "long axis") and a minor axis 149 (sometimes referred to as a "short axis"), where the major axis 148 is coincident with the axis of symmetry 142.

Figure 3B:
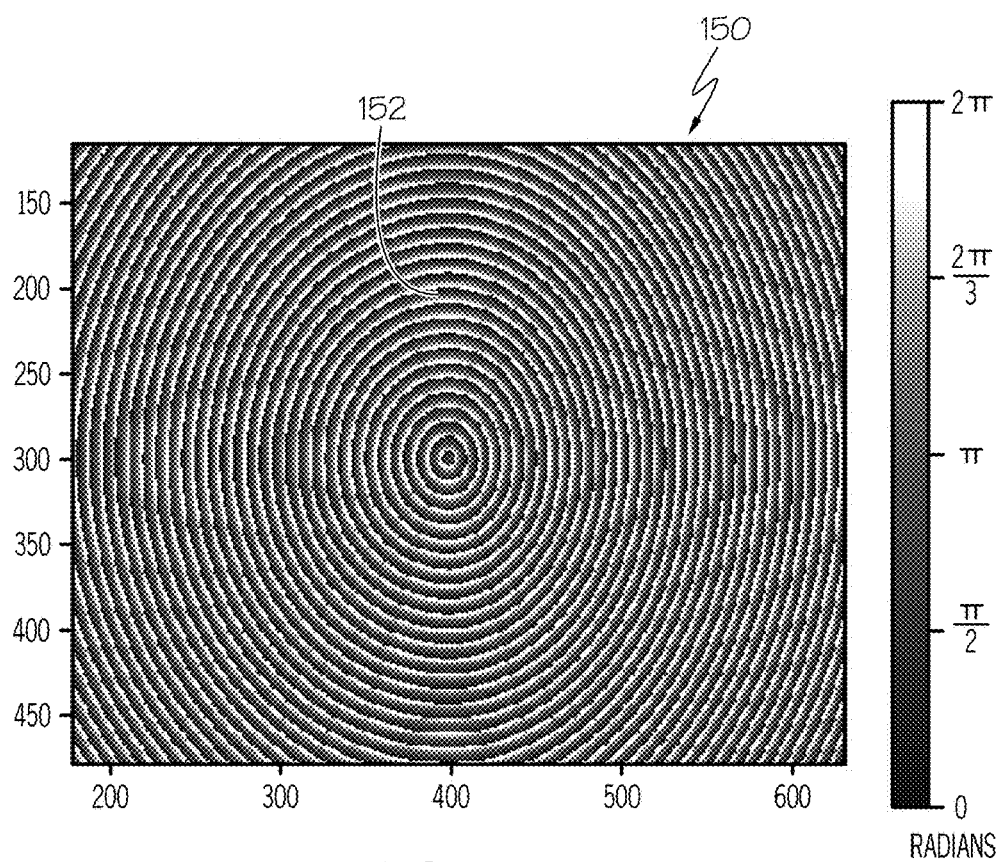
FIG. 3B schematically depicts a phase mask used to phase alter the laser beam of FIG. 3A, according to one or more embodiments described herein.

FIG. 3B depicts a phase mask 150 that may be used by the adaptive phase-altering optical element 122 to phase alter the laser beam 112 such that the laser beam 112 comprises the oblong angular spectrum 141. As shown in FIG. 3B, the phase mask 150 of the laser beam 112 comprises a plurality of phase rings 152 each inducing a phase shift extending from 0 to $2\pi$. Further, each phase ring 152 comprises an oblong shape similar to the oblong angular spectrum 141. Indeed, each phase ring 152 comprises an axis of symmetry extending from a first axis end having a first radius of curvature to a second axis end having a second radius of curvature, where the first radius of curvature is different than the second radius of curvature. However, unlike the oblong angular spectrum 141, the minor axis of each phase ring 152 of the phase mask 150 is coincident with the axis of symmetry of each phase ring 152, instead of the major axis.

Without intending to be limited by theory, the oblong angular spectrum 141 depicted in FIG. 3A is indicative of the particular phase alteration applied to the laser beam 112 to facilitate the formation of a laser beam focal line 113 that exhibits quasi-non-diffracting character within the transparent workpiece 160 after the laser beam 112 is directed at a high beam propagation angle $\theta_{bi}$ into an impingement surface 162, which is planar. The oblong angular spectrum 141 is shaped such that, when the laser beam 112 (e.g., the laser beam focal line 113) is refracted at the impingement surface 162 (e.g., at the air-glass interface formed at the impingement surface 162), the laser beam 112 within the transparent workpiece 160 (e.g., the laser beam focal line 113) comprises a circular or approximately circular angular spectrum. That is, refraction of the laser beam 112 having the oblong angular spectrum 141 at the impingement surface 162 transforms the angular spectrum of the laser beam 112 to a less oblong, more circular shape. For example, in some embodiments, the laser beam 112 within the transparent workpiece (e.g., the laser beam focal line 113) may have an angular spectrum that has a first radius of curvature and a second radius of curvature, similar to the oblong angular spectrum 141; however the angular spectrum of the laser beam 112 within the transparent workpiece 160 is more circular (e.g., less oblong) than the oblong angular spectrum 141 such that a difference between the first radius of curvature and the second radius of curvature of the angular spectrum of the laser beam 112 within the transparent workpiece 160 is less than a difference between the first radius of curvature and the second radius of curvature of the oblong angular spectrum 141 of the laser beam incident the impingement surface 162 of the transparent workpiece 160.

Referring again to FIG. 2A, in some embodiments, the phase-altering optical element 120 may comprise an adaptive phase-altering optical element 122 which applies a phase alteration to the laser beam 112. The adaptive phase-altering optical element 122 may be communicatively coupled to a controller 121, for example, using one or more communications pathways 105, which may comprise any pathway for providing power signals, control signals, or the like, such as optical fiber, electrical wire, wireless protocols, or the like. In operation, the controller 121 may provide control signals to the adaptive phase-altering optical element 122 to control the specific phase alteration (e.g., modulation, phase mask, or the like) applied by the adaptive phase-altering optical element 122, such that the adaptive phase-altering optical element 122 applies a specific phase alteration to the laser beam 112, for example, based on a phase function.

In some embodiments, the adaptive phase-altering optical element 122 comprises a spatial light modulator, which is a transmissive or reflective device that may spatially modulate the amplitude and/or the phase of a laser beam 112 in at least one dimension, for example, using a phase mask, such as the phase mask 150 of FIG. 3B. In operation, the spatial light modulator may apply a selective, configurable phase alteration to the laser beam based on control signals from the controller 121. In some embodiments, the adaptive phase-altering optical element 122 comprises a deformable mirror, which is a mirror whose surface can be deformed in response to control signals, such as control signals from the controller 121, to alter the wavefront of the laser beam 112, which may alter the phase of the laser beam 112. For example, a deformable mirror may be configured to apply a phase mask, such as the phase mask 150. Further, in some embodiments, the adaptive phase-altering optical element 122 comprises an adaptive phase plate, which is a phase plate (or phase plate assembly) that can apply selective and controllable phase alteration to the laser beam 112 in response to control signals, such as control signals from the controller 121. For example, the adaptive phase plate may be two or more phase plates moveable relative to one another (based on control signals from the controller 121) to alter the phase change they apply to the laser beam 112 based on their relative positioning.

Figure 4A:
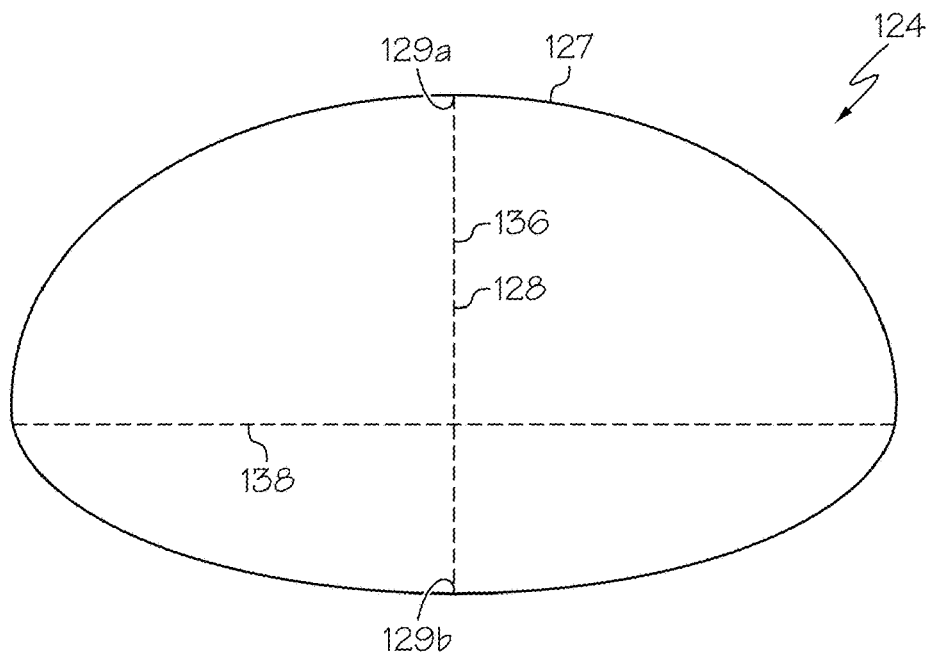
FIG. 4A schematically depicts a top view of an oblong axicon, according to one or more embodiments described herein.
Figure 4B:
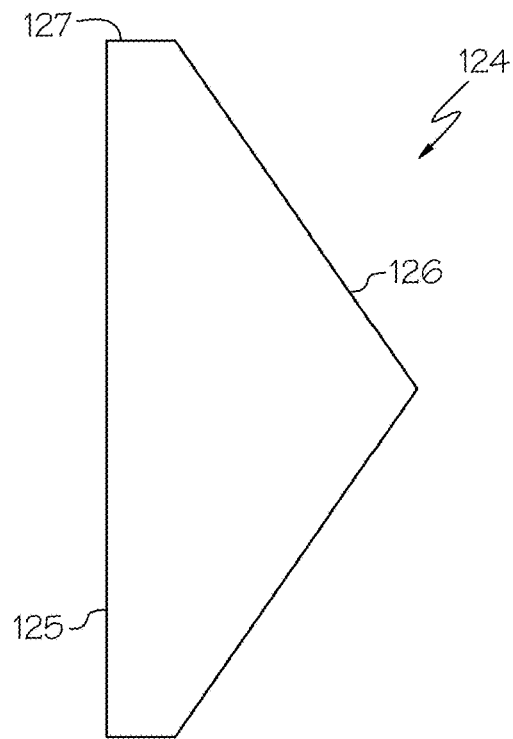
FIG. 4B schematically depicts a side view of the oblong axicon of FIG. 4A, according to one or more embodiments described herein.

As shown in FIG. 2B, in some embodiments, the phase-altering optical element 120 comprises a static phase-altering optical element 123, such as an oblong axicon 124, which is depicted in more detail in FIGS. 4A and 4B. In particular, FIG. 4A depicts a front view of the oblong axicon 124 and FIG. 4B shows a side view of the oblong axicon 124. The oblong axicon 124 comprises a base portion 125 and a conical portion 126 extending from the base portion 125. The base portion 125 comprises an oblong perimeter 127 having an axis of symmetry 128 extending from a first axis end 129a to a second axis end 129b. At the first axis end 129a, the oblong perimeter 127 comprises a first radius of curvature and at the second axis end 129b, the oblong perimeter 127 comprises a second radius of curvature, which is different from the first radius of curvature. In addition, the oblong axicon 124 comprises a major axis 138 and a minor axis 136. In operation, when the laser beam 112 traverses the oblong axicon 124, the phase alteration applied to the laser beam 112 results in the laser beam 112 comprising the oblong angular spectrum 141. Moreover, as depicted in FIGS. 3A and 4A, the shape of the oblong perimeter 127 of the oblong axicon 124 corresponds with the oblong angular spectrum 141. However, unlike the oblong angular spectrum 141, the minor axis 136 of the oblong perimeter 127, instead of the major axis 138, is coincident with the axis of symmetry 128 of the oblong perimeter 127 of the oblong axicon 124. While a single phase-altering optical element 120 is depicted in FIGS. 2A and 2B, other embodiments may comprise multiple phase-altering optical elements 120, for example, one phase-altering optical element configured to transform the laser beam into a quasi-non-diffracting beam and another phase-altering optical element configured to form the oblong angular spectrum 141.

While not intending to be limited by theory, it should be understood that Snell's law imposes some limitations on the maximum internal beam angle $\theta_{bi}$ of the laser beam focal line 113 formed using the above described techniques. Snell's law is mathematically defined as $$\theta_2 = \sin^{-1}\left(\frac{n_1 \sin\theta_1}{n_2}\right)$$

where $\theta_1$ is the angle of an incident light ray in a first medium (e.g., air), $\theta_2$ is the angle of the ray in a second medium (e.g., the transparent workpiece 160), $n_1$ is the index of refraction of the first medium (e.g., air, which comprises an index of refraction of about 1), and $n_2$ is the index of refraction of the second medium (e.g., the transparent workpiece 160, which may comprise about 1.45 in embodiments in which the transparent workpiece 160 comprises glass). The angles $\theta_1$ and $\theta_2$ are measured relative to the normal to the surface of incidence of the light ray. Snell's law provides a fundamental limit on the angle of light (e.g. internal beam angle $\theta_{bi}$) that can be achieved within the transparent workpiece 160. This limit is the critical angle of the transparent workpiece 160. It should be understood that, for a transparent workpiece 160 comprising another material besides glass, the critical angle would vary based on the index of refraction of that particular material.

When the transparent workpiece 160 comprises glass having an index of refraction of 1.45, the critical angle is about 43.6°. The critical angle is also the internal angle a light ray would take if it contacted the glass with an almost 90° incidence. Thus, Snell's Law limits the internal beam angle $\theta_{bi}$ of the laser beam focal line 113. Furthermore, as depicted in FIG. 1C, the laser beam 112 comprises a cone shape when it impinges the impingement surface 162 of the transparent workpiece 160, as the laser beam 112 comprises the maximum beam propagation angle $\theta_{bmax}$ and the minimum beam propagation angle $\theta_{bmin}$. In some embodiments, the difference between the maximum beam propagation angle $\theta_{bmax}$ and the minimum beam propagation angle $\theta_{bmin}$ (i.e., a cone angle) is a range of 5° to 20°. As an example, if the laser beam 112 impinges the impingement surface 162 of the transparent workpiece 160 with a cone angle of 10°, the maximum internal beam angle $\theta_{bi}$ of the laser beam focal line 113 inside the transparent workpiece 160 would be 33.6°, assuming light could be incident to the transparent workpiece 160 up to 90°.

Figure 5A:
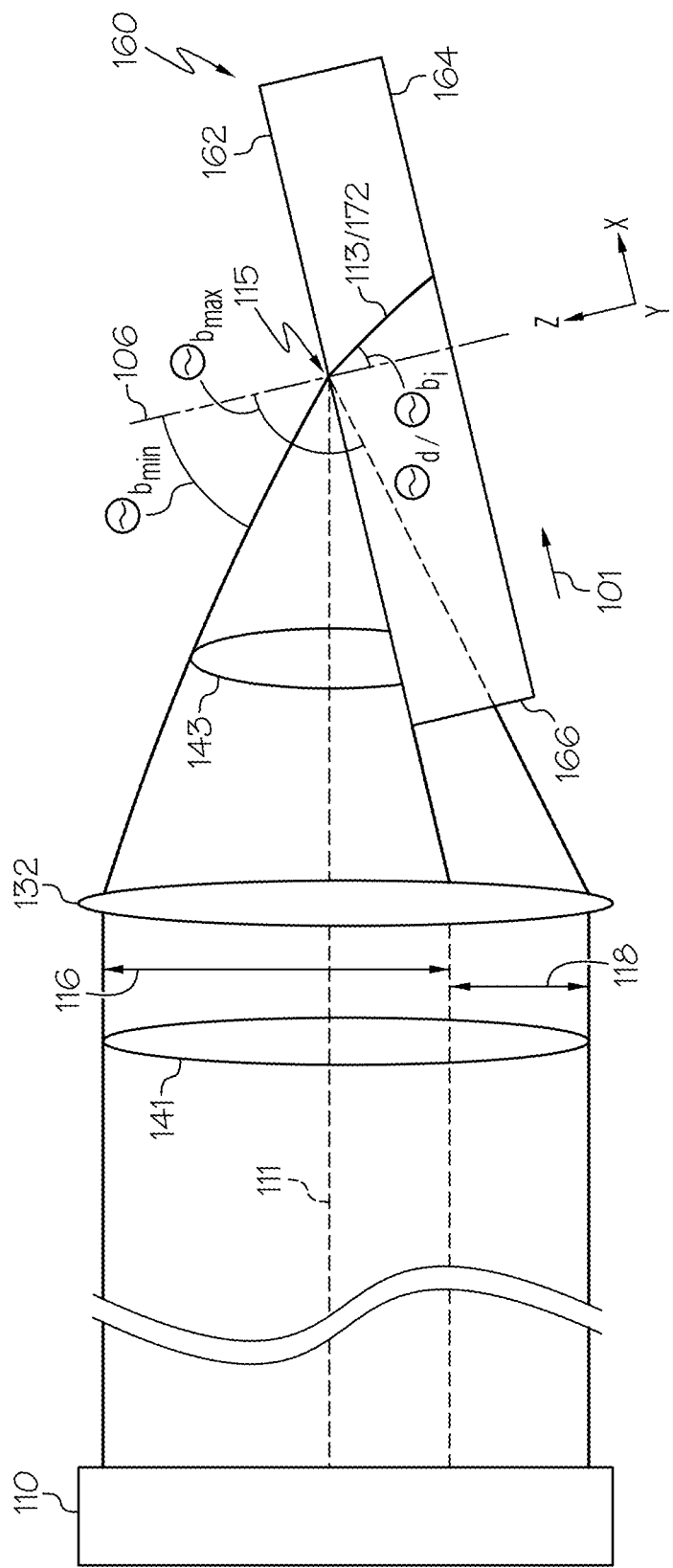
FIG. 5A schematically depicts a side view of an embodiments of laser forming the contour of defects, each having a defect angle, where the optical assembly is disposed such that a portion of the laser beam impinges an edge surface of the transparent workpiece, according to one or more embodiments described herein.
Figures 2, 5A:
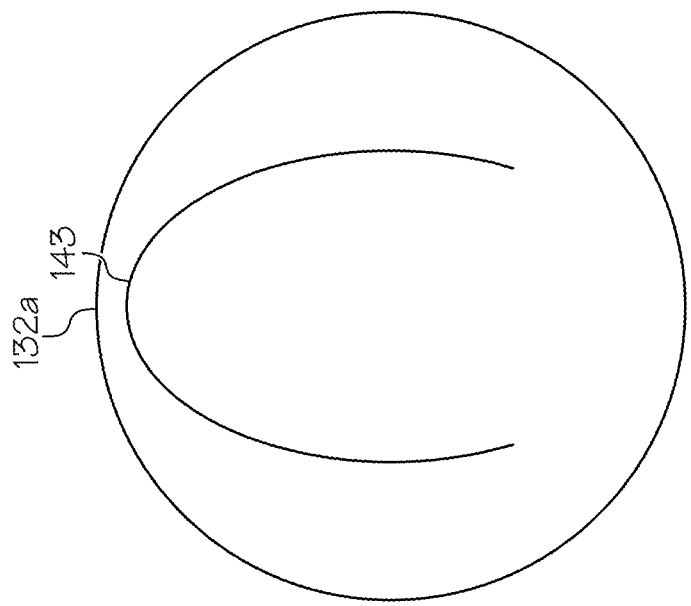
Figures 1, 5A:
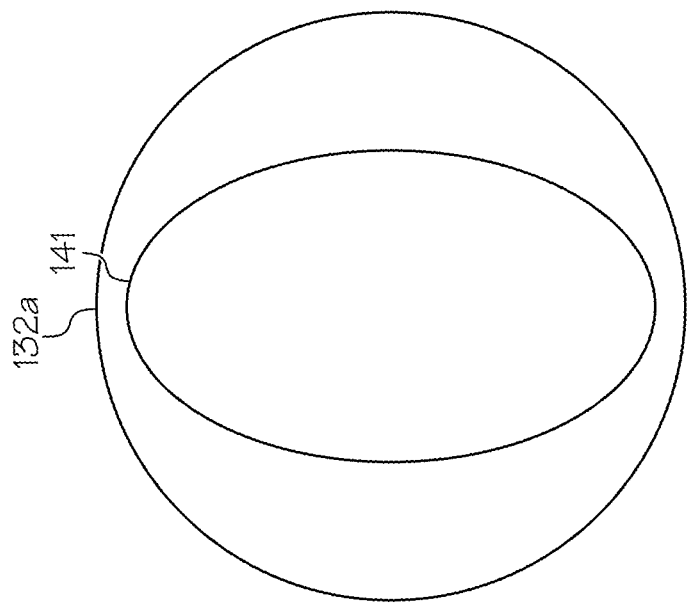
Figure 5B:
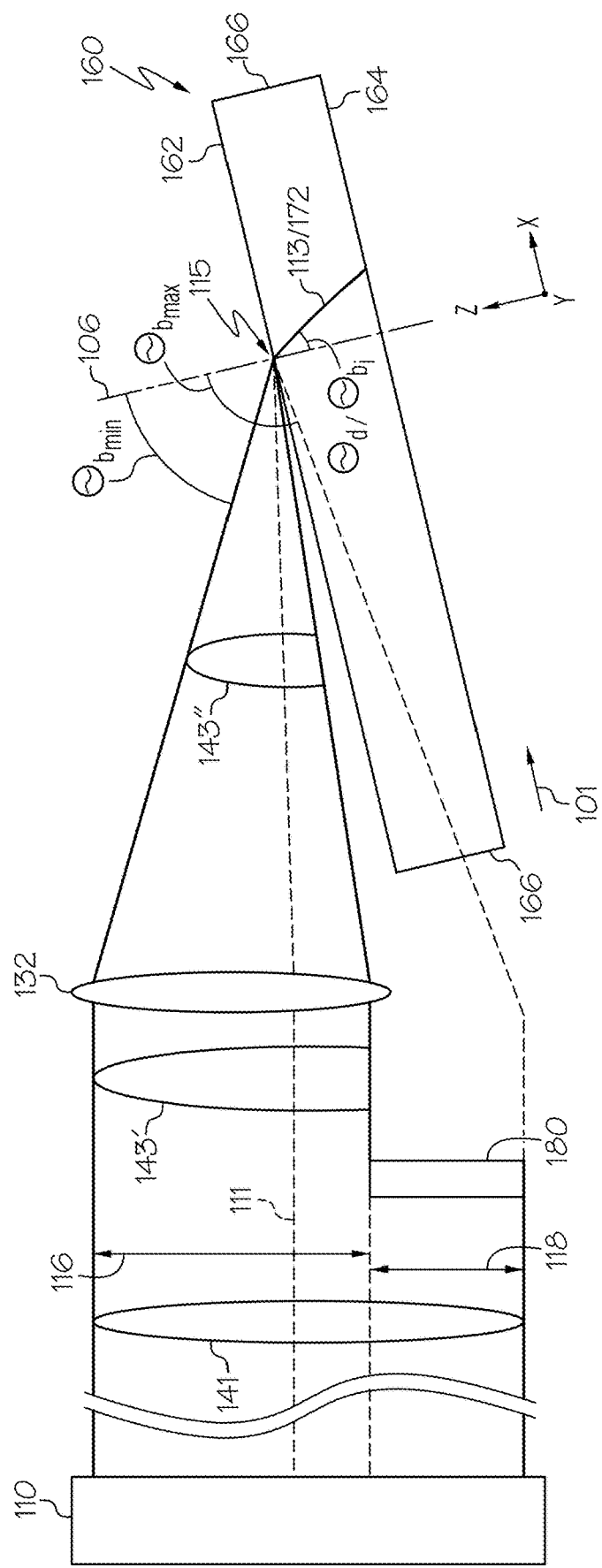
FIG. 5B schematically depicts a side view of an embodiment of laser forming the contour of defects, each having a defect angle, in the transparent workpiece the embodiment including an obstructive optical element, according to one or more embodiments described herein.
Figures 2, 5B:
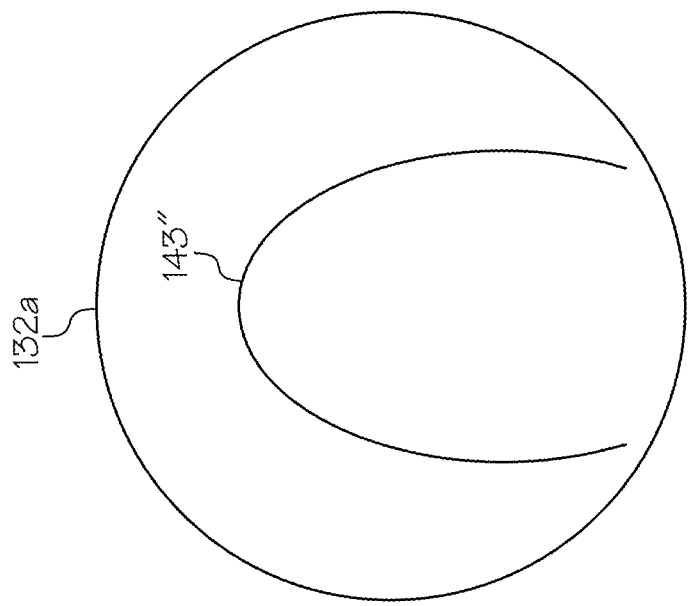
Figures 1, 5B:
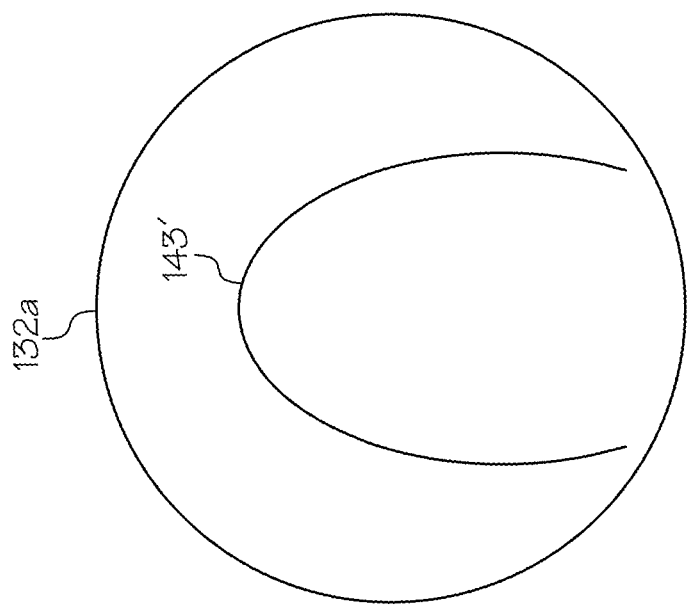

Referring now to FIGS. 5A and 5B, in some embodiments, the beam propagation angle $\theta_{bp}$ is such that at least a portion of the light rays of the laser beam 112 approaching the transparent workpiece 160 (e.g., approaching the impingement surface 162) comprise an angle relative the orthogonal plane 106 (e.g., a ray propagation angle) that is greater than 90°. As depicted in FIGS. 5A and 5B, the laser beam 112 comprises a first set of light rays 116 and a second set of light rays 118 that, after impinging the phase-altering optical element 120 (FIGS. 2A and 2B) collectively comprise the oblong angular spectrum 141. The first set of light rays 116 include at least one ray having a ray propagation angle that is equal to the minimum beam propagation angle % min and the second set of light rays 118 include at least one ray having a ray propagation angle that is equal to the maximum beam propagation angle $\theta_{bmax}$, which is greater than 90°. In operation, the first set of light rays 116 impinge the impingement surface 162 at one or more ray propagation angles that are each less than or equal to 90° relative to the orthogonal plane 106, for example, less than or equal to 85°, 80°, 75°, 70°, 65°, 60°, 55°, 50°, 45°, 40°, 35°, 30°, 25°, 20°, 15°, or the like, and combinations and sub-combinations thereof In some embodiments, light rays of the laser beam 112 with a ray propagation angle greater than 90° (i.e., the second set of light rays 118) may impinge the edge surface 166 of the transparent workpiece 160 (as shown in FIG. 5A), impinge the opposite surface 164 of the transparent workpiece 160, miss the transparent workpiece 160 entirely, or a combination thereof. In some embodiments, the light rays of the laser beam 112 with a ray propagation angle greater than 90° (i.e., the second set of light rays 118) may be obstructed (e.g., blocked, diffracted, reflected, or the like) by an obstructive optical element 180 disposed in the beam pathway 111.

Thus, in the embodiments depicted in both FIGS. 5A and 5B, only a portion of the oblong angular spectrum 141 (i.e., the portion formed by the first set of light rays 116) is directed into the impingement surface 162. In particular, in the embodiments depicted in both FIGS. 5A and 5B, the second set of light rays 118 is obstructed (by the transparent workpiece 160 in FIG. 5A or by the obstructive optical element 180 in FIG. 5B) or otherwise miss the transparent workpiece 160. Because the second set of light rays 118 are obstructed, the laser beam 112 formed by first set of light rays 116 at some or all positions along the beam pathway 111 between the lens 132 and the impingement surface 162 and/or incident the impingement surface 162 comprises an interrupted oblong angular spectrum 143, 143', 143".

As one example, FIG. 5A-1 schematically depicts the oblong angular spectrum 141 of the laser beam 112 of FIG. 5A after phase-altering the laser beam 112 and before the second set of light rays 118 impinge the edge surface 166 of the transparent workpiece 160 and FIG. 5A-2 schematically depicts the interrupted oblong angular spectrum 143 of the laser beam 112 of FIG. 5A after the second set of light rays 118 impinge the edge surface 166 of the transparent workpiece 160. As another example, FIG. 5B-1 and FIG. 5B-2 each schematically depict an interrupted oblong angular spectrum 143', 143" of the laser beam 112 of FIG. 5B, after phase-altering the laser beam 112 and obstructing the laser beam 112 using the obstructive optical element 180. In particular, FIG. 5B-1 depicts the interrupted oblong angular spectrum 143' before focusing the laser beam 112 into the laser beam focal line 113 and FIG. 5B-2 depicts the interrupted oblong angular spectrum 143" while focusing the laser beam 112 into the laser beam focal line 113.

Referring still to FIGS. 5A-1, 5A-2, 5B-1, and 5B-2, the oblong angular spectrum 141 and the interrupted oblong angular spectrum 143, 143', 143" are each schematically depicted relative to a numerical aperture 132a of the lens 132. In some embodiments, the interrupted oblong angular spectrum 143, 143', 143" may be formed by aligning the beam pathway 111 and the lens 132 relative to each other such that the second set of light rays 118 are outside the numerical aperture 132a of the lens 132. For example, in the embodiment depicted in FIG. 5B, the misalignment between the beam pathway 111 and the lens 132 (i.e., the beam pathway 111 does not traverse the center of the lens 132) is such the second set of light rays 118 would be outside the numerical aperture 132a of the lens 132 if the obstructive optical element 180 were removed. In this embodiment, the interrupted oblong angular spectrum 143', 143" would still be formed downstream the lens 132.

Referring again to FIGS. 5A through 5B-2, the laser beam 112 comprising the interrupted oblong angular spectrum 143, 143', 143" may be used to form defects 172 with defect angles $\theta_d$ greater than 10°, similar to embodiments of the laser beam 112 comprising the oblong angular spectrum 141, described above. Indeed, the laser beam 112 comprising the interrupted oblong angular spectrum 143, 143', 143" may be used to form defects 172 with defect angles $\theta_d$ greater than the critical angle minus the cone angle, for example, greater than 33.6° in embodiments comprising a transparent workpiece 160 with a refractive index of 1.45 (and thus a critical angle of 43.6°) and a laser beam 112 focused with a cone angle of 10°. Further, the interrupted oblong angular spectrum 143, 143', 143" is shaped such that, when the laser beam 112 (e.g., the laser beam focal line 113) is refracted at the impingement surface 162 (e.g., at the air-glass interface formed at the impingement surface 162), the laser beam 112 within the transparent workpiece 160 (e.g., the laser beam focal line 113) comprises an interrupted circular angular spectrum. While the resulting beam having the interrupted oblong angular spectrum 143, 143', 143" may form an elliptical beam spot on the impingement surface 162, the laser beam focal line 113 formed in the transparent workpiece 160 comprises an internal beam angle $\theta_{bi}$ that is greater than 10° and exhibits a quasi-non-diffracting character. Furthermore, in some embodiments, it may be advantageous to form the interrupted oblong angular spectrum 143, 143', 143" using the embodiment of FIG. 5B to prevent contact between the lens 132 and the transparent workpiece 160 when the laser beam 112 and the transparent workpiece 160 are moved relative to each other such that the laser beam focal line 113 travels along the impingement surface 162 in the translation direction 101. By obstructing the second set of light rays 118 using the obstructive optical element 180, the lens 132 may be sized and positioned such that the lens 132 remains spaced apart from the impingement surface 162 during laser processing of the transparent workpiece 160.

While not intending to be limited by theory, some reflection of the laser beam 112 may occur at the impingement surface 162 of the transparent workpiece 160. For example, the reflection of a light ray impinging the impingement surface 162 at 90° relative to normal the impingement location 115 will be 100% for both S-polarization and P-polarization and the reflection of a light ray impinging the impingement surface 162 at angles less than 90 degrees relative to normal the impingement location 115 will be less than 100% of S-polarization and P-polarization. While the laser beam 112 may comprise P-polarized light or S-polarized light, P-polarized light may reduce loss due to reflection. For example, at 85 degrees, the reflectance for S-polarized light is 73%, and reflectance for P-polarized light is 49%. In operation, the beam source 110, the phase-altering optical element 120, or an additional optical component, such as a polarizer, may be used to S-polarize or P-polarize the laser beam 112. While still not intending to be limited by theory, if the magnitude of light intensity around the angular spectrum of the laser beam focal line 113 within the transparent workpiece 160 is non-uniform, the laser beam focal line 113 retains a circular angular spectrum and a quasi-non-diffracting character within the transparent workpiece 160. However, non-uniform magnitude of light intensity around the angular spectrum of the laser beam focal line 113 within the transparent workpiece 160 caused by reflection may be compensated for by launching the laser beam 112 (i.e., launching the laser beam 112 from the beam source 110) with a non-uniform intensity, where the non-uniform intensity is configured to become uniform around the angular spectrum once the light is refracted at the impingement surface 162 and enters the transparent workpiece 160. Example non-uniform intensity beams that may be used (and then converted into a quasi-non-diffracting beam with an oblong or otherwise non-uniform angular spectrum by the phase-altering optical element 120) include an elliptical-Gaussian beam, a top hat beam, or another beam having an arbitrary intensity profile.

Referring now to FIGS. 1A through 5B-2, laser beams 112 comprising the oblong angular spectrum 141 or the interrupted oblong angular spectrum 143, 143', 143" may be used to form high angle defects 172 in the transparent workpiece 160 when the impingement surface 162 comprises a planar topography. However, in other embodiments, the impingement surface 162 may comprise a non-planar topography, such as a surface having a curved topography, a jagged topography, or an arbitrary, non-planar topography. When the impingement surface 162 comprises a non-planar topography, the phase-altering optical element 120 may apply a phase alteration to the laser beam 112 such that the laser beam 112 upstream and/or incident the impingement surface 162 (such as in free space) comprises a non-circular angular spectrum corresponding with the non-planar topography such that the portion of the laser beam focal line 113 within the transparent workpiece comprises a circular angular spectrum (or a non-circular angular spectrum that is more circular than the non-circular angular spectrum of the laser beam 112 incident the impingement surface 162) and exhibits a quasi-non-diffracting character.

As one example, when the impingement surface 162 is a consistent, non-planar surface (such as a consistent, curved surface) the phase alteration may be applied by the adaptive phase-altering optical element 122 or the static phase-altering optical element 123. For example, the phase alteration may be applied by a static phase-altering optical element 123 comprising a non-circular axicon having a base portion and a conical portion extending from the base portion, where the base portion comprises a non-circular perimeter such that the phase alteration applied to the laser beam 112 by the non-circular axicon forms a non-circular angular spectrum corresponding with the consistent, curved topography of the impingement surface 162 such that the portion of the laser beam focal line 113 within the transparent workpiece 160 comprises a circular angular spectrum (or a non-circular angular spectrum that is more circular than the non-circular angular spectrum of the laser beam 112 incident the impingement surface 162) and exhibits a quasi-non-diffracting character.

In some embodiments, the impingement surface 162 comprises a non-planar topography that is not consistent. For example, the impingement surface 162 may comprise a "variable topography," which, as used herein, refers to a surface having at least two local topographies that comprise an angular difference of ±10% or more, where "local topography" refers to the shape of a surface of the transparent workpiece 160, such as the impingement surface 162, at a specific location on the surface. When the impingement surface 162 comprises a variable topography, the adaptive phase-altering optical element 122 may apply a phase alteration to the laser beam 112 such that the laser beam 112 upstream and/or incident the impingement surface 162 (such as in free space) comprises an arbitrary non-circular angular spectrum corresponding with the local topography at the impingement location 115 such that the portion of the laser beam focal line 113 within the transparent workpiece 160 comprises a circular angular spectrum (or a non-circular angular spectrum that is more circular than the non-circular angular spectrum of the laser beam 112 incident the impingement surface 162) and exhibits a quasi-non-diffracting character. In particular, the controller 121 may provide control signals to the adaptive phase-altering optical element 122 to apply a phase alteration to the laser beam 112, such that the laser beam 112 comprises a non-circular angular spectrum. Moreover, the controller 121 may apply different phase functions over time to the adaptive phase-altering optical element 122. In particular, the controller 121 may actively alter the phase function applied by the adaptive phase-altering optical element 122.

Referring again to FIGS. 1A-5B, in operation, the laser beam 112 may be translated relative to the transparent workpiece 160 (e.g., in the translation direction 101) along the contour line 165 to form the plurality of defects 172 of the contour 170. Directing or localizing the laser beam 112 into the transparent workpiece 160 generates an induced absorption within the transparent workpiece 160 and deposits enough energy to break chemical bonds in the transparent workpiece 160 at spaced locations along the contour line 165 to form the defects 172, each comprising a defect angle $\theta_d$ that is greater than 10°. According to one or more embodiments, the laser beam 112 may be translated across the transparent workpiece 160 by motion of the transparent workpiece 160 (e.g., motion of a translation stage 190 coupled to the transparent workpiece 160, as shown in FIGS. 2A and 2B), motion of the laser beam 112 (e.g., motion of the laser beam focal line 113), or motion of both the transparent workpiece 160 and the laser beam focal line 113.

Furthermore, when the impingement surface 162 of the transparent workpiece 160 comprises a variable topography, the laser beam 112 may be translated along the contour line 165 from a first impingement location comprising a first local topography to a second impingement location comprising a second local topography, and thereafter to a plurality of additional impingement locations, each comprising local topographies, some or all of which may be distinct from one another. Laser processing a transparent workpiece 160 having an impingement surface 162 with variable topography may comprise directing the laser beam 112 into the transparent workpiece 160 at the first impingement location after applying a first phase alteration to the laser beam 112 using the adaptive phase-altering optical element 122 (such as the spatial light modulator) such that the laser beam 112 upstream and/or incident the impingement surface 162 (such as in free space) comprises a first non-circular angular spectrum, translating the laser beam 112 from the first impingement location to the second impingement location, and directing the laser beam 112 into the transparent workpiece 160 at the second impingement location after applying a second phase alteration to the laser beam 112 using the adaptive phase-altering optical element 122 such that the laser beam 112 upstream and/or incident the impingement surface 162 (such as in free space) comprises a second non-circular angular spectrum.

The first phase alteration and the first non-circular angular spectrum correspond with the first local topography at the first impingement location such that the portion of the laser beam 112 directed into the transparent workpiece 160 at the first impingement location at a beam propagation angle $\theta_{bp}$ comprises a laser beam focal line 113 having an internal beam angle of greater than 10° while being quasi non-diffracting. Similarly, the second phase alteration corresponds with the second local topography such that the portion of the laser beam 112 directed into the transparent workpiece 160 at the second impingement location at a beam propagation angle $\theta_{bp}$ comprises a laser beam focal line 113 having an internal beam angle of greater than 10° while being quasi non-diffracting. Thus, the laser beam focal line 113 forms a first defect having a defect angle $\theta_d$ that is greater than 10° and a second defect having a defect angle $\theta_d$ that is greater than 10°.

Referring again to FIG. 2A, the optical assembly 100 may further comprise an imaging system 192 configured to generate image data of the impingement surface 162. In some embodiments, the imaging system 192 may comprise one or more cameras, physical surface probes, laser rangefinders, interferometric systems, wavefront sensors, or the like. The imaging system 192 is communicatively coupled to the controller 121 such that the imaging system 192 may send image data of the impingement surface 162 to the controller 121, and the controller 121 may instruct the adaptive phase-altering optical element 122 to apply specific phase alterations to the laser beam 112 corresponding with the local topography of impingement locations on the impingement surface 162.

Thus, laser processing a transparent workpiece 160 having an impingement surface 162 with variable topography may further comprise imaging the impingement surface 162 using the imaging system 192 to generate image data of the impingement surface 162. Using this image data, the imaging system 192, the controller 121, or another computing device may determine the local topography of the first impingement location and the local topography of the second impingement location and determine the particular phase alterations that will form a high angle, quasi-non-diffracting laser beam focal line 113 in the transparent workpiece 160. The method further comprises instructing the adaptive phase-altering optical element 122, using the controller 121, to apply the first phase alteration when directing the laser beam 112 into the impingement surface 162 at the first impingement location and apply the second phase alteration when direction the laser beam 112 into the impingement surface 162 at the second location. Further, the image data may be used to determine to the topography of some or all of impingement surface 162, thereby determining a plurality of local topographies of a plurality of impingement locations.

Referring again to FIGS. 1A-5B, the defects 172 may generally be spaced apart from one another by a distance along the contour 170 of from about 0.1 μm to about 500 μm, for example, about 1 μm to about 200 μm, about 2 μm to about 100 μm, about 5 μm to about 20 μm, or the like. For example, suitable spacing between the defects 172 may be from about 0.1 μm to about 50 μm, such as from about 5 μm to about 15 μm, from about 5 μm to about 12 μm, from about 7 μm to about 15 μm, or from about 7 μm to about 12 μm for the TFT/display glass compositions. In some embodiments, a spacing between adjacent defects 172 may be about 50 μm or less, 45 μm or less, 40 μm or less, 35 μm or less, 30 μm or less, 25 μm or less, 20 μm or less, 15 μm or less, 10 μm or less, or the like.

As illustrated in FIGS. 1A and 1B, the plurality of defects 172 of the contour 170 extend into the transparent workpiece 160 and establish a path for crack propagation for separation of the transparent workpiece 160 into separate portions along the contour 170. Forming the contour 170 comprises translating the laser beam 112 relative to the transparent workpiece 160 (e.g., in the translation direction 101) along the contour line 165 to form the plurality of defects 172 of the contour 170. According to one or more embodiments, the laser beam 112 may be translated across the transparent workpiece 160 by motion of the transparent workpiece 160, motion of the laser beam 112 (e.g., motion of the laser beam focal line 113), or motion of both the transparent workpiece 160 and the laser beam 112, for example, using one or more translation stages 190 (FIGS. 2A and 2B). By translating the laser beam focal line 113 relative to the transparent workpiece 160, the plurality of defects 172 may be formed in the transparent workpiece 160, wherein each of the plurality of defects 172, each comprising a defect angle $\theta_d$ that is greater than 10°.

Suitable laser wavelengths for forming defects 172 are wavelengths at which the combined losses of linear absorption and scattering by the transparent workpiece 160 are sufficiently low. In embodiments, the combined losses due to linear absorption and scattering by the transparent workpiece 160 at the wavelength are less than 20%/mm, or less than 15%/mm, or less than 10%/mm, or less than 5%/mm, or less than 1%/mm, where the dimension "/mm" means per millimeter of distance within the transparent workpiece 160 in the beam propagation direction of the laser beam 112 (e.g., the Z direction). Representative wavelengths for many glass workpieces include fundamental and harmonic wavelengths of $Nd^{3+}$ (e.g. $Nd^{3+}$:YAG or $Nd^{3+}$:YVO$_4$ having fundamental wavelength near 1064 nm and higher order harmonic wavelengths near 532 nm, 355 nm, and 266 nm). Other wavelengths in the ultraviolet, visible, and infrared portions of the spectrum that satisfy the combined linear absorption and scattering loss requirement for a given substrate material can also be used.

In operation, the laser beam 112 output by the beam source 110 may create multi-photon absorption (MPA) in the transparent workpiece 160. MPA is the simultaneous absorption of two or more photons of identical or different frequencies that excites a molecule from one state (usually the ground state) to a higher energy electronic state (i.e., ionization). The energy difference between the involved lower and upper states of the molecule is equal to the sum of the energies of the involved photons. MPA, also called induced absorption, can be a second-order or third-order process (or higher order), for example, that is several orders of magnitude weaker than linear absorption. It differs from linear absorption in that the strength of second-order induced absorption may be proportional to the square of the light intensity, for example, and thus it is a nonlinear optical process.

The perforation step that creates the contour 170 (FIGS. 1A and 1B) may utilize the beam source 110 (e.g., a pulsed beam source such as an ultra-short pulse laser) in combination with the phase-altering optical element 120, the first lens 131, and the second lens 132, to irradiate the transparent workpiece 160 and generate the laser beam focal line 113. The laser beam focal line 113 comprises a quasi-non-diffracting beam, such as a Gauss-Bessel beam or Bessel beam, as defined above, and may fully or partially perforate the transparent workpiece 160 to form defects 172, each comprising a defect angle $\theta_d$ that is greater than 10°, in the transparent workpiece 160, which may form the contour 170. In embodiments in which the laser beam 112 comprises a pulsed laser beam, the pulse duration of the individual pulses is in a range of from about 1 femtosecond to about 200 picoseconds, such as from about 1 picosecond to about 100 picoseconds, 5 picoseconds to about 20 picoseconds, or the like, and the repetition rate of the individual pulses may be in a range from about 1 kHz to 4 MHz, such as in a range from about 10 kHz to about 3 MHz, or from about 10 kHz to about 650 kHz.

Referring now to FIGS. 6A and 6B, in addition to a single pulse operation at the aforementioned individual pulse repetition rates, in embodiments comprising a pulsed laser beam, the pulses may be produced in pulse bursts 500 of two sub-pulses 500A or more (such as, for example, 3 sub-pulses, 4 sub-pulses, 5 sub-pulses, 10 sub-pulses, 15 sub-pulses, 20 sub-pulses, or more per pulse burst, such as from 1 to 30 sub-pulses per pulse burst 500, or from 5 to 20 sub-pulses per pulse burst 500). While not intending to be limited by theory, a pulse burst is a short and fast grouping of sub-pulses that creates an optical energy interaction with the material (i.e. MPA in the material of the transparent workpiece 160) on a time scale not easily accessible using a single-pulse operation. While still not intending to be limited by theory, the energy within a pulse burst (i.e. a group of pulses) is conserved. As an illustrative example, for a pulse burst having an energy of 100 μJ/burst and 2 sub-pulses, the 100 μJ/burst energy is split between the 2 pulses for an average energy of 50 μJ per sub-pulse and for a pulse burst having an energy of 100 μJ/burst and 10 sub-pulses, the 100 μJ/burst is split amongst the 10 sub-pulses for an average energy of 10 μJ per sub-pulse. Further, the energy distribution among the sub-pulses of a pulse burst does not need to be uniform. In fact, in some instances, the energy distribution among the sub-pulses of a pulse burst is in the form of an exponential decay, where the first sub-pulse of the pulse burst contains the most energy, the second sub-pulse of the pulse burst contains slightly less energy, the third sub-pulse of the pulse burst contains even less energy, and so on. However, other energy distributions within an individual pulse burst are also possible, where the exact energy of each sub-pulse can be tailored to effect different amounts of modification to the transparent workpiece 160.

While still not intending to be limited by theory, when the defects 172 of the one or more contours 170 are formed with pulse bursts having at least two sub-pulses, the force necessary to separate the transparent workpiece 160 along the contour 170 (i.e. the maximum break resistance) is reduced compared to the maximum break resistance of a contour 170 with the same spacing between adjacent defects 172 in an identical transparent workpiece 160 that is formed using a single pulse laser. For example, the maximum break resistance of a contour 170 formed using a single pulse is at least two times greater than the maximum break resistance of a contour 170 formed using a pulse burst having 2 or more sub-pulses. Further, the difference in maximum break resistance between a contour 170 formed using a single pulse and a contour 170 formed using a pulse burst having 2 sub-pulses is greater than the difference in maximum break resistance between a contour 170 formed using a pulse burst having 2 sub-pulses and a pulse burst having 3 sub-pulses. Thus, pulse bursts may be used to form contours 170 that separate easier than contours 170 formed using a single pulse laser.

Referring still to FIGS. 6A and 6B, the sub-pulses 500A within the pulse burst 500 may be separated by a duration that is in a range from about 1 nsec to about 50 nsec, for example, from about 10 nsec to about 30 nsec, such as about 20 nsec. In other embodiments, the sub-pulses 500A within the pulse burst 500 may be separated by a duration of up to 100 psec (for example, 0.1 psec, 5 psec, 10 psec, 15 psec, 18 psec, 20 psec, 22 psec, 25 psec, 30 psec, 50 psec, 75 psec, or any range therebetween). For a given laser, the time separation $T_p$ (FIG. 6B) between adjacent sub-pulses 500A within a pulse burst 500 may be relatively uniform (e.g., within about 10% of one another). For example, in some embodiments, each sub-pulse 500A within a pulse burst 500 is separated in time from the subsequent sub-pulse by approximately 20 nsec (50 MHz). Further, the time between each pulse burst 500 may be from about 0.25 microseconds to about 1000 microseconds, e.g., from about 1 microsecond to about 10 microseconds, or from about 3 microseconds to about 8 microseconds.

In some of the exemplary embodiments of the beam source 110 described herein, the time separation $T_b$ (FIG. 6B) is about 5 microseconds for the beam source 110 outputting a laser beam 112 comprising a burst repetition rate of about 200 kHz. The laser burst repetition rate is related to the time $T_b$ between the first pulse in a burst to the first pulse in the subsequent burst (laser burst repetition rate=$1/T_b$). In some embodiments, the laser burst repetition rate may be in a range of from about 1 kHz to about 4 MHz. In embodiments, the laser burst repetition rates may be, for example, in a range of from about 10 kHz to 650 kHz. The time $T_b$ between the first pulse in each burst to the first pulse in the subsequent burst may be from about 0.25 microsecond (4 MHz burst repetition rate) to about 1000 microseconds (1 kHz burst repetition rate), for example from about 0.5 microseconds (2 MHz burst repetition rate) to about 40 microseconds (25 kHz burst repetition rate), or from about 2 microseconds (500 kHz burst repetition rate) to about 20 microseconds (50k Hz burst repetition rate). The exact timing, pulse duration, and burst repetition rate may vary depending on the laser design, but short pulses ($T_d$<20 psec and, in some embodiments, $T_d$≤15 psec) of high intensity have been shown to work particularly well.

The burst repetition rate may be in a range of from about 1 kHz to about 2 MHz, such as from about 1 kHz to about 200 kHz. Bursting or producing pulse bursts 500 is a type of laser operation where the emission of sub-pulses 500A is not in a uniform and steady stream but rather in tight clusters of pulse bursts 500. The pulse burst laser beam may have a wavelength selected based on the material of the transparent workpiece 160 being operated on such that the material of the transparent workpiece 160 is substantially transparent at the wavelength. The average laser power per burst measured at the material may be at least about 40 µJ per mm of thickness of material. For example, in embodiments, the average laser power per burst may be from about 40 µJ/mm to about 2500 µJ/mm, or from about 500 µJ/mm to about 2250 µJ/mm. In a specific example, for 0.5 mm to 0.7 mm thick Corning EAGLE XG® transparent workpiece, pulse bursts of from about 300 µJ to about 600 µJ may cut and/or separate the workpiece, which corresponds to an exemplary range of about 428 µJ/mm to about 1200 µJ/mm (i.e., 300 µJ/0.7 mm for 0.7 mm EAGLE XG® glass and 600 µJ/0.5 mm for a 0.5 mm EAGLE XG® glass).

The energy required to modify the transparent workpiece 160 is the pulse energy, which may be described in terms of pules burst energy (i.e., the energy contained within a pulse burst 500 where each pulse burst 500 contains a series of sub-pulses 500A), or in terms of the energy contained within a single laser pulse (many of which may comprise a burst). The pulse energy (for example, pulse burst energy) may be from about 25 µJ to about 750 µJ, e.g., from about 50 µJ to about 500 µJ, or from about 50 µJ to about 250 µJ. For some glass compositions, the pulse energy (e.g., pulse burst energy) may be from about 100 µJ to about 250 µJ. However, for display or TFT glass compositions, the pulse energy (e.g., pulse burst energy) may be higher (e.g., from about 300 µJ to about 500 µJ, or from about 400 µJ to about 600 µJ, depending on the specific glass composition of the transparent workpiece 160).

While not intending to be limited by theory, the use of a laser beam 112 comprising a pulsed laser beam capable of generating pulse bursts is advantageous for cutting or modifying transparent materials, for example glass (e.g., the transparent workpiece 160). In contrast with the use of single pulses spaced apart in time by the repetition rate of the single-pulsed laser, the use of a burst sequence that spreads the pulse energy over a rapid sequence of pulses within the burst allows access to larger timescales of high intensity interaction with the material than is possible with single-pulse lasers. The use of pulse bursts (as opposed to a single pulse operation) increases the size (e.g., the cross-sectional size) of the defects 172, which facilitates the connection of adjacent defects 172 when separating transparent workpiece 160 along the one or more contours 170, thereby minimizing unintended crack formation. Further, using a pulse burst to form defects 172 increases the randomness of the orientation of cracks extending outward from each defect 172 into the bulk material of the transparent workpiece 160 such that individual cracks extending outward from defects 172 do not influence or otherwise bias the separation of the contour 170 such that separation of the defects 172 follows the contour 170, minimizing the formation of unintended cracks.

Referring again to FIGS. 2A and 2B, the optical assembly 100 may be configured to further alter the laser beam 112 such that a cross-section of the laser beam 112 at the impingement surface 162 of the transparent workpiece 160 is non-axisymmetric and thus a cross-section of the laser beam focal line 113 is non-axisymmetric, for example, using the methods and systems described in U.S. Published Patent Application No. 20180093941A1, hereby incorporated by reference in its entirety. For example, the beam spot 114 formed by the laser beam focal line 113 at the impingement surface 162 the transparent workpiece 160 may comprise a non-axisymmetric beam spot having a long axis and a short axis such that the defects 172 formed using this laser beam focal line 113 comprise a central defect region formed at the intersection of the long axis and the short axis and one or more radial arms formed in the direction of the long axis These defects 172 are formed using a laser beam focal line 113 having a non-axisymmetric beam spot oriented such that the long axis of the beam spot 114 extends along the contour line 165 thereby forming defects 172 with radial arms that extend along the contour line 165. By controlling the laser beam focal line 113 such that the direction of the radial arms of each defect 172 extends along the contour line 165, crack propagation may be better controlled.

In embodiments in which the phase-altering optical element 120 comprises the adaptive phase-altering optical element 122, a laser beam focal line 113 with a cross-section that is non-axisymmetric may be formed by altering the phase modulation applied by the adaptive phase-altering optical element 122. Further, as described in described in U.S. Published Patent Application No. 20180093941A1, in embodiments in which the phase-altering optical element 120 comprises a static phase-altering optical element 123 (e.g., the oblong axicon 124), the laser beam focal line 113 with a cross-section that is non-axisymmetric may be formed by positioning the axicon offset in a radial direction from the beam pathway 111, blocking a portion of the laser beam 112, or decohering a portion of the laser beam using a phase delay plate.

Referring again to FIGS. 1A-5B, in some embodiments, the transparent workpiece 160 may be further acted upon in a subsequent separating step to induce separation of the transparent workpiece 160 along the contour 170 to form a separated transparent article comprising an angled edge (FIGS. 7A-9B). The subsequent separating step may include using mechanical force, thermal stress induced force, or a chemical etchant to propagate a crack along the contour 170. The thermal source, such as an infrared laser beam, may be used to create thermal stress and thereby separate the transparent workpiece 160 along the contour 170. Separating the transparent workpiece 160 may include directing an infrared laser beam at the contour 170 to induce thermal stress to propagate a crack along the contour 170. In some embodiments, the infrared laser beam may be used to initiate separation and then the separation may be finished mechanically. Without being bound by theory, the infrared laser is a controlled heat source that rapidly increases the temperature of the transparent workpiece 160 at or near the contour 170. This rapid heating may build compressive stress in the transparent workpiece 160 on or adjacent to the contour 170. Since the area of the heated glass surface is relatively small compared to the overall surface area of the transparent workpiece 160, the heated area cools relatively rapidly. The resultant temperature gradient induces tensile stress in the transparent workpiece 160 sufficient to propagate a crack along the contour 170 and through the depth of the transparent workpiece 160, resulting in full separation of the transparent workpiece 160 along the contour 170. Without being bound by theory, it is believed that the tensile stress may be caused by expansion of the glass (i.e., changed density) in portions of the workpiece with higher local temperature.

Suitable infrared lasers to create thermal stress in glass would typically have wavelengths that are readily absorbed by glass, typically having wavelengths ranging from 1.2 µm to 13 µm, for example, a range of 4 µm to 12 µm. Further, the power of the infrared laser beam may be from about 10 W to about 1000 W, for example 100 W, 250 W, 500 W, 750 W, or the like. Moreover, the $1/e^2$ beam diameter of the infrared laser beam may be about 20 mm or less, for example, 15 mm, 12 mm, 10 mm, 8 mm, 5 mm, 2 mm, or less. In operation, a larger $1/e^2$ beam diameter of the infrared laser beam may facilitate faster laser processing and more power while a smaller $1/e^2$ beam diameter of the infrared laser beam may facilitate high precision separation by limiting damage to portions of the transparent workpiece 160 near the contour 170. Example infrared lasers include a carbon dioxide laser (a "$CO_2$ laser"), a carbon monoxide laser (a "CO laser"), a solid state laser, a laser diode, or combinations thereof.

In other embodiments, stress present in the transparent workpiece 160, depending on the type, depth, and material properties (e.g., absorption, CTE, stress, composition, etc.) may cause spontaneous separation along the contour 170 without further heating or mechanical separation steps. For example, when the transparent workpiece 160 comprises a strengthened glass substrate (e.g., an ion-exchanged or thermally tempered glass substrate), the formation of the contour 170 may induce crack propagation along the contour 170 to separate the transparent workpiece 160.

Figure 7A:
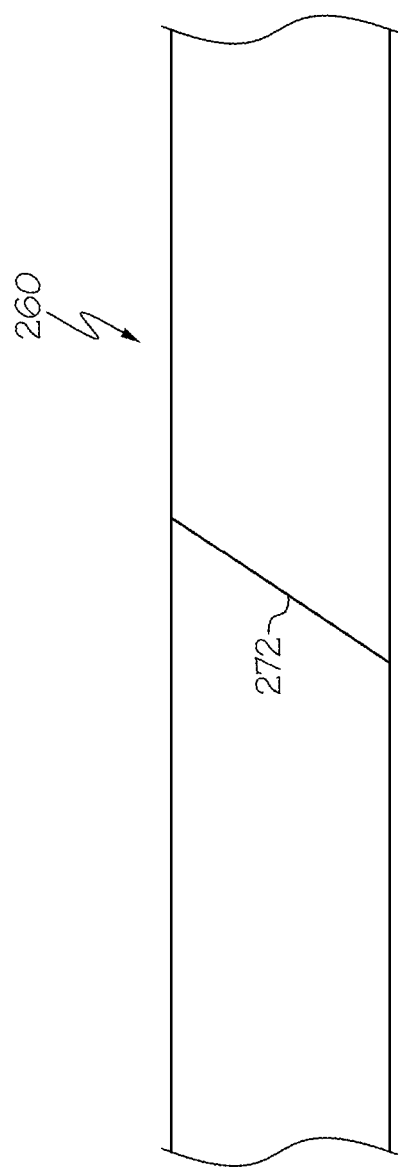
FIG. 7A schematically depicts a side view of a transparent workpiece having a contour of angled defects, according to one or more embodiments described herein.
Figure 7B:
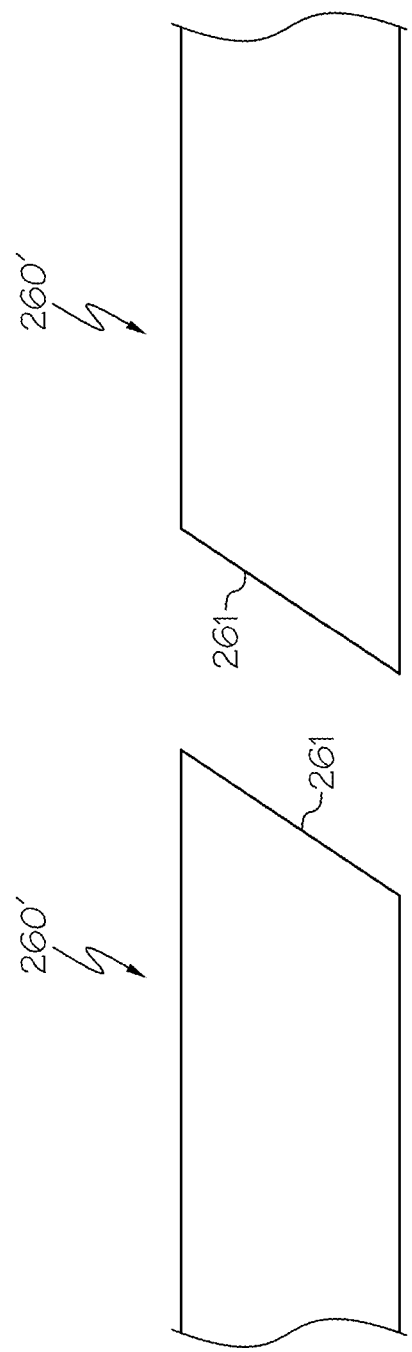
FIG. 7B schematically depicts a side view of two separated articles formed from the transparent workpiece of FIG. 7A, each separated article comprising an angled edge, according to one or more embodiments shown and described herein.

Referring now to FIGS. 7A-9B example transparent workpieces 260, 360, 460 and resultant separated articles 260', 360', 460' formed from these transparent workpieces using the methods and systems described herein are schematically depicted. As one example, FIG. 7A depicts a schematic side view of a transparent workpiece 260 with a plurality of defects 272 each having a defect angle $\theta_d$ that is greater than 10°. The plurality of defects 272 (i.e., a contour of these defects 272) may be separated to form one or more separated articles 260' each comprising an angled edge 261, as shown in FIG. 7B.

As another example, FIG. 8A depicts a schematic side view of a transparent workpiece 360 comprising a plurality of defects 372, including a first defect 372a and a second defect 372b. The plurality of defects 372 comprise a curved contour formed along a curved contour line. Both the first defect 372a and the second defect 372b extend radially inward, for example, from an impingement surface 362 (i.e., the top surface depicted in FIG. 8A) to an opposite surface 364 (i.e., the bottom surface depicted in FIG. 8B). Thus, at the impingement surface 362, the first defect 372a and the second defect 372b are spaced apart from one another by a first spacing distance $D_{S1}$ and at the opposite surface 364, the first defect 372a and the second defect 372b are spaced apart from one another by a second spacing distance $D_{S2}$, which is smaller than the first spacing distance $D_{S1}$. In embodiments in which the curved contour line is circular, the first spacing distance $D_{S1}$ is the diameter of the closed contour line at the impingement surface and the second spacing distance $D_{S2}$ is the diameter of the closed contour line at the opposite surface. As shown in FIG. 8B, the closed contour of defects 372 may be separated to form a separated article 360' having a conical hole 363 defined by an angled edge 361. For example, the closed contour of defects 372 may be separated to form the separated article 360' having the conical hole 363 using a chemical etching process.

Referring still to FIGS. 8A and 8B, the curved contour of defects 372 may be formed by rotating the laser beam 112 about the beam pathway 111 while translating the transparent workpiece 160 and the laser beam 112 relative to one another such that the defects 372 retain a radially inward directionality relative to the curved contour line along the curved contour. Further, it should be understood that while the defects 372 are depicted as being directed radially inward relative the curved contour line, in other embodiments, the defects 372 may be directed radially outward, for example, by rotation of the laser beam 112 about the beam pathway 111.

Figure 9A:
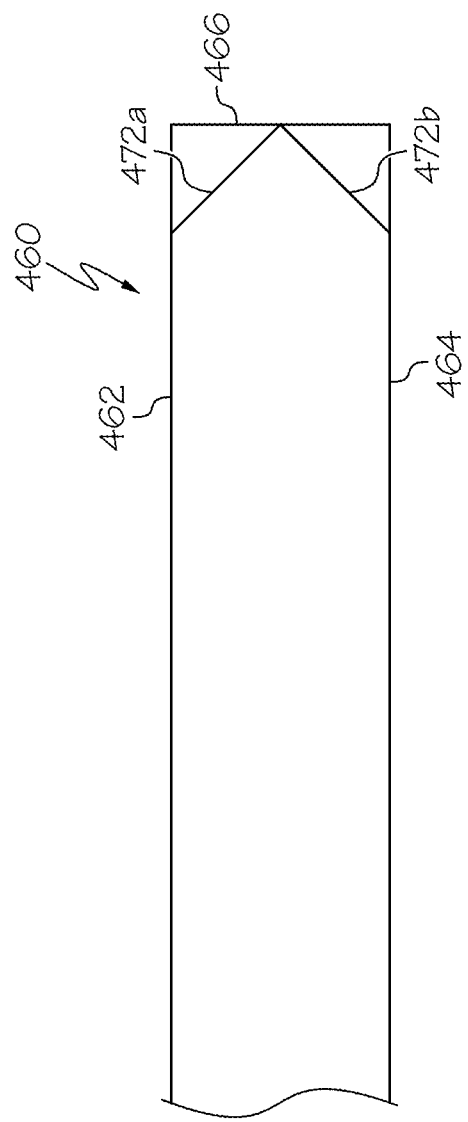
FIG. 9A schematically depicts a side view of a transparent workpiece having a contour of defects extending from an impingement surface to an edge surface and a contour of defects extending from an opposite surface to an edge surface, according to one or more embodiments shown and described herein.
Figure 9B:
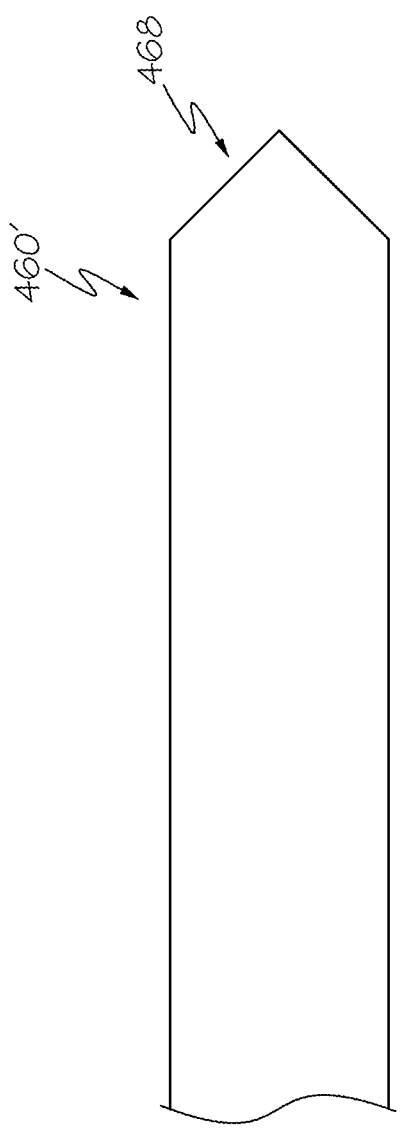
FIG. 9B schematically depicts a side view of a separated article formed from the transparent workpiece of FIG. 9A, the separated article comprising a beveled edge, according to one or more embodiments shown and described herein.

As another example, FIG. 9A depicts a schematic side view of a transparent workpiece 460 comprising a plurality of defects 472, including a first defect 472a and second defect 472b. The first defect 472a extends from an impingement surface 462 to an edge surface 466 of the transparent workpiece 160 and the second defect 472b extends from an opposite surface 464 to the edge surface 466. The first defect 472a may be formed by directing the laser beam focal line 113, at an angle, from the impingement surface 462 to the edge surface 466 and the second defect 472b may be formed by directing the laser beam focal line 113, at an angle, from the opposite surface 464 to the edge surface 466. Further, the first defect 472a may be part of a plurality of first defects 472a that from a first contour and the second defect 472b may be part of a plurality of second defects 472b that form a second contour. In operation, the first contour of first defects 472a and the second contour of second defects 472b may be separated using the embodiments describe herein to form a separated article 460' having beveled edge 468, as depicted in FIG. 9B.

EXAMPLES

Figure 10A:
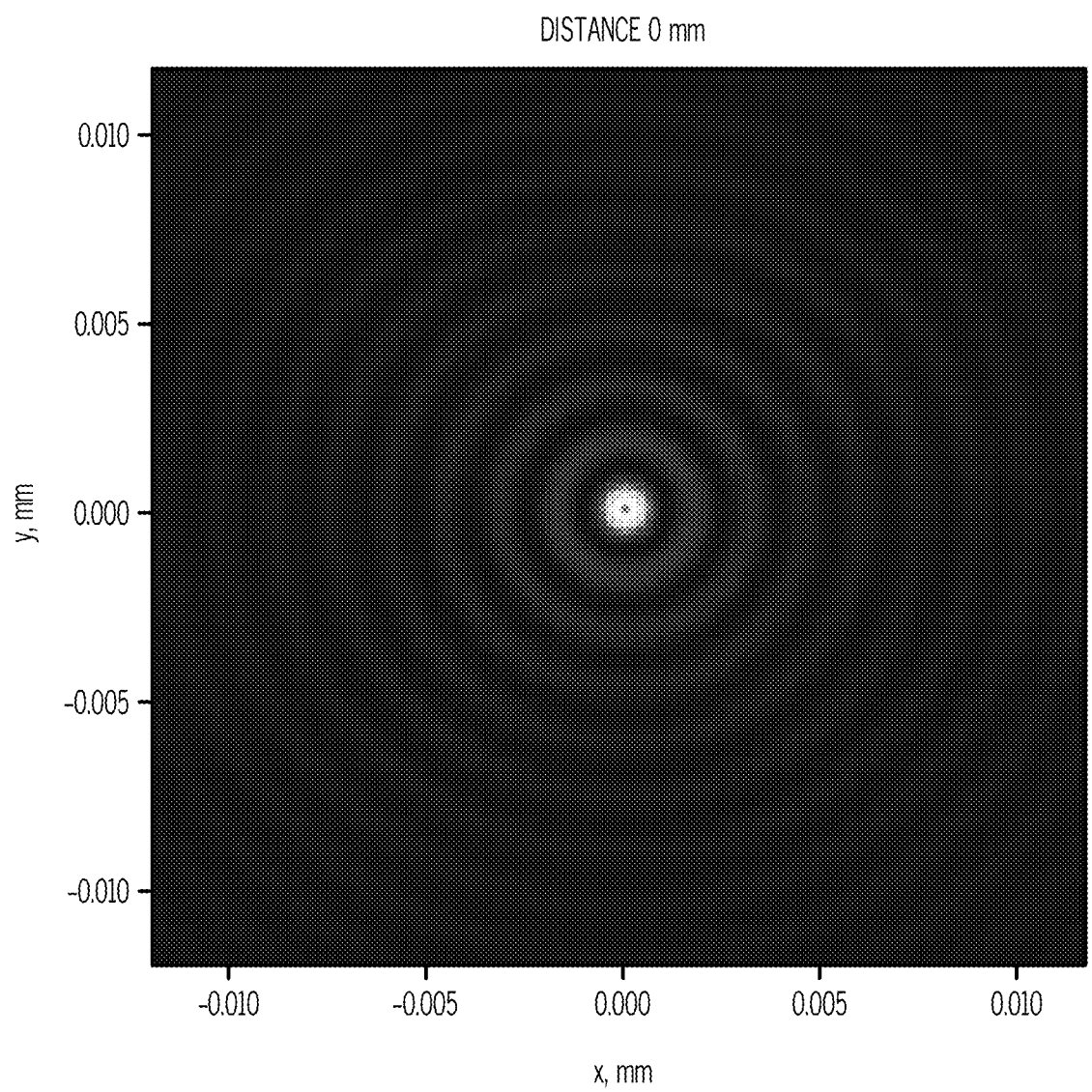
FIG. 10A is an image of a cross section of an example Bessel beam having a circular angular spectrum in free space focused into a laser beam focal line in a transparent workpiece having an internal beam angle of 15° at an impingement surface of the transparent workpiece, according to one or more embodiments shown and described herein.
Figure 10B:
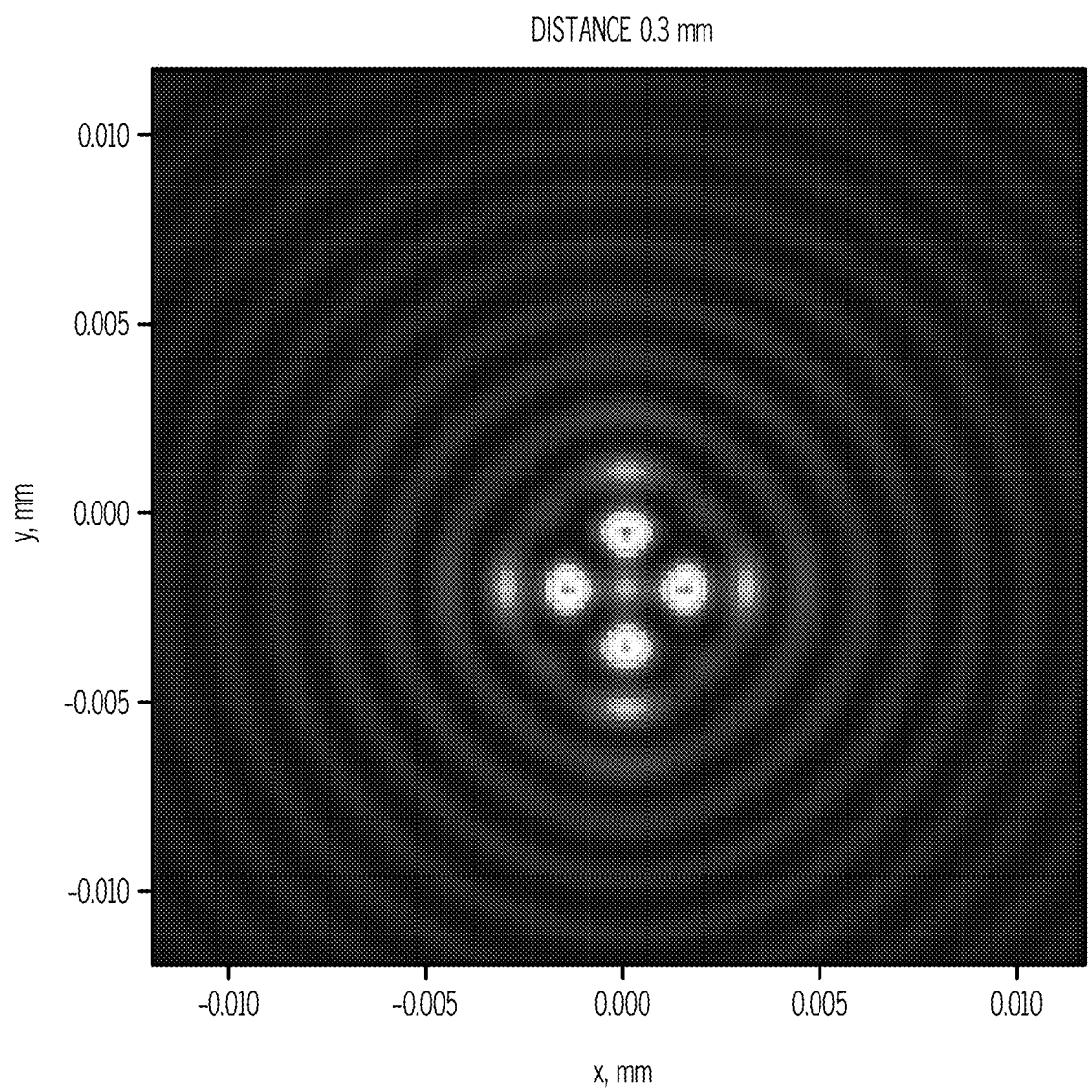
FIG. 10B is an image of a cross section of the laser beam focal line of FIG. 10A at a depth of 0.3 mm from the impingement surface of the transparent workpiece, according to one or more embodiments shown and described herein.
Figure 10C:
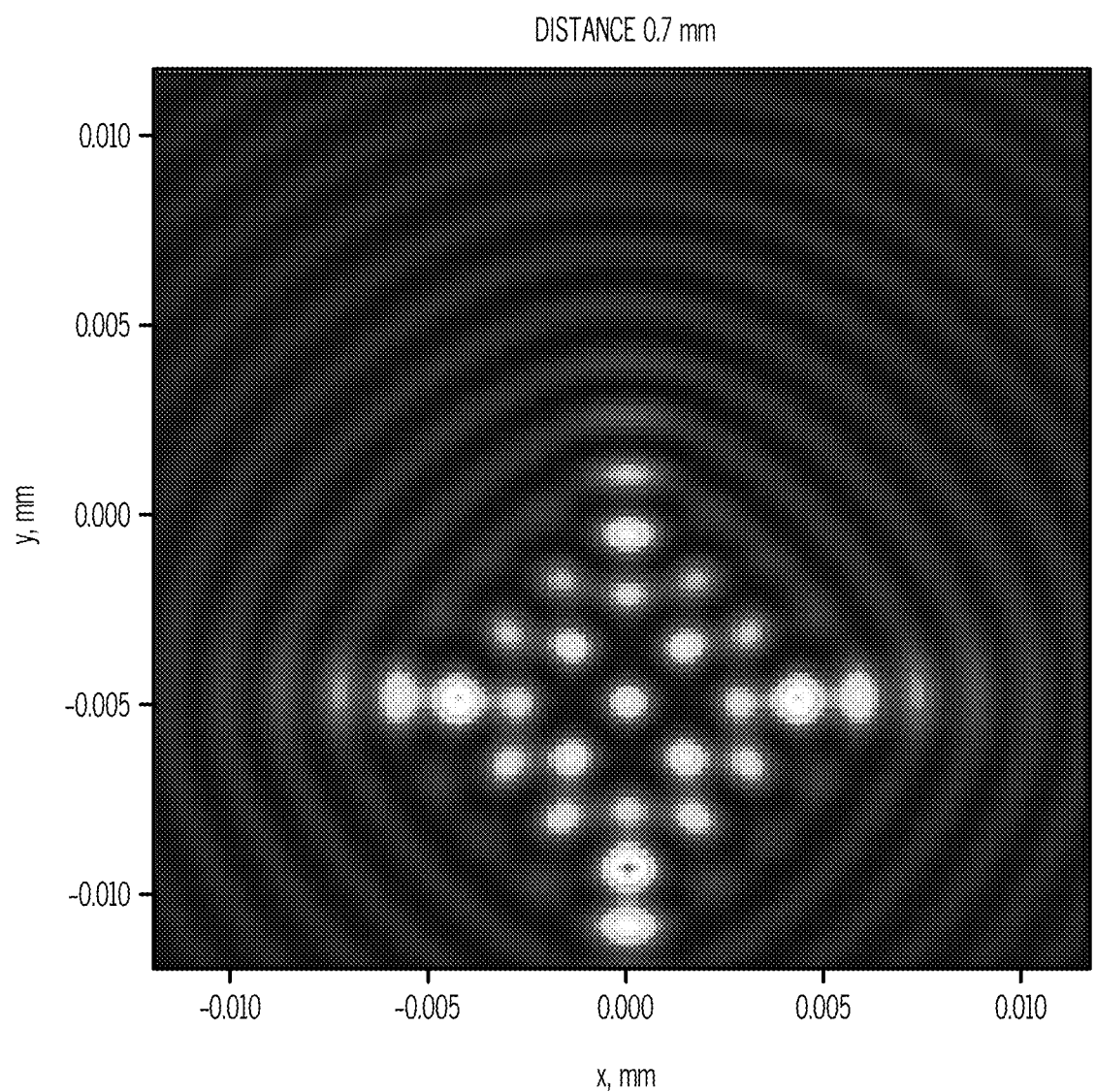
FIG. 10C is an image of a cross section of the laser beam focal line of FIG. 10A at a depth of 0.7 mm from the impingement surface of the transparent workpiece, according to one or more embodiments shown and described herein.
Figure 10D:
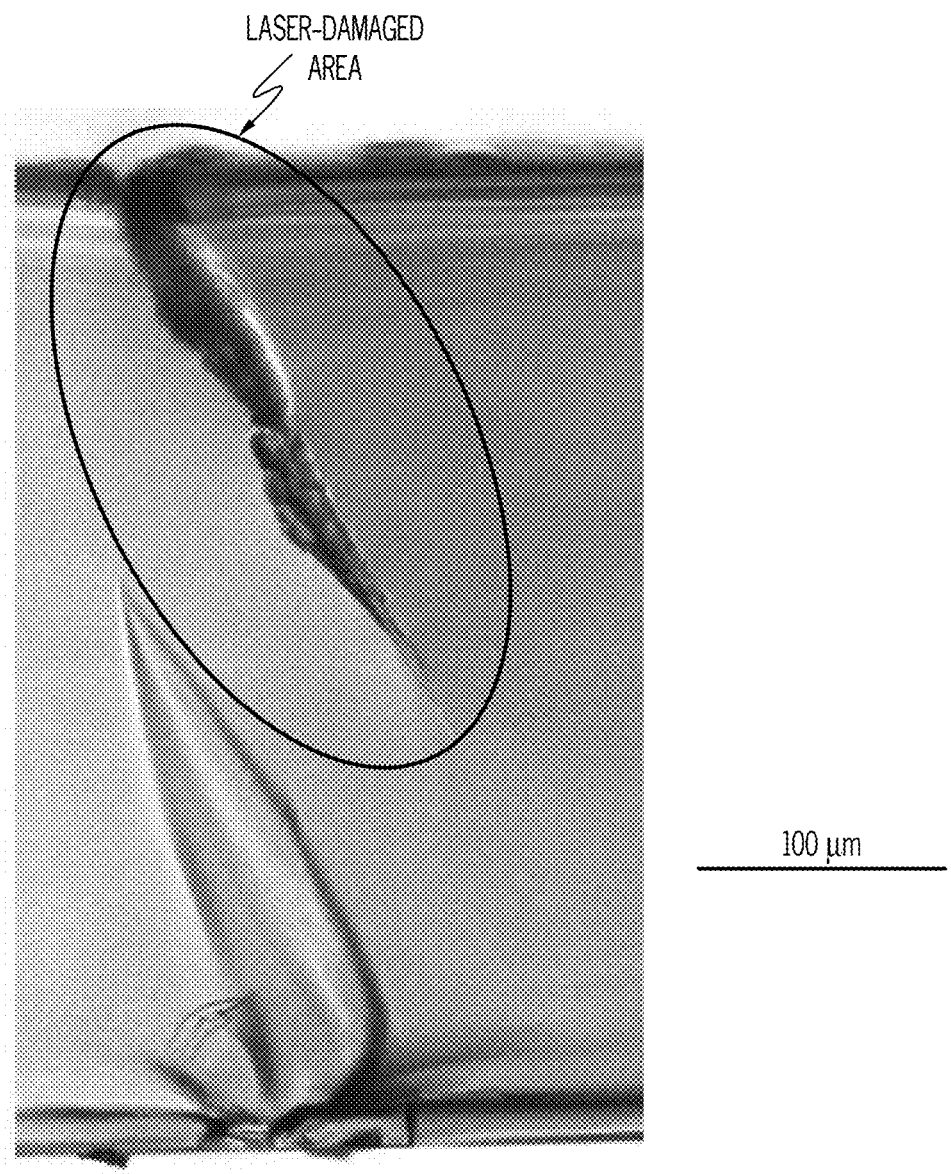
FIG. 10D is an image of a damage region in the transparent workpiece using the laser beam of FIGS. 10A-10C, according to one or more embodiments shown and described herein.

Referring now to FIGS. 10A-10C, by way of comparative example, a Bessel beam (one type of quasi-non-diffracting beam) having a circular angular spectrum upstream and/or incident the impingement surface (such as in free space) focused into a laser beam focal line having an internal beam angle $\theta_{bi}$ of 15° is shown, as a cross section, at the impingement surface of the transparent workpiece 160 (FIG. 10A), at a depth of 0.3 mm from the impingement surface (FIG. 10B), and at a depth of 0.7 mm from the impingement surface (FIG. 10C). While the laser beam focal line has minimal aberrations at the impingement surface of the transparent workpiece (FIG. 10A), the Bessel beam having a circular angular spectrum upstream and/or incident the impingement surface (such as in free space) and focused into a laser beam focal line becomes increasingly aberrated as it propagates through the transparent workpiece, as shown in FIG. 10B and FIG. 10C. Further, FIG. 10D depicts an example image of a damage region (i.e., an attempt to form a defect 172) in the transparent workpiece using the Bessel beam having the circular angular spectrum upstream and/or incident the impingement surface (such as in free space) of FIGS. 10A-10C focused into the laser beam focal line having an internal beam angle $\theta_{bi}$ of 15°. As shown in FIG. 10D, the increasing aberration of the laser beam focal line forms a wide damage area that does not extend through the depth of the transparent workpiece.

Figure 11A:
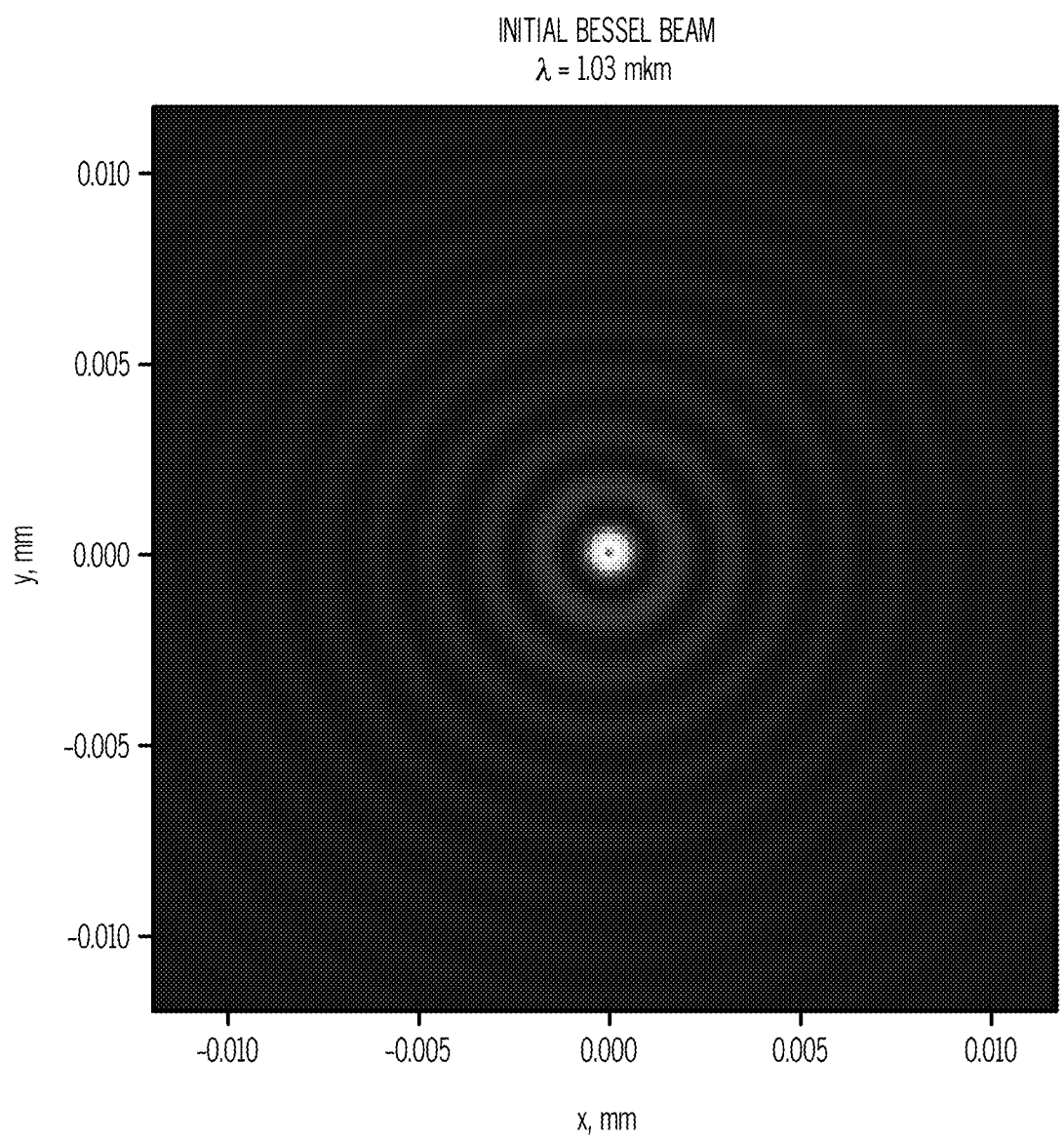
FIG. 11A is an image of a cross section of an example Bessel beam having an oblong angular spectrum in free space focused into a laser beam focal line having an internal beam angle greater than 10° within a transparent workpiece, according to one or more embodiments shown and described herein.
Figure 11B:
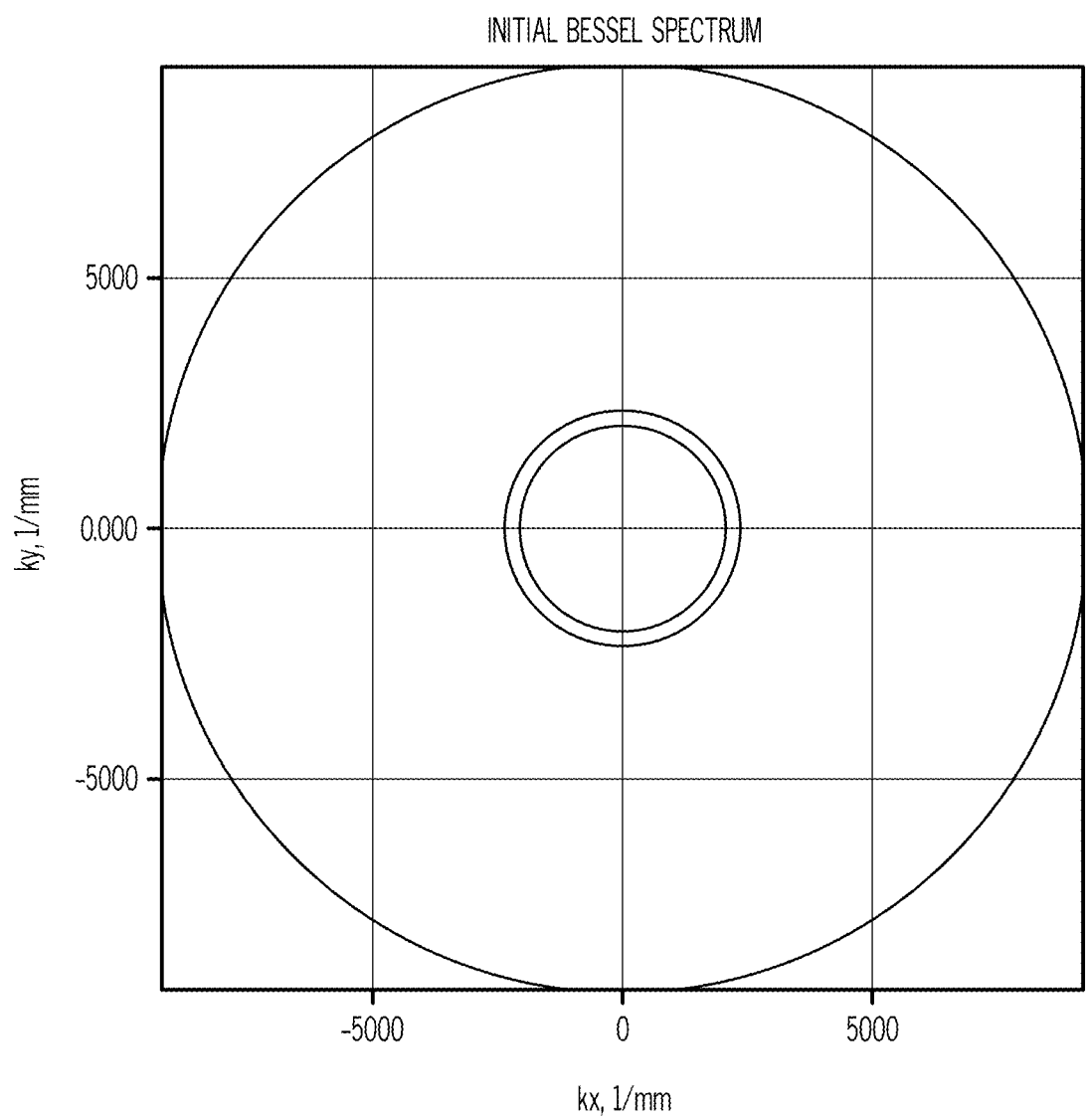
FIG. 11B is an image of the angular spectrum of the laser beam focal line of FIG. 11A, within the transparent workpiece, according to one or more embodiments shown and described herein.
Figure 11C:
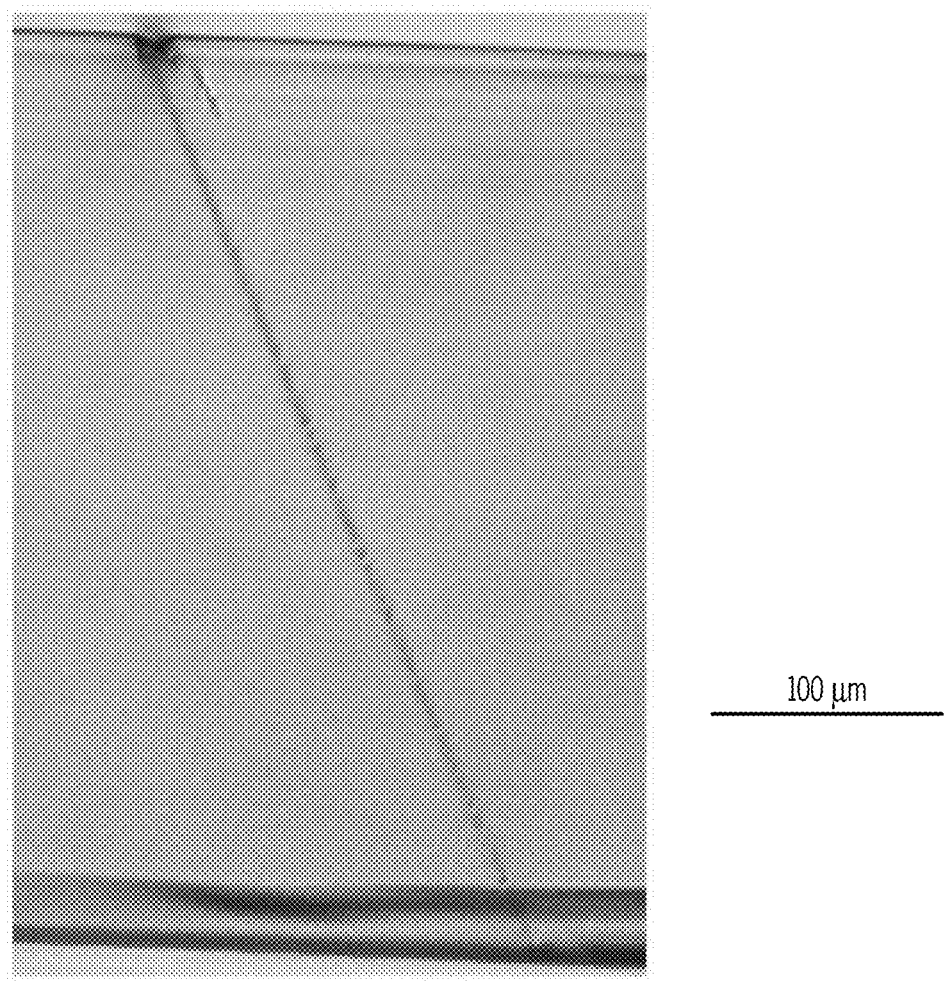
FIG. 11C is an image of a defect formed in the transparent workpiece using the laser beam focal line of FIGS. 11A and 11B, according to one or more embodiments shown and described herein.

Referring now to FIG. 11A, the laser beam 112 having the oblong angular spectrum 141 (FIG. 3A) upstream and/or incident the impingement surface 162 (such as in free space) and focused into a laser beam focal line having an internal beam angle $\theta_{bi}$ greater than 10° is shown, as a cross section, within the transparent workpiece. FIG. 11A shows that the example laser beam focal line formed from the oblong angular spectrum 141 (FIG. 3A) at a high angle within the transparent workpiece exhibits a quasi-non-diffracting character. Further, FIG. 11B depicts that the angular spectrum of laser beam focal line of FIG. 11A, within the transparent workpiece, is circular. Moreover, FIG. 11C depicts an example image of a defect (e.g. a defect 172) formed in a transparent workpiece by the laser beam focal line of FIGS. 11A and 11B, which has an oblong angular spectrum 141 (FIG. 3A) upstream and/or incident the impingement surface (such as in free space) and has an internal beam angle $\theta_{bi}$ of 15°. As shown in FIG. 11C, the laser beam focal line of FIGS. 11A and 11B forms a long, thin defect that is suitable for high quality separation of the transparent workpiece to form a separated article with an angled edge.

Figure 12A:
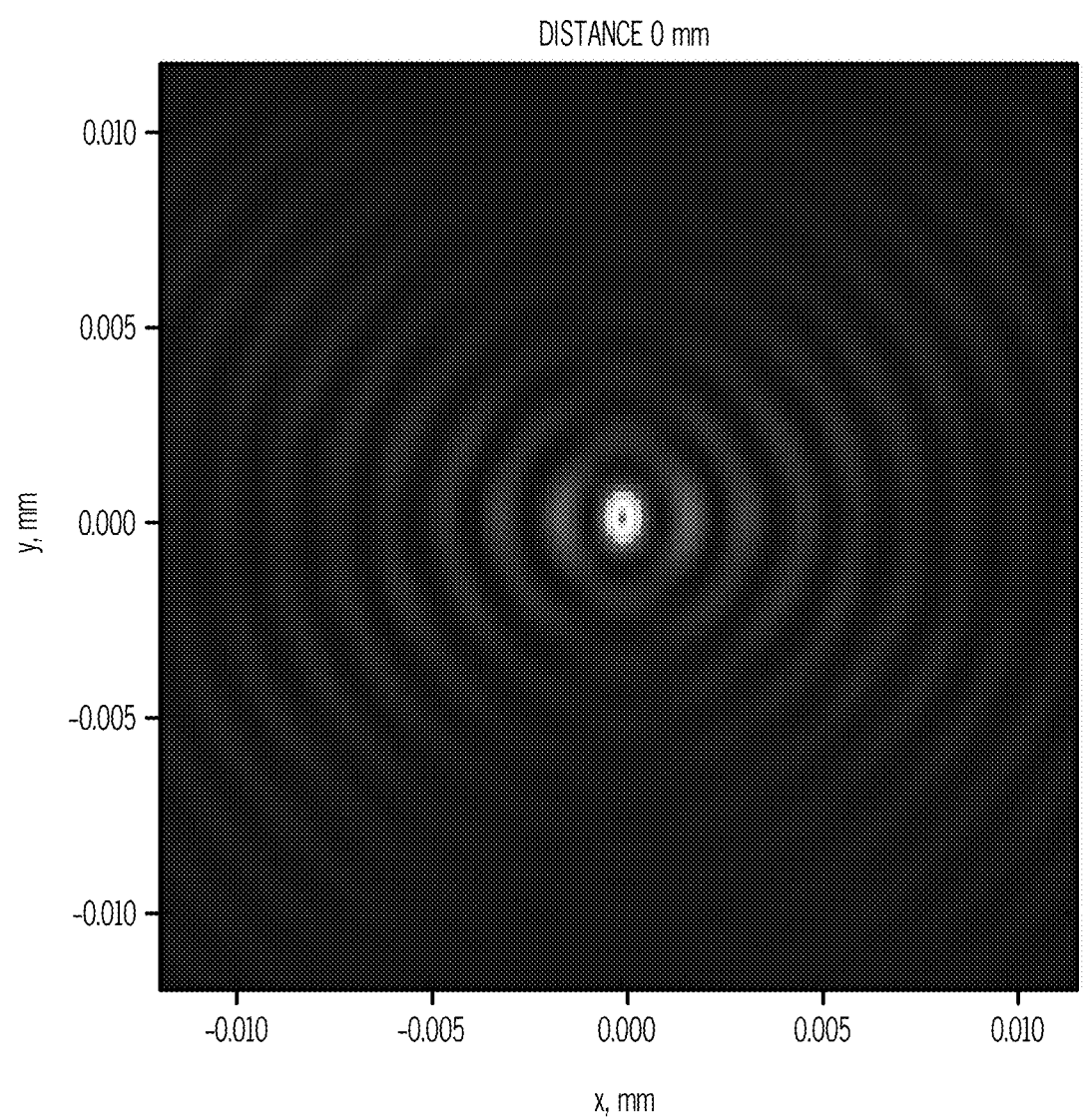
FIG. 12A is an image of a cross section of an example Bessel beam having an interrupted oblong angular spectrum in free space focused into a laser beam focal line having an internal beam angle greater than 10° within a transparent workpiece, according to one or more embodiments shown and described herein.
Figure 12B:
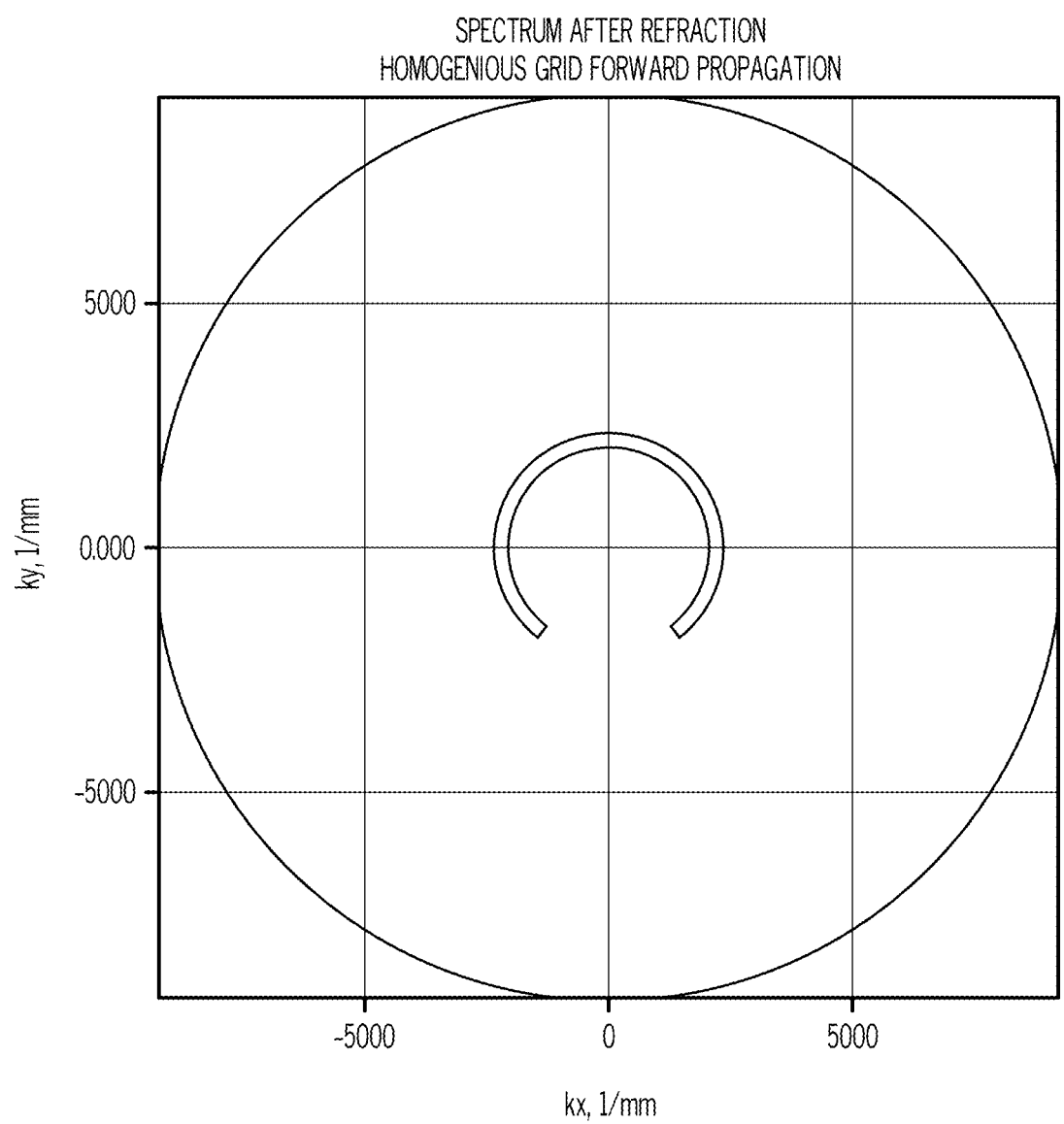
FIG. 12B is an image of the angular spectrum of the laser beam focal line of FIG. 12A, within the transparent workpiece, according to one or more embodiments shown and described herein.

Referring now to FIG. 12A, the laser beam 112 having the interrupted oblong angular spectrum 143 (FIG. 5B) upstream and/or incident the impingement surface 162 (such as in free space) and focused into a laser beam focal line having an internal beam angle $\theta_{bi}$ greater than 10° is shown, as a cross section, within the transparent workpiece. FIG. 12A depicts that the example laser beam focal line formed from the interrupted oblong angular spectrum 143 (FIG. 5B) at a high angle within the transparent workpiece exhibits a quasi-non-diffracting character, albeit with a change in the spot shape when compared to the spot shape of FIG. 11A. Further, FIG. 12B depicts that angular spectrum of laser beam focal line of FIG. 12A is an interrupted circular shape within the transparent workpiece.

Aspect 1 of the description is:
A method for processing a transparent workpiece, the method comprising:

directing a laser beam oriented along a beam pathway into an impingement surface of the transparent workpiece at an impingement location, wherein:

the laser beam incident to the impingement surface comprises an oblong angular spectrum comprising an axis of symmetry extending from a first axis end having a first radius of curvature to a second axis end having a second radius of curvature, where the first radius of curvature and the second radius of curvature are different; and a portion of the laser beam directed into the transparent workpiece comprises a laser beam focal line and generates an induced absorption to produce a defect within the transparent workpiece, the laser beam focal line comprising:

a wavelength λ;

a spot size $w_o$;

a Rayleigh range $Z_R$ that is greater than $$F_D \frac{\pi w_o^2}{\lambda},$$

where $F_D$ is a dimensionless divergence factor comprising a value of 10 or greater; and an internal beam angle of greater than 10° relative to a plane orthogonal to the impingement surface at the impingement location, such that the defect comprises a defect angle within the transparent workpiece of greater than 10° relative to the plane orthogonal to the impingement surface at the impingement location.

Aspect 2 of the description is: The method of Aspect 1, wherein the laser beam focal line comprises a circular angular spectrum within the transparent workpiece.

Aspect 3 of the description is:
The method of Aspect 1, wherein:

the laser beam focal line comprises an angular spectrum within the transparent workpiece having a first radius of curvature and a second radius of curvature; and a difference between the first radius of curvature and the second radius of curvature of the angular spectrum within the transparent workpiece is less than a difference between the first radius of curvature and the second radius of curvature of the oblong angular spectrum of the laser beam incident the impingement surface of the transparent workpiece.

Aspect 4 of the description is:
The method of any of Aspects 1-3, further comprising impinging the laser beam onto a phase-altering optical element, the phase-altering optical element applying a phase alteration to the laser beam to form the laser beam incident to the impingement surface comprising the oblong angular spectrum.

Aspect 5 of the description is:
The method of Aspect 4, wherein the phase-altering optical element comprises a static phase-altering optical element.

Aspect 6 of the description is:
The method of Aspect 5, wherein:
the static phase-altering optical element comprises an oblong axicon having a base portion and a conical portion extending from the base portion; and
the base portion comprises an oblong perimeter having an axis of symmetry extending from a first axis end, having a first radius of curvature, to a second axis end, having a second radius of curvature, where the first radius of curvature of the base portion and the second radius of curvature of the base portion are different Aspect 7 of the description is:
The method of Aspect 4, wherein the phase-altering optical element comprises an adaptive phase-altering optical element.

Aspect 8 of the description is:
The method of Aspect 7, wherein the adaptive phase-altering optical element comprises a spatial light modulator, a deformable mirror, or an adaptive phase plate.

Aspect 9 of the description is:
The method of any of Aspects 1-8, wherein the internal beam angle is from greater than 10° to 40°.

Aspect 10 of the description is:
The method of any of Aspects 1-8, wherein the internal beam angle is from 15° to 40°.

Aspect 11 of the description is:
The method of any of Aspects 1-8, wherein the internal beam angle is from 20° to 40°.

Aspect 12 of the description is:
The method of any of Aspects 1-11, wherein:
the laser beam comprises a first set of light rays and a second set of light rays that collectively comprise the oblong angular spectrum and the method further comprises obstructing the second set of light rays with an obstructive optical element such that the laser beam incident to the impingement surface comprises the first set of light rays and comprises an interrupted oblong angular spectrum; and
the first set of light rays impinge the impingement surface of the transparent workpiece at one or more ray propagation angles that are each less than or equal to 90° relative to the plane orthogonal to the impingement surface of the transparent workpiece at the impingement location.

Aspect 13 of the description is:
The method of Aspect 12, wherein the second set of light rays are aligned such that, if unobstructed, the second set of light rays would impinge the transparent workpiece at one or more ray propagation angles that are each greater than 90° relative to the plane orthogonal to the impingement surface of the transparent workpiece at the impingement location.

Aspect 14 of the description is:
The method of Aspect 12, wherein the second set of light rays are aligned such that, if unobstructed, at least some of the second set of light rays would impinge an edge surface of the transparent workpiece, an opposite surface of the transparent workpiece, or both.

Aspect 15 of the description is:
The method of Aspect 12, wherein the one or more ray propagation angles of the first set of light rays comprise at least one ray propagation angle that is within 85° of the plane orthogonal to the impingement surface of the transparent workpiece at the impingement location.

Aspect 16 of the description is:
The method of any of Aspects 1-15, wherein a portion of the laser beam focal line extends outside of the transparent workpiece and comprises an external focal line angle, which is greater than the internal beam angle.

Aspect 17 of the description is:
The method of any of Aspects 1-16, further comprising translating at least one of the transparent workpiece and the laser beam relative to each other along a contour line to form a contour comprising a plurality of defects.

Aspect 18 of the description is:
The method of Aspect 17, wherein the laser beam focal line extends from the impingement surface of the transparent workpiece to an edge surface of the transparent workpiece such that the plurality of defects each extend from the impingement surface of the transparent workpiece to the edge surface of the transparent workpiece.

Aspect 19 of the description is:
The method of Aspect 17, wherein the contour line comprises a curved contour line, the contour comprises a curved contour, and the method further comprises rotating the laser beam while translating at least one of the transparent workpiece and the laser beam relative to each other along the curved contour line such that each defect of the plurality of defects is directed radially inward or radially outward relative the curved contour line.

Aspect 20 of the description is:
The method of Aspect 19, wherein the curved contour line comprises a closed curved contour line and the curved contour comprises a closed curved contour.

Aspect 21 of the description is:
The method of any of Aspects 17-20, further comprising applying a stress to the contour to separate the transparent workpiece along the contour.

Aspect 22 of the description is:
The method of Aspect 21, wherein the stress comprises a thermal stress, a mechanical stress, or a combination thereof.

Aspect 23 of the description is:
The method of any of Aspects 1-22, wherein the laser beam comprises a pulsed laser beam output by a beam source that produces pulse bursts comprising 2 sub-pulses per pulse burst or more.

Aspect 24 of the description is:
The method of any of Aspects 1-23, wherein the dimensionless divergence factor $F_D$ comprises a value of from about 10 to about 2000.

Aspect 25 of the description is:
The method of any of Aspects 1-24, wherein a spacing between adjacent defects is about 50 μm or less.

Aspect 26 of the description is:
The method of Aspect 1, wherein the transparent workpiece comprises an alkali aluminosilicate glass material.

Aspect 27 of the description is:
A method for processing a transparent workpiece, the method comprising:
directing a laser beam oriented along a beam pathway from free space into an impingement surface of the transparent workpiece at a first impingement location, wherein:

the impingement surface comprises a non-planar topography;

a portion of the laser beam incident to the impingement surface comprises a first non-circular angular spectrum; and a portion of the laser beam directed into the transparent workpiece comprises a first laser beam focal line and generates a first induced absorption to produce a first defect within the transparent workpiece, the first laser beam focal line comprising:

a wavelength $\lambda$;

a first spot size $w_o$;

a Rayleigh range $Z_R$ that is greater than $$F_D \frac{\pi w_o^2}{\lambda},$$

where $F_D$ is a dimensionless divergence factor comprising a value of 10 or greater; and an internal beam angle of greater than 10° relative to a plane orthogonal to the impingement surface at the first impingement location, such that the first defect comprises a first defect angle within the transparent workpiece of greater than 10° relative to the plane orthogonal to the impingement surface at the first impingement location.

Aspect 28 of the description is:
The method of Aspect 27, wherein the first laser beam focal line comprises a circular angular spectrum within the transparent workpiece.

Aspect 29 of the description is:
The method of Aspect 27, wherein the first laser beam focal line comprises a non-circular angular spectrum within the transparent workpiece that is more circular than the first non-circular angular spectrum of the portion of the laser beam incident to the impingement surface.

Aspect 30 of the description is:
The method of any of Aspects 27-29, further comprising impinging the laser beam onto a phase-altering optical element, the phase-altering optical element applying a first phase alteration to the laser beam to form the laser beam incident to the impingement surface comprising the first non-circular angular spectrum.

Aspect 31 of the description is:
The method of Aspect 30, wherein:

the phase-altering optical element comprises a non-circular axicon having a base portion and a conical portion extending from the base portion; and the base portion comprises a non-circular perimeter.

Aspect 32 of the description is:
The method of Aspect 30, wherein the phase-altering optical element comprises an adaptive phase-altering optical element.

Aspect 33 of the description is:
The method of Aspect 32, wherein the adaptive phase-altering optical element comprises a spatial light modulator, a deformable mirror, or an adaptive phase plate.

Aspect 34 of the description is:
The method of Aspect 32, wherein the non-planar topography of the impingement surface is a variable topography, the variable topography comprising a first local topography at the first impingement location and a second local topography at a second impingement location, the second local topography differing from the first local topography.

Aspect 35 of the description is:
The method of Aspect 34, further comprising:

translating at least one of the transparent workpiece and the laser beam relative to each other from the first impingement location to the second impingement location;

applying a second phase alteration to the laser beam using the adaptive phase-altering optical element, the adaptive phase-altering optical element applying a second non-circular angular spectrum to the laser beam, the second non-circular angular spectrum differing from the first non-circular angular spectrum; and directing the laser beam comprising the second non-circular angular spectrum into the impingement surface at the second impingement location to form a second laser beam focal line and to generate a second induced absorption, the second induced absorption producing a second defect within the transparent workpiece, the second laser beam focal line comprising:

the wavelength $\lambda$;

a second spot size $w_o$;

a second Rayleigh range $Z_R$ that is greater than $$F_{D2} \frac{\pi w_o^2}{\lambda},$$

where $F_{D2}$ is a dimensionless divergence factor comprising a value of 10 or greater; and a second internal beam angle of greater than 10° relative to a plane orthogonal to the impingement surface at the second impingement location, such that the second defect comprises a second defect angle within the transparent workpiece of greater than 10° relative to the plane orthogonal to the impingement surface at the second impingement location.

Aspect 36 of the description is:
The method of Aspect 35, wherein the second laser beam focal line comprises a circular angular spectrum within the transparent workpiece.

Aspect 37 of the description is:
The method of Aspect 35, wherein the second laser beam focal line comprises a non-circular angular spectrum within the transparent workpiece that is more circular than the second non-circular angular spectrum of the portion of the laser beam incident to the impingement surface.

Aspect 38 of the description is:
The method of any of Aspects 35-37, further comprising:

imaging the impingement surface using an imaging system thereby generating image data of the impingement surface;

determining the first local topography and the second local topography based on the image data;

determining the first phase alteration and the second phase alteration based on the first local topography and the second local topography, respectively;

instructing the adaptive phase-altering optical element, using a controller, to apply the first phase alteration when directing the laser beam into the impingement surface of the transparent workpiece at the first impingement location; and instructing the adaptive phase-altering optical element, using the controller, to apply the second phase alteration when directing the laser beam into the impingement surface of the transparent workpiece at the second impingement location.

Aspect 39 of the description is:
The method of any of Aspects 35-37, wherein the first defect angle and the second defect angle are the same.

Aspect 40 of the description is:
A method for processing a transparent workpiece, the method comprising:
refracting a laser beam at an impingement surface of the transparent workpiece, wherein the laser beam comprises:
a wavelength $\lambda$;
a spot size $w_o$; and
a Rayleigh range $Z_R$ that is greater than $$F_D \frac{\pi w_o^2}{\lambda},$$

where $F_D$ is a dimensionless divergence factor and the refracting increases the dimensionless divergence factor $F_D$ by a factor of at least 10.

Aspect 41 of the description is:
The method of Aspect 40, wherein the laser beam is phase modified by a phase-altering optical element prior to refracting at the impingement surface of the transparent workpiece.

Aspect 42 of the description is:
The method of Aspect 40 or 41, wherein a portion of the laser beam within the transparent workpiece comprises a laser beam focal line and generates an induced absorption to produce a defect within the transparent workpiece.

Aspect 43 of the description is:
The method of any of Aspects 40-42, wherein a portion of the laser beam within the transparent workpiece comprises an internal beam angle of greater than 10° relative to a plane orthogonal to the impingement surface.

For the purposes of describing and defining the present inventive technology, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the specific value or end-point referred to is included. Whether or not a numerical value or end-point of a range in the specification recites "about," two embodiments are described: one modified by "about," and one not modified by "about." It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:
1. A method for processing a transparent workpiece, the method comprising:
directing a laser beam oriented along a beam pathway into an impingement surface of the transparent workpiece at an impingement location, wherein:
the impingement surface is an air-workpiece interface;
the laser beam in free space comprises an oblong angular spectrum comprising an axis of symmetry extending from a first axis end having a first radius of curvature to a second axis end having a second radius of curvature, where the first radius of curvature and the second radius of curvature are different such that the oblongangular spectrum is non-axisymmetric about an optical axis of the laser beam; and
a portion of the laser beam directed into the transparent workpiece comprises a laser beam focal line and generates an induced absorption to produce a defect within the transparent workpiece, the laser beam focal line comprising:
a wavelength $\lambda$;
a spot size $w_o$;
a Rayleigh range $Z_R$ that is greater than

$$\frac{F_D \pi w_o^2}{\lambda},$$

where $F_D$ is a dimensionless divergence factor comprising a value of 10 or greater; and
an internal focal line angle of greater than 10° relative to a plane orthogonal to the impingement surface at the impingement location, such that the defect comprises a defect angle within the transparent workpiece of greater than 10° relative to a plane orthogonal to the impingement surface at the impingement location.

2. The method of claim 1, wherein refraction of the laser beam causes the laser beam focal line to comprise a circular angular spectrum within the transparent workpiece.

3. The method of claim 1, further comprising impinging the laser beam onto a phase altering optical element to apply a phase alteration to the laser beam such that the laser beam in free space comprises the oblong angular spectrum.

4. The method of claim 3, wherein the phase altering optical element comprises a static phase altering optical element.

5. The method of claim 4, wherein:
the static phase altering optical element comprises an oblong axicon having a base portion and a conical portion extending from the base portion; and
the base portion comprises an oblong perimeter having an axis of symmetry extending from a first axis end, having a first radius of curvature, to a second axis end, having a second radius of curvature, where the first radius of curvature of the base portion and the second radius of curvature of the base portion are different.

6. The method of claim 3, wherein the phase altering optical element comprises an adaptive phase altering optical element.

7. The method of claim 6, wherein the adaptive phase altering optical element comprises a spatial light modulator, a deformable mirror, or an adaptive phase plate.

8. The method of claim 1, wherein the internal focal line angle is from 15° to 40°.

9. The method of claim 1, wherein:
the laser beam comprises a first set of light rays and a second set of light rays that collectively comprise the oblong angular spectrum and the method further comprises obstructing the second set of light rays with an obstructive optical element such that the laser beam in free space downstream the obstructive optical element comprises the first set of light rays and comprises an interrupted oblong angular spectrum;
the first set of light rays impinge the impingement surface of transparent workpiece at one or more ray propagation angles that are each less than or equal to 90° relative a plane orthogonal to the impingement surface of the transparent workpiece at the impingement location; and
the second set of light rays are aligned such that, if unobstructed, the second set of light rays would impinge the transparent workpiece at one or more ray propagation angles that are each greater than 90° relative a plane orthogonal to the impingement surface of the transparent workpiece at the impingement location.

10. The method of claim 1, further comprising translating at least one of the transparent workpiece and the laser beam relative to each other along a contour line to form a contour comprising a plurality of defects.

11. The method of claim 10, wherein the laser beam focal line extends from the impingement surface of the transparent workpiece to an edge surface of the transparent workpiece such that the plurality of defects each extend from the impingement surface of the transparent workpiece to the edge surface of the transparent workpiece.

12. The method of claim 10, wherein the contour line comprises a curved contour line, the contour comprises a curved contour, and the method further comprises rotating the laser beam while translating at least one of the transparent workpiece and the laser beam relative to each other along the curved contour line such that each defect of the plurality of defects is directed radially inward or radially outward relative the curved contour line.

13. The method of claim 12, wherein the curved contour line comprises a closed curved contour line and the curved contour comprises a closed curved contour.

14. The method of claim 12, further comprising applying a stress to the contour to separate the transparent workpiece along the contour.

15. The method of claim 1, wherein the laser beam comprises a pulsed laser beam output by a beam source that produces pulse bursts comprising 2 sub-pulses per pulse burst or more.

16. The method of claim 1, wherein:
the dimensionless divergence factor $F_D$ comprises a value of from about 10 to about 2000; and
a spacing between adjacent defects is about 50 µm or less.

17. A method for processing a transparent workpiece, the method comprising:
directing a laser beam oriented along a beam pathway from free space into an impingement surface of the transparent workpiece at an impingement location, wherein:
the impingement surface is an air-workpiece interface;
the impingement surface comprises a non-planar topography;
the laser beam in free space comprises an oblong angular spectrum comprising an axis of symmetry extending from a first axis end having a first radius of curvature to a second axis end having a second radius of curvature, where the first radius of curvature and the second radius of curvature are different such that the oblong angular spectrum is non-axisymmetric about an optical axis of the laser beam; and
a portion of the laser beam directed into the transparent workpiece comprises a laser beam focal line and generates an induced absorption to produce a defect within the transparent workpiece, the laser beam focal line comprising:
a wavelength λ;
a spot size $w_o$;
a Rayleigh range $Z_R$ that is greater than $$\frac{F_D \pi w_o^2}{\lambda},$$

where $F_D$ is a dimensionless divergence factor comprising a value of 10 or greater; and
an internal focal line angle of greater than 10° relative to a plane orthogonal to the impingement surface at the impingement location, such that the defect comprises a defect angle within the transparent workpiece of greater than 10° relative to a plane orthogonal to the impingement surface at the impingement location.

18. The method of claim 17, further comprising impinging the laser beam onto an adaptive phase altering optical element to apply a phase alteration to the laser beam such that the laser beam in free space comprises the oblong angular spectrum.

19. The method of claim 18, wherein the non-planar topography of the impingement surface is a variable topography and the method further comprises:
applying a first phase alteration to the laser beam using the adaptive phase altering optical element such that the laser beam in free space comprises the oblong angular spectrum, wherein the oblong angular spectrum is a first oblong angular spectrum;
directing the laser beam into the impingement surface of the transparent workpiece at the impingement location, wherein the impingement location comprises a first impingement location comprising a first local topography such that the portion of the laser beam directed into the transparent workpiece comprises the laser beam focal line and forms a first defect;

translating at least one of the transparent workpiece and the laser beam relative to each other from the first impingement location to a second impingement location comprising a second local topography that is different from the first local topography;

applying a second phase alteration to the laser beam using the adaptive phase altering optical element such that the laser beam in free space comprises a second oblong angular spectrum; and directing the laser beam into the impingement surface of the transparent workpiece at the second impingement location such that the portion of the laser beam directed into the transparent workpiece comprises the laser beam focal line and forms a second defect.

20. The method of claim 19, further comprising:

imaging the impingement surface using an imaging system thereby generating image data of the impingement surface;

determining the first local topography and the second local topography based on the image data;

determining the first phase alteration and the second phase alteration based on the first local topography and the second local topography, respectively;

instructing the adaptive phase altering optical element, using a controller, to apply the first phase alteration when directing the laser beam into the impingement surface of the transparent workpiece at the first impingement location; and instructing the adaptive phase altering optical element, using the controller, to apply the second phase alteration when directing the laser beam into the impingement surface of the transparent workpiece at the second impingement location.

* * * * *

UNITED STATES PATENT AND TRADEMARK OFFICE
CERTIFICATE OF CORRECTION

PATENT NO. : 11,766,746 B2
APPLICATION NO. : 16/871617
DATED : September 26, 2023
INVENTOR(S) : Viacheslav Viacheslavovich Ivanov et al.

It is certified that error appears in the above-identified patent and that said Letters Patent is hereby corrected as shown below:

In the Claims

In Column 40, Line 41, in Claim 1, delete "oblongangular" and insert -- oblong angular --.

Signed and Sealed this
Thirteenth Day of February, 2024

Katherine Kelly Vidal
*Director of the United States Patent and Trademark Office*